United States Patent [19]

Rosenthal et al.

[11] 4,181,954
[45] Jan. 1, 1980

[54] COMPUTER-AIDED GRAPHICS SYSTEM INCLUDING A COMPUTERIZED MATERIAL CONTROL SYSTEM AND METHOD OF USING SAME

[75] Inventors: Leo Rosenthal, San Francisco; Leonard M. Isaacson, Tiburon; John A. Ziebarth, Burlingame, all of Calif.

[73] Assignee: Chevron Research Company, San Francisco, Calif.

[21] Appl. No.: 412,527

[22] Filed: Nov. 2, 1973

Related U.S. Application Data

[63] Continuation of Ser. No. 144,951, May 19, 1971, abandoned, and a continuation-in-part of Ser. No. 134,389, Apr. 15, 1971, abandoned.

[51] Int. Cl.² ............................................. G06F 15/56
[52] U.S. Cl. .................................................. 364/520
[58] Field of Search ................. 444/1; 235/150, 151.1, 235/151.2, 61.6 A, 61.6 B; 340/172.5; 364/520, 200

[56] References Cited

U.S. PATENT DOCUMENTS 3,636,328  1/1972  Korelitz et al. ................... 235/151.1

Primary Examiner—Edward J. Wise
Attorney, Agent, or Firm—R. L. Freeland, Jr.; H. D. Messner

[57] ABSTRACT

Description is hereinafter had to a digital computer-aided graphics system for producing in a plane having two-dimensional coordinate axes a planar representation of a three-dimensional pipeline described in easy-to-understand coded input format as a series of workpoints paired into overlapping sets, each set containing a dominant and subservient point identified by relative three-dimensional coordinates. This system features automatic selection of valves and fittings for use within the pipeline in accordance with service requirements of the line; automatic calculation of all three-dimensional coordinates of workpoints as well as mating workpoints derived therefrom; automatic provision of isometric coordinates and generation of command signals to select the best view for plotting; automatic creaction of lists of materials in easy-to-understand symbols; automatic monitoring of all material piping items of interest; automatic generation of up-to-date status reports; and automatic creation of purchase orders, as required.

7 Claims, 62 Drawing Figures

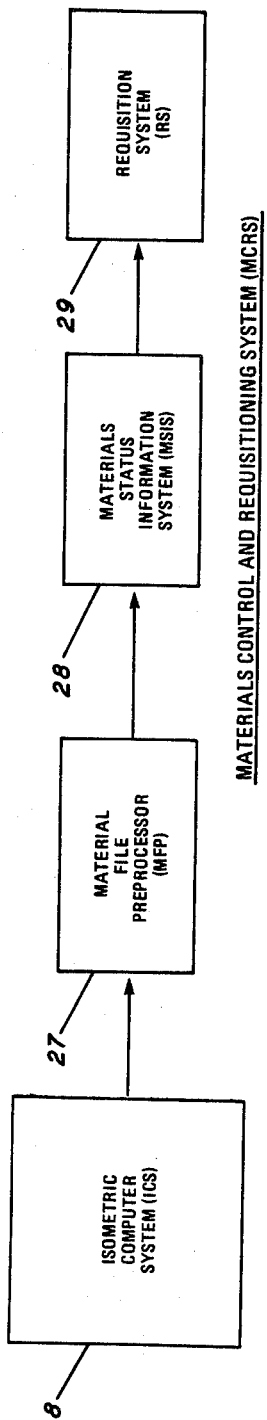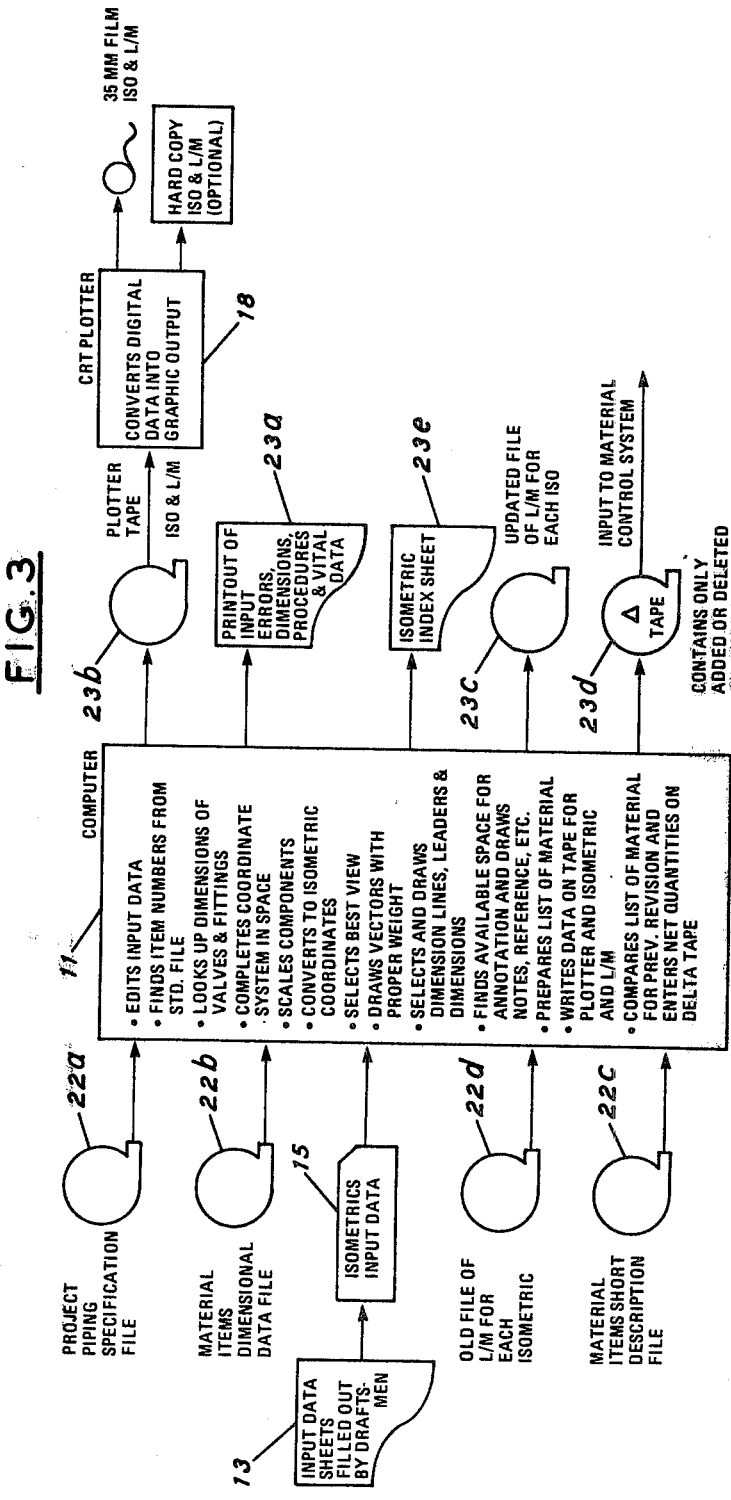

TABLE A (NOTES 1)

| BRANCH SIZE \ RUN SIZE | 24 | 22 | 20 | 18 | 16 | 14 | 12 | 10 | 8 | 6 | 4 | 3 | 2 | 1.5 | 1 | 3/4 | .5 |
|---|---|---|---|---|---|---|---|---|---|---|---|---|---|---|---|---|---|
| 24 | U | | | | | | | | | | | | | | | | |
| 22 | U | U | | | | | | | | | | | | | | | |
| 20 | U | U | U | | | | | | | | | | | | | | |
| 18 | U | U | U | U | | | | | | | | | | | | | |
| 16 | U | U | U | U | U | | | | | | | | | | | | |
| 14 | U | U | U | U | U | U | | | | | | | | | | | |
| 12 | U | U | U | U | U | U | U | | | | | | | | | | |
| 10 | U | U | U | U | U | U | U | U | | | | | | | | | |
| 8 | U | U | U | U | U | U | U | U | U | | | | | | | | |
| 6 | U | U | U | U | U | U | U | U | U | U | | | | | | | |
| 4 | U | U | U | U | U | U | U | U | U | U | U | | | | | | |
| 3 | U | U | U | U | U | U | U | U | U | U | U | U | | | | | |
| 2 | U | U | U | U | U | U | U | U | U | U | U | U | U | | | | |
| 1.5 | B | B | B | B | B | B | B | B | B | B | B | U | U | T | | | |
| 1 | B | B | B | B | B | B | B | B | B | B | B | A | U | T | T | | |
| 3/4 | B | B | B | B | B | B | B | B | B | B | B | A | U | T | T | T | |
| .5 | B | B | B | B | B | B | B | B | B | B | B | A | U | T | T | T | T |

TABLE B (NOTES 1, 2)

| BRANCH SIZE \ RUN SIZE | 24 | 22 | 20 | 18 | 16 | 14 | 12 | 10 | 8 | 6 | 4 | 3 | 2 | 1.5 | 1 | 3/4 | .5 |
|---|---|---|---|---|---|---|---|---|---|---|---|---|---|---|---|---|---|
| 24 | S | | | | | | | | | | | | | | | | |
| 22 | S | S | | | | | | | | | | | | | | | |
| 20 | S | S | S | | | | | | | | | | | | | | |
| 18 | S | S | S | S | | | | | | | | | | | | | |
| 16 | S | S | S | S | S | | | | | | | | | | | | |
| 14 | S | S | S | S | S | S | | | | | | | | | | | |
| 12 | S | S | S | S | S | S | S | | | | | | | | | | |
| 10 | S | S | S | S | S | S | S | S | | | | | | | | | |
| 8 | S | S | S | S | S | S | S | S | S | | | | | | | | |
| 6 | W | W | W | W | W | W | W | W | W | U | | | | | | | |
| 4 | W | W | W | W | W | W | W | W | W | U | U | | | | | | |
| 3 | W | W | W | W | W | W | W | W | W | U | U | U | | | | | |
| 2 | W | W | W | W | W | W | W | W | W | U | U | U | U | | | | |
| 1.5 | A | A | A | A | A | A | A | A | A | A | A | U | U | T | | | |
| 1 | A | A | A | A | A | A | A | A | A | A | A | A | U | T | T | | |
| 3/4 | A | A | A | A | A | A | A | A | A | A | A | A | U | T | T | T | |
| .5 | A | A | A | A | A | A | A | A | A | A | A | A | U | T | T | T | T |

TABLE C (NOTES 1, 2)

| BRANCH SIZE \ RUN SIZE | 24 | 22 | 20 | 18 | 16 | 14 | 12 | 10 | 8 | 6 | 4 | 3 | 2 | 1.5 | 1 | 3/4 | .5 |
|---|---|---|---|---|---|---|---|---|---|---|---|---|---|---|---|---|---|
| 24 | S | | | | | | | | | | | | | | | | |
| 22 | S | S | | | | | | | | | | | | | | | |
| 20 | S | S | S | | | | | | | | | | | | | | |
| 18 | S | S | S | S | | | | | | | | | | | | | |
| 16 | S | S | S | S | S | | | | | | | | | | | | |
| 14 | S | S | S | S | S | S | | | | | | | | | | | |
| 12 | S | S | S | S | S | S | S | | | | | | | | | | |
| 10 | S | S | S | S | S | S | S | S | | | | | | | | | |
| 8 | S | S | S | S | S | S | S | S | S | | | | | | | | |
| 6 | W | W | W | W | W | W | W | W | W | T | | | | | | | |
| 4 | W | W | W | W | W | W | W | W | W | W | T | | | | | | |
| 3 | W | W | W | W | W | W | W | W | W | W | W | T | | | | | |
| 2 | W | W | W | W | W | W | W | W | W | W | W | W | T | | | | |
| 1.5 | B | B | B | B | B | B | B | B | B | B | B | A | A | T | | | |
| 1 | B | B | B | B | B | B | B | B | B | B | B | A | A | T | T | | |
| 3/4 | B | B | B | B | B | B | B | B | B | B | B | A | A | T | T | T | |
| .5 | B | B | B | B | B | B | B | B | B | B | B | A | A | T | T | T | T |

TABLE D (NOTES)

| BRANCH SIZE \ RUN SIZE | 24 | 22 | 20 | 18 | 16 | 14 | 12 | 10 | 8 | 6 | 4 | 3 | 2 | 1.5 | 1 | 3/4 | .5 |
|---|---|---|---|---|---|---|---|---|---|---|---|---|---|---|---|---|---|
| 24 | S | | | | | | | | | | | | | | | | |
| 22 | S | S | | | | | | | | | | | | | | | |
| 20 | S | S | S | | | | | | | | | | | | | | |
| 18 | S | S | S | T | | | | | | | | | | | | | |
| 16 | S | S | S | S | T | | | | | | | | | | | | |
| 14 | S | S | S | S | S | T | | | | | | | | | | | |
| 12 | S | S | S | S | S | S | T | | | | | | | | | | |
| 10 | S | S | S | S | S | S | S | T | | | | | | | | | |
| 8 | S | S | S | S | S | S | S | S | T | | | | | | | | |
| 6 | W | W | W | W | W | W | W | W | W | T | | | | | | | |
| 4 | W | W | W | W | W | W | W | W | W | W | T | | | | | | |
| 3 | W | W | W | W | W | W | W | W | W | W | W | T | | | | | |
| 2 | W | W | W | W | W | W | W | W | W | W | W | W | T | | | | |
| 1.5 | B | B | B | B | B | B | B | B | B | B | B | A | A | T | | | |
| 1 | B | B | B | B | B | B | B | B | B | B | B | A | A | T | T | | |
| 3/4 | B | B | B | B | B | B | B | B | B | B | B | A | A | T | T | T | |
| .5 | B | B | B | B | B | B | B | B | B | B | B | A | A | T | T | T | T |

TABLE E (NOTES 1, 2)

| BRANCH SIZE \ RUN SIZE | 12 | 10 | 8 | 6 | 4 | 3 | 2 | 1.5 | 1 | 3/4 | .5 |
|---|---|---|---|---|---|---|---|---|---|---|---|
| 12 | T | | | | | | | | | | |
| 10 | W | T | | | | | | | | | |
| 8 | W | W | T | | | | | | | | |
| 6 | W | W | W | T | | | | | | | |
| 4 | W | W | W | W | T | | | | | | |
| 3 | W | W | W | W | T | T | | | | | |
| 2 | W | W | W | W | T | T | T | | | | |
| 1.5 | A | A | A | A | A | A | A | T | | | |
| 1 | A | A | A | A | A | A | A | T | T | | |
| 3/4 | A | A | A | A | A | A | A | T | T | T | |
| .5 | A | A | A | A | A | A | A | T | T | T | T |

TABLE F (NOTES 1, 2)

| BRANCH SIZE \ RUN SIZE | 18 | 16 | 14 | 12 | 10 | 8 | 6 | 4 | 3 | 2 | 1.5 | 1 | 3/4 | .5 |
|---|---|---|---|---|---|---|---|---|---|---|---|---|---|---|
| 18 | T | | | | | | | | | | | | | |
| 16 | W | T | | | | | | | | | | | | |
| 14 | W | W | T | | | | | | | | | | | |
| 12 | W | W | W | T | | | | | | | | | | |
| 10 | W | W | W | W | T | | | | | | | | | |
| 8 | W | W | W | W | W | T | | | | | | | | |
| 6 | W | W | W | W | W | W | T | | | | | | | |
| 4 | W | W | W | W | W | W | W | T | | | | | | |
| 3 | W | W | W | W | W | W | W | W | T | | | | | |
| 2 | W | W | W | W | W | W | W | W | W | T | | | | |
| 1.5 | A | A | A | A | A | A | A | A | A | A | T | | | |
| 1 | A | A | A | A | A | A | A | A | A | A | A | T | T | |
| 3/4 | A | A | A | A | A | A | A | A | A | A | A | T | T | T |
| .5 | A | A | A | A | A | A | A | A | A | A | A | T | T | T |

BRANCH REINFORCEMENT TABLES

TABLE CODES

- A — THREAD/SOCKOLET
- B — BOSS
- P — PAD REINFORCEMENT
- S — SADDLE REINFORCEMENT
- T — TEE
- U — UNREINFORCED STUB
- W — WELDOLET

NOTES

1. CAUTION — BRANCH REINFORCEMENT REQUIREMENTS SHOWN IN TABLES A, B, & C ARE CALCULATED PER USAS B31.3-1962 FOR INTERNAL PRESSURE ONLY (ASSUMING BRANCH INTERSECTS RUN AT 90-DEG.). CALCULATE THE NEED FOR ADDITIONAL REINFORCEMENT REQUIRED DUE TO STRESSES ARISING FROM OTHER LOADS OR FOR INTERSECTIONS OTHER THAN 90-DEG.
2. FOR CYCLIC SERVICES SUBJECT TO FATIGUE FAILURE.

FIG. 5

| SIZE INCH | ITEM NO | SEL. CODE | DESCRIPTION | NOTE NOS. |
|---|---|---|---|---|
| | | | PIPE | |
| 3/8-1.5 | L11GA1A | | PIPE SMLS SCH 80 CS PE | |
| 2-6 | L11EA2A | | PIPE SMLS SCH 40 CS BFW | |
| 8-20 | L11CA2A | | PIPE SMLS SCH 20 CS BFW | |
| 22-22 | L11BA2A | | PIPE SMLS SCH 10 CS BFW | |
| 24-24 | L11UA2A | | PIPE SMLS .312W CS BFW | 13.18 |
| | | | BLOCK VALVES | |
| 3/8-1.5 | L20KA0HE | 1 | GATE VLV 800LB CS SCRD 12CR RP | |
| | L24JA0BB | 4 | PLUG VALVE 600 LB CS SCRD REG | |
| | L25JB0GB | 5 | BALL VALVE 600 LB CS SCD ORBT FP | |
| 2-6 | L24BA3GB | 4 | PLUG VLV 150LB CS RF SHORT HYPRE | |
| | L25BB3FB | 5 | BALL VLV 150LB CS RF ORBIT REG P | |
| 2-10 | L20BA3CA | 1 | GATE VALVE 150LB CS RF 12CR TR | |
| 8-12 | L24BA3GBM | 4 | PLUG VLV 150LB CS RF SHT HYPR GO | |
| 12-24 | L20BA3CA* | 1 | GATE VLV150LB CS RF 12CR GO-N | |
| | | | THROTTLE VALVES | |
| 1/2-1.5 | L21JA0DF | 2 | GLOBE VLV 600LB CS SCRD 12CR TR | |
| | L23JA0DF | 205 | ANGLE VLV 600LB CS SCRD 12CR TR | |
| 2-8 | L21BA3DA | 2 | GLOBE VLV 150LB CS RF 12CR TR | |
| | | | OTHER VALVES | |
| 1/2-1.5 | L22JA0RAF | 3 | CHECK VLV 600LB CS SCRD 12CR LFT | |
| 3/4-8 | J30FA3AA | 31 | CTL VLV GLOBE I/B 300 CS RF P/B | |
| 2-16 | L22BA3PA | 3 | CHECK VLV 150LB CS RF SWING CR | |
| | | | FLANGES, JOINTS | |
| 3/4-1.5 | L33SBA | 1 | UNION 3000LB CS SCRD | 6 |
| 3/4-12 | L45BA3E | 10 | BLIND 150LB CS RF SPECTACLE | |
| 3/4-24 | L40BA2D* | 3 | FLANGE 150LB CS PF WN SCH | 12 |
| | L40BA3D* | 2 | FLANGE 150LB CS RF WN SCH | |
| | L40FA2D* | 4 | FLANGE 300LB CS PF WN SCH | |
| | L40FA3D* | 5 | FLANGE 300LB CS RF WN SCH | |
| 1-10 | L42FA3D* | 9 | ORIF FIGS 300LB CS RF WN SCH | 24 |
| 1.5-24 | L40BA2C | 6 | FLANGE 150LB CS PF SLIP-ON | 5 |
| | L40BA3C | 7 | FLANGE 150LB CS RF SLIP-ON | |
| 14-24 | L45BA3F | 11 | BLIND 150LB CS RF SPACER | |
| | L45BA3G | 12 | BLIND 150LB CS RF PLATE | |

| SIZE INCH | ITEM NO | SEL. CODE | DESCRIPTION | NOTE NOS. |
|---|---|---|---|---|
| | | | ELBOWS, BENDS | |
| 3/8-1.5 | L30SBAA | 3 | ELBOW 3000LB CS SCRD 45-DEG | |
| | L30SBAB | 1 | ELBOW 3000LB CS SCRD 90-DEG | |
| 2-6 | L50MA1AC | 3 | ELBOW STD WT CS BW 45-DEG LR | |
| | L50MA1BC | 1 | ELBOW STD WT CS BW 90-DEG LR | |
| | L50MA1BD | 2 | ELBOW STD WT CS BW 90-DEG SR | |
| 2-24 | L50MA1D | 4 | RED ELL STD WT CS BW 90-DEG LR | |
| 8-12 | L50CA1AC | 3 | ELBOW SCH 20 CS BW 45-DEG LR | |
| | L50CA1BC | 1 | ELBOW SCH 20 CS BW 90-DEG LR | |
| | L50CA1BD | 2 | ELBOW SCH 20 CS BW 90-DEG SR | |
| 14-24 | L50MA1AC | 3 | ELBOW STD WT CS BW 45-DEG LR | |
| | L50MA1BC | 1 | ELBOW STD WT CS BW 90-DEG LR | |
| | L50MA1BD | 2 | ELBOW STD WT CS BW 90-DEG SR | |
| | | | JUNCTIONS, BRANCH REINFORCEMENT | |
| 3/8-1.25 | L31SBAD | 2 | TEE 3000 LB CS SCRD REDUCING | |
| 3/8-1.5 | L31SBA | 1 | TEE 3000LB CS SCRD | |
| | L36SBAT | 6 | THREDOLET 3000LB CS SCRD | |
| | L36SBAU | 9 | ELBOLET 3000LB CS SCRD | |
| | L36SBAV | 8 | LATROLET 3000LB CS SCRD | |
| | L36VBAS | 4 | BOSS 6000LB CS SCRD | |
| 2-6 | L56MA1H | 5 | WELDOLET STD WT CS BW | |
| 8-24 | L560A1L | 3 | SADDLE CS WELD | |
| | | | CONNECTORS, REDUCERS | |
| 3/8-1.5 | L34GABJ | 10 | NIPPLE SCH 80 CS TBE | |
| | L34SBAH | 9 | COUPLING 3000LB CS SCRD | |
| | L35SBBQ | 2 | SWAGE NIPPLE SCH 80 CS TBE | |
| | L35GBHQ | 1 | SWAGE NIPPLE S80 CS BLE/TSE CON | |
| | L35SBAD | 4 | REDUCER 3000LB CS SCRD | |
| | L55NA1DA | 3 | REDUCER XS CS BW CONC | |
| 2-6 | L55MA1DA | 1 | REDUCER STD WT CS BW CONC | |
| | L55MA1DB | 401 | REDUCER STD WT CS BW ECC | |
| 8-24 | L55CA1DA | 1 | REDUCER SCH 20 CS BW CONC | |
| | L55CA1DB | 401 | REDUCER SCH 20 CS BW ECC | |
| | | | ENDS | |
| 3/8-1.5 | L37SBAX | 2 | CAP 3000LB CS SCRD | |
| | L370ABW | 1 | PLUG CS SCRD | |
| 3/4-24 | L43BA2 | 4 | BLIND FLG 150LB CS PF | |
| | L43BA3 | 3 | BLIND FLG 150LB CS RF | |
| 2-6 | L57MA1R | 1 | CAP STD WT CS BW | |
| 8-24 | L57CA1R | 1 | CAP SCH 20 CS BW | |
| | | | BOLTS AND GASKETS | |
| 3/4-24 | L618TA | 1 | GASKET 150LB ASB COMP RF RING | |
| | L618TB | 2 | GASKET 150LB ASB COMP FF RING | 12 |
| | L61FTA | 3 | GASKET 300LB ASB COMP RF RING | |
| | L620AN | 10 | MACH BOLT MILD STL W/NUT | |
| | L620BM | 20 | STUD BOLT B-7 W/2 NUTS | |

NOTES

1. REINFORCE BRANCH CONNECTIONS PER TABLE B, SHEET 2. CALCULATE NEED FOR REINFORCEMENT FOR (A) SIZES 26-IN. + LARGER + (B) INTERSECTIONS OTHER THAN 90 DEGREES.
2. USE TABLE B FOR CHANGES OF DIRECTION.
3. GEAR OPERATORS ARE REQUIRED ON VALVES 12-IN. + LARGER.
4. ALL TEMPERATURE CONNECTIONS SHALL BE SCREWED. ALL PRESSURE CONNECTIONS SHALL BE SCREWED. A
5. WELD NECK FLANGES ARE PREFERRED.
6. UNIONS ARE ALLOWED IF REMOVAL WILL NOT CAUSE INTERRUPTION OF PLANT OPERATIONS.
7. PIPE SPOOLS 3 IN. AND LARGER WILL NORMALLY BE SHO° FABRICATED EXCEPT FOR WELDEND VALVES.
8. SIZE RANGE SHOWN FOR REDUCERS IS FOR SMALL END.
9. FOR EXTERNAL COATING ON BURIED LINES, ADD ONE OF THE FOLLOWING LETTERS AS THE 8TH DIGIT OF THE ITEM NUMBER COVERING THE PIPE. B=SOMASTIC, C=P2A WRAP, F=X-TRU-COAT. FOR X-TRU-COAT, ORDER THERMOFIT SLEEVES ITEM L79A09.
10. WELDS SHALL BE RANDOM RADIOGRAPHED IN ACCORDANCE WITH SPECIFICATION EG-2505.
11. USE MILD STEEL MACHINE BOLTS WHEN BOLTING AGAINST CAST IRON FLANGES.
12. USE 150LB USAS STEEL PLAIN FACED FLANGES + ASBESTOS COMPOSITION FULL FACE GASKETS AGAINST CAST IRON FLANGES.
13. ELECTRIC FUSION WELDED PIPE UNDER SPEC. A155, GRADE C55 MAY BE SUBSTITUTED FOR SEAMLESS PIPE FOR USE OUTSIDE PROCESS UNITS, WITH SPECIFIC COMPANY APPROVAL.
15. LIMITATION FOR PLUG VALVES L24JA0BB, L24BA3GB, L24BA3GBM=350F.
18. REFER TO ENGR. DEPT. DWG. GE-L34496 FOR LINE-UP AND BACK BEVELING REQUIREMENTS.
19. *-DENOTES INCOMPLETE ITEM NUMBER. EXACT ITEM DEPENDS ON SPECIFIC INSTALLATION.
22. LIMITED SEAL WELDING – SEE SHEET 1 FOR REQUIREMENTS.
24. USE WELD NECK FLANGES + THROAT TAPS FOR 12-IN. + LARGER.
33. SWAGED NIPPLE PREFERRED.

SERVICES – LOW PRESSURE GENERAL SERVICES TO 450F MAXIMUM, AND STEAM TO 165 PSIG (NOT FOR STEAM SERVICE WITHIN THE SCOPE OF SECTION 1 OF POWER BOILER CODE)

LIMITATIONS –
100F - 275 PSIG   300F - 210 PSIG
150F - 255 PSIG   350F - 195 PSIG
200F - 240 PSIG   400F - 180 PSIG
250F - 225 PSIG   450F - 165 PSIG
150LB USAS FLANGES LIMIT PRESSURE
1/16-IN. ASBESTOS COMPOSITION RING GASKETS LIMIT TEMPERATURE
CORROSION ALLOWANCE = 1/16-IN.
(EXCEPT 24-IN. AT 100F = 0.054-IN.)

INDIVIDUAL PIPING CLASSIFICATION

FIG.6

| ITEM NO. | CONN. CODE | DWG. SYM. | 1 | 2 | 3 | 4 | 5 | 6 | 7 | 8 |
|---|---|---|---|---|---|---|---|---|---|---|
| L14EC4C | 1 | 1 | 1 | 8 | 900001 | 900002 | | | | |
| L14EC4CA | 1 | 1 | 1 | 8 | 900001 | 900002 | | | | |
| L14EV1 | 1 | 1 | 1 | 13 | 900001 | 900002 | | | | |
| L14GC4CA | 1 | 1 | 1 | 9 | 900001 | 900002 | | | | |
| L14GV1 | 1 | 1 | 1 | 14 | 900001 | 900002 | | | | |
| L14GW1 | 1 | 1 | 1 | 14 | 900001 | 900002 | | | | |
| L14MC1D | 1 | 1 | 1 | 2 | 900001 | 900002 | | | | |
| L14MC1DA | 1 | 1 | 1 | 2 | 900001 | 900002 | | | | |
| L18BC1DM | 1 | 1 | 1 | 5 | 900001 | 900002 | | | | |
| L18BC1DN | 1 | 1 | 1 | 5 | 900001 | 900002 | | | | |
| L18BC1DS | 1 | 1 | 1 | 5 | 900001 | 900002 | | | | |
| L18BC2DM | 1 | 1 | 1 | 5 | 900001 | 900002 | | | | |
| L18BC2DN | 1 | 1 | 1 | 5 | 900001 | 900002 | | | | |
| L18BC2DS | 1 | 1 | 1 | 5 | 900001 | 900002 | | | | |
| L18CC1DS | 1 | 1 | 1 | 6 | 900001 | 900002 | | | | |
| L18CC2DS | 1 | 1 | 1 | 6 | 900001 | 900002 | | | | |
| L18DC1DS | 1 | 1 | 1 | 7 | 900001 | 900002 | | | | |
| L18DC2DS | 1 | 1 | 1 | 7 | 900001 | 900002 | | | | |
| L18EC1DS | 1 | 1 | 1 | 8 | 900001 | 900002 | | | | |
| L18EC2DS | 1 | 1 | 1 | 8 | 900001 | 900002 | | | | |
| L18QC1DM | 1 | 1 | 1 | 800188 | 900001 | 900002 | | | | |
| L18QC1DN | 1 | 1 | 1 | 800188 | 900001 | 900002 | | | | |
| L18QC1DS | 1 | 1 | 1 | 800188 | 900001 | 900002 | | | | |
| L18QC2DM | 1 | 1 | 1 | 800188 | 900001 | 900002 | | | | |
| L18QC2DN | 1 | 1 | 1 | 800188 | 900001 | 900002 | | | | |
| L18QC2DS | 1 | 1 | 1 | 800188 | 900001 | 900002 | | | | |
| L18RC1DM | 1 | 1 | 1 | 800203 | 900001 | 900002 | | | | |
| L18RC1DN | 1 | 1 | 1 | 800203 | 900001 | 900002 | | | | |
| L18RC1DS | 1 | 1 | 1 | 800203 | 900001 | 900002 | | | | |
| L18RC2DM | 1 | 1 | 1 | 800203 | 900001 | 900002 | | | | |
| L18RC2DN | 1 | 1 | 1 | 800203 | 900001 | 900002 | | | | |
| L18RC2DS | 1 | 1 | 1 | 800203 | 900001 | 900002 | | | | |
| L20A12C1 | 2 | 122 | 101 | 102 | 900005 | 58 | 103 | 900006 | | |
| L20A12C6 | 2 | 122 | 101 | 102 | 900005 | 58 | 103 | 900006 | | |
| L20A12C6F | 2 | 922 | 101 | 199 | 800000 | 58 | 164 | 900006 | | |
| L20A12C6G | 2 | 922 | 101 | 199 | 800000 | 58 | 164 | 900006 | | |
| L20A12C6J | 2 | 1022 | 101 | 163 | 800000 | 58 | 164 | 900006 | | |
| L20A12C6I | 2 | 122 | 101 | 102 | 900005 | 58 | 103 | 900006 | | |
| L20BA3CA | 2 | 122 | 104 | 105 | 900005 | 58 | 106 | 900006 | | |
| L20BA3CAF | 2 | 922 | 104 | 199 | 800000 | 58 | 164 | 900006 | | |
| L20BA3CAG | 2 | 922 | 104 | 199 | 800000 | 58 | 164 | 900006 | | |
| L20BA3CAJ | 2 | 1022 | 104 | 163 | 800000 | 58 | 164 | 900006 | | |
| L20BA3CAP | 2 | 922 | 104 | 199 | 800000 | 58 | 164 | 900006 | | |
| L20BA3CAS | 2 | 122 | 104 | 105 | 900005 | 58 | 106 | 900006 | | |
| L20BA3CBV | 2 | 122 | 104 | 105 | 900005 | 58 | 106 | 900006 | | |
| L20BA3CB3 | 2 | 922 | 104 | 199 | 800000 | 58 | 164 | 900006 | | |
| L20BA3CCV | 2 | 122 | 104 | 105 | 900005 | 58 | 106 | 900006 | | |
| L20BA3CCW | 2 | 122 | 104 | 105 | 900005 | 58 | 106 | 900006 | | |
| L20BA3CC3 | 2 | 922 | 104 | 199 | 800000 | 58 | 164 | 900006 | | |
| L20BA3CL | 2 | 122 | 104 | 105 | 900005 | 58 | 106 | 900006 | | |
| L20BA3CLF | 2 | 922 | 104 | 199 | 800000 | 58 | 164 | 900006 | | |
| L20BA3CLG | 2 | 922 | 104 | 199 | 800000 | 58 | 164 | 900006 | | |
| L20BA3CLJ | 2 | 1022 | 104 | 163 | 800000 | 58 | 164 | 900006 | | |
| L20BA3CM | 2 | 122 | 104 | 105 | 900005 | 58 | 106 | 900006 | | |

ITEM NUMBER REFERENCE TABLE

FIG. 9

| TABLE A | NOTES 1 | | | | | TABLE B | NOTES 1 | | | | | TABLE C | NOTES 1 | | | | |
|---|---|---|---|---|---|---|---|---|---|---|---|---|---|---|---|---|---|
| | ANGLE OF CHANGE OF DIRECTION | | | | | | ANGLE OF CHANGE OF DIRECTION | | | | | | ANGLE OF CHANGE OF DIRECTION | | | | |
| SIZE INCH | 0-15 | 16-44 | 45 | 46-89 | 90 | SIZE INCH | 0-15 | 16-44 | 45 | 46-89 | 90 | SIZE INCH | 0-15 | 16-44 | 45 | 46-89 | 90 |
| .5 | F10 | F10 | E3 | F10 | E1 | .5 | F10 | F10 | E3 | F10 | E1 | .5 | F10 | F10 | E3 | F10 | E1 |
| 3/4 | F10 | F10 | E3 | F10 | E1 | 3/4 | F10 | F10 | E3 | F10 | E1 | 3/4 | F10 | F10 | E3 | F10 | E1 |
| 1 | F10 | F10 | E3 | F10 | E1 | 1 | F10 | F10 | E3 | F10 | E1 | 1 | F10 | F10 | E3 | F10 | E1 |
| 1.5 | F10 | M1 | E3 | F10 | E1 | 1.5 | F10 | F10 | E3 | F10 | E1 | 1.5 | F10 | F10 | E3 | F10 | E1 |
| 2 | M1 | M1 | M1 | E1 | E1 | 2 | M1 | E1 | E3 | E1 | E1 | 2 | E1 | E1 | E3 | E1 | E1 |
| 3 | M1 | M1 | M1 | E1 | E1 | 3 | M1 | E1 | E3 | E1 | E1 | 3 | E1 | E1 | E3 | E1 | E1 |
| 4 | M1 | M1 | M1 | E1 | E1 | 4 | M1 | E1 | E3 | E1 | E1 | 4 | E1 | E1 | E3 | E1 | E1 |
| 6 | M1 | M1 | M1 | E1 | E1 | 6 | M1 | E1 | E3 | E1 | E1 | 6 | E1 | E1 | E3 | E1 | E1 |
| 8 | M1 | M1 | M1 | E1 | E1 | 8 | M1 | E1 | E3 | E1 | E1 | 8 | E1 | E1 | E3 | E1 | E1 |
| 10 | M1 | M1 | M1 | E1 | E1 | 10 | M1 | E1 | E3 | E1 | E1 | 10 | E1 | E1 | E3 | E1 | E1 |
| 12 | M1 | M1 | M1 | E1 | E1 | 12 | M1 | E1 | E3 | E1 | E1 | 12 | E1 | E1 | E3 | E1 | E1 |
| 14 | M1 | M1 | M1 | E1 | E1 | 14 | M1 | E1 | E3 | E1 | E1 | 14 | E1 | E1 | E3 | E1 | E1 |
| 16 | M1 | M1 | M1 | E1 | E1 | 16 | M1 | E1 | E3 | E1 | E1 | 16 | E1 | E1 | E3 | E1 | E1 |
| 18 | M1 | M1 | M1 | E1 | E1 | 18 | M1 | E1 | E3 | E1 | E1 | 18 | E1 | E1 | E3 | E1 | E1 |
| 20 | M1 | M1 | M1 | E1 | E1 | 20 | M1 | E1 | E3 | E1 | E1 | 20 | E1 | E1 | E3 | E1 | E1 |
| 22 | M1 | M1 | M1 | E1 | E1 | 22 | M1 | E1 | E3 | E1 | E1 | 22 | E1 | E1 | E3 | E1 | E1 |
| 24 | M1 | M1 | M1 | E1 | E1 | 24 | M1 | E1 | E3 | E1 | E1 | 24 | E1 | E1 | E3 | E1 | E1 |

TABLE CODES

- E1 ELBOW 90 DEGREE LONG RADIUS
- E2 ELBOW 90 DEGREE SHORT RADIUS
- E3 ELBOW 45 DEGREE
- B BEND-90 DEGREE PURCHASED DIAMETER
- D BEND-45 DEGREE PURCHASED DIAMETER
- F BEND-FIELD DIAMETER
- M1 MITER SINGLE
- M2 MITER DOUBLE

FIG. 7

NOTES
1 FIELD BENDS OF A SHORTER RADIUS THAN LISTED ARE PERMITTED IF THEY ARE MADE WITHOUT DEFORMING CROSS SECTION OF PIPE.

CHANGE OF DIRECTION TABLES

DIMENSION TABLE

| TABLE NO. | DESCRIPTION | SIZE RANGE INDEX |
|---|---|---|
| 58 | FLG OD + THK 125 + 150LB | 2 TO 24 |

| SIZE INDEX | DIMENSION 111 | CODES 211 | (SEE NOTE BELOW) |
|---|---|---|---|
| 2 | 80.000 | 12.000 | |
| 3 | 80.000 | 12.000 | |
| 4 | 112.000 | 14.000 | |
| 5 | 124.000 | 16.000 | |
| 6 | 136.000 | 18.000 | |
| 7 | 148.000 | 20.000 | |
| 8 | 160.000 | 22.000 | |
| 9 | 192.000 | 24.000 | |
| 10 | 224.000 | 28.000 | |
| 11 | 240.000 | 30.000 | |
| 12 | 272.000 | 30.000 | |
| 13 | 288.000 | 30.000 | |
| 14 | 320.000 | 30.000 | |
| 15 | 352.000 | 32.000 | |
| 16 | 432.000 | 36.000 | |
| 17 | 512.000 | 38.000 | |
| 18 | 608.000 | 40.000 | |
| 19 | 672.000 | 44.000 | |
| 20 | 752.000 | 46.000 | |
| 21 | 800.000 | 50.000 | |
| 22 | 880.000 | 54.000 | |
| 23 | 944.000 | 58.000 | |
| 24 | 1024.000 | 60.000 | |

NOTE—(IF FIRST DIGIT IN CODE IS C,1,2 DIM. IS IN 32NDS

/ IF 3,4,5,7 DIM. IS IN INCHES)

(IF 6 THIS IS NO. OF SIZE REC.)

DIMENSION TABLE

FIG.10a

| Mat. Item Cat. | Material Description | Drawing Symbol | Data Sequence No. | Butt Weld Conn. Index = 1 Data Item | Ref. No. | Flanged Conn. Index = 2 Data Item | Ref. No. | Screwed (Female) Conn. Index = 3 Data Item | Ref. | Socket Weld (Female) Conn. Index = 5 Data Item | Ref. No. |
|---|---|---|---|---|---|---|---|---|---|---|---|
| L1 | PIPE | 01 | 1<br>2<br>3<br>4 | Pipe O.D.<br>Wall thickness<br>Weight empty<br>Weight of water | 1<br>2<br>3<br>4 | | | | | | |
| L2 | VALVES<br>(Handwheel Operated)<br><br>Gate<br>Globe<br>Angle<br>Orbit Ball<br>Plug<br>General Twin Seal | 122 | 1<br>2<br>3<br>4<br>5<br>6<br>7<br>8<br>9 | Length along path<br>Length along path<br>Stem Height<br>Handwheel Diameter<br>Screw length<br>Pipe O.D.<br>Wall thickness<br>Weight empty<br>Weight of water | 1<br>1<br>2<br>2<br>3<br>4<br>5<br>6<br>7 | Length along path<br>Length along path<br>Stem Height<br>Handwheel diameter<br>Screw length<br>Flange O.D.<br>Flange thickness<br>Weight empty<br>Weight of water | 1<br>1<br>2<br>2<br>3<br>4<br>5<br>6 | Length along path<br>Length along path<br>Stem Height<br>Handwheel diameter<br>Screw length<br>End Conn.-Band O.D.<br>Thread engagement<br>Weight empty<br>Weight of water | 1<br>1<br>2<br>2<br>3<br>4<br>5<br>6<br>7 | Length along path<br>Length along path<br>Stem Height<br>Handwheel diameter<br>Screw length<br>End Conn.-Band O.D.<br>Socket engagement<br>Weight empty<br>Weight of water | 1<br>1<br>2<br>2<br>3<br>4<br>5<br>6<br>7 |
| L2 | VALVES<br>(Wrench or Lever Operated)<br><br>Plug<br>Ball<br><br>Butterfly | 222<br><br>1612 | 1<br>2<br>3<br>4<br>5<br>6<br>7<br>8 | | | Length along path<br>Length along path<br>Stem height<br>Shank width & height<br>Flange O.D.<br>Flange thickness<br>Weight empty<br>Weight of water | 1<br>1<br>2<br>2<br>3<br>3<br>4<br>5 | Length along path<br>Length along path<br>Stem height<br>Shank width & height<br>End Conn.-Band O.D.<br>Thread engagement<br>Weight empty<br>Weight of water | 1<br>1<br>2<br>2<br>3<br>4<br>5<br>6 | Length along path<br>Length along path<br>Stem height<br>Shank width & height<br>End Conn.-Band O.D.<br>Socket engagement<br>Weight empty<br>Weight of water | 1<br>1<br>2<br>2<br>3<br>4<br>5<br>6 |
| L2 | VALVES<br>Check | 512 | 1<br>2<br>3<br>4<br>5<br>6<br>7 | Length along path<br>Length along path<br>Height of bonnet<br>Pipe O.D.<br>Wall thickness<br>Weight empty<br>Weight of water | 1<br>1<br>2<br>3<br>4<br>5<br>6 | Length along push<br>Length along path<br>Height of bonnet<br>Flange O.D.<br>Flange thickness<br>Weight empty<br>Weight of water | 1<br>1<br>2<br>3<br>4<br>5 | Length along path<br>Length along path<br>Height of bonnet<br>End Conn.-Band O.D.<br>Thread engagement<br>Weight empty<br>Weight of water | 1<br>1<br>2<br>3<br>4<br>5<br>6 | Length along path<br>Length along path<br>Height of bonnet<br>End Conn.-Band O.D.<br>Socket engagement<br>Weight empty<br>Weight of water | 1<br>1<br>2<br>3<br>4<br>5<br>6 |
| L2 | VALVES<br>Gear Opeated<br>20" Handwheel<br>Bevel Gear<br>Spur Gear<br>Gate<br>Globe<br>Angle<br>Plug | 922<br>1022 | 1<br>2<br>3<br>4<br>5<br>6<br>7<br>8<br>9 | Length along path<br>Length along path<br>Stem height<br>Stem projection<br>Stem offset<br>Pipe O.D.<br>Wall thickness<br>Weight empty<br>Weight of water | 1<br>1<br>2<br>3<br>4<br>5<br>6<br>7 | Length along path<br>Length along path<br>Stem height<br>Stem projection<br>Stem offset<br>Flange O.D.<br>Flange thickness<br>Weight empty<br>Weight of water | 1<br>1<br>2<br>2<br>3<br>4<br>5<br>6 | | | | |

DIMENSION SEQUENCE TABLE 1 (PIPE AND VALVES)

FIG. 10b

FIG. 12 MATERIAL SECONDARY SYMBOLS SHEET ONE

MATERIAL SECONDARY SYMBOLS
SHEET TWO

FIG.13

| NON-MATERIAL PRIMARY SYMBOL DIGIT | IMAGE | NON-MATERIAL PRIMARY SYMBOL DIGIT | IMAGE |
|---|---|---|---|
| 0 | (1) | 5 | (1+4) VERTICAL & EAST-WEST |
| 1 | (TYPICAL) VERTICAL | 6 | (2+4) NORTH-SOUTH & EAST-WEST |
| 2 | NORTH-SOUTH | 7 | (1+2+4) VERTICAL, NORTH-SOUTH & EAST-WEST |
| 3 | (1+2) VERTICAL & NORTH-SOUTH | 8 | POINT (MATHEMATICAL) |
| 4 | EAST-WEST | 9 | POINT (MATERIAL CONNECTED) |

DRAWING SYMBOL CODE 72 71 70 — PRIMARY SYMBOL DIGIT

NOTE: REFERENCE WORK POINT IS ALWAYS NON-ZERO.

NON-MATERIAL PRIMARY SYMBOLS

FIG.14

| NON-MATERIAL SECONDARY SYMBOL DIGIT | IMAGE | NON-MATERIAL SECONDARY SYMBOL DIGIT | IMAGE |
|---|---|---|---|
| 01 | o———o (LIGHT LINE) | 06 | |
| 02 | o———o (HEAVY LINE) | 07 | |
| 03 | o— — —o (CENTER LINE) | 08 | |
| 04 | o— — — —o (MATCH LINE) | 09 | |
| 05 | | 10 | |

DRAWING SYMBOL CODE 71, 72 — SECONDARY SYMBOL DIGITS
70

NOTE: REFERENCE WORK POINT IS ALWAYS NON-ZERO.

NON-MATERIAL SECONDARY SYMBOLS

LIST OF MATERIAL

| ITEM NO. | MK | DESCRIPTION / SIZE | | SP. | M.U. | SHOP | FIELD |
|---|---|---|---|---|---|---|---|
| L11E42A | 1 | PIPE SMLS SCH 40 CS BFW | (FT) | 0 | WGT-EMPTY | 24 | |
| | | 3 IN | | | 807 LBS | | |
| L20FA3DA | 2 | GATE VLV 300 LB CS RF BB 12CR | (EA) | | WGT-FULL | | 2 |
| | | 3 IN | | | 918 LBS | | |
| L22FA3PA | 3 | CHECK VLV 300 LB CS RF 12CR SWNG | (EA) | | | | 2 |
| | | 3 IN | | | | | |
| L36NBDT | 4 | SOCKOLET XS CS SW | (EA) | | | 2 | |
| | | 3X3/4 IN | | | | | |
| L40FA3DE | 5 | FLANGE 300 LB CS RF WN SCH 40 | (EA) | | | 10 | |
| | | 3 IN | | | | | |
| L42FA3DE | 6 | ORIF FLGS 300LB CS RF WN SCH 40 | (PR) | | | 1 | |
| | | 3 IN | | | | | |
| L50MA1BC | 7 | ELBOW STD WT CS BW 90-DEG LR | (EA) | | | 5 | |
| | | 3 IN | | | | | |
| L51MA1 | 8 | TEE STD WT CS BW | (EA) | | | 1 | |
| | | 3 IN | | | | | |
| L61FGC | 9 | GASKET 300 LB 304/ASB SPIRAL WND | (EA) | | | | 12 |
| | | 3 IN | | | | | |
| L620BH | 10 | STUD BOLT B-7 W/2 NUTS | (EA) | | | | 80 |
| | | 3/4X4 IN | | | | | |
| | 11 | 3/4X5 IN | | | | | 8 |

CLASS: N  TEMP. 100 F  PRESSURE 357 PSIG

SYMBOLS AND NOTES

1. LINE ELECT. TRACED+INSULATED
2. FE-403 JACK SCREWS ON HOR C/L
3. PI-621,APS-304 CONN.
4. PI-622

CONSTRUCTION NOTES

1. ITEMS MARKED WITH • HAVE BEEN CHANGED BY THIS REVISION.
2. DETAILS ORIF. FLG.  GB-L69507
3. STD. WELDING BOSS  GB-L91388
4. DET. AND CONST. NOTES  GE-L34486

DES- L.R 08-21-76
REL- JWL
REV-
W.O. 7798

PLANT 59 H2S RECOVERY SHOP
REFERENCE PLAN DWG. 59CA6A
LINE NO.
ISOMETRIC NO. C1 59165
REV. 0
SAMPLE NO. 2

FIG.20

LIST OF MATERIAL

| ITEM NO. | SIZE | | QUANTITY | |
|---|---|---|---|---|
| L11EA2A | 3 | 24 | 0 | FT. |
| L20FA3DA | 3 | 0 | 2 | EA. |
| L22FA3PA | 3 | 0 | 2 | EA. |
| L36NBDT | 3 X 3/4 | 2 | 0 | EA. |
| L40FA3DE | 3 | 10 | 0 | EA. |
| L42FA3DE | 3 | 1 | 0 | EA. |
| L50MA1BC | 3 | 5 | 0 | EA. |
| L51MA1 | 3 | 1 | 0 | EA. |
| L61FGC | 3 | 0 | 12 | EA. |
| L62OBM | 6 X 32 | 0 | 80 | EA. |
| L62OBM | 6 X 40 | 0 | 8 | EA. |

PIPING CLASSIFICATION

WEIGHT EMPTY 806.8 LBS.
WEIGHT WATER 111.3 LBS.
WEIGHT TOTAL 918.1 LBS.

TEST OUTPUT

DIRECTION BY HORIZONTAL AND VERTICAL PLANES

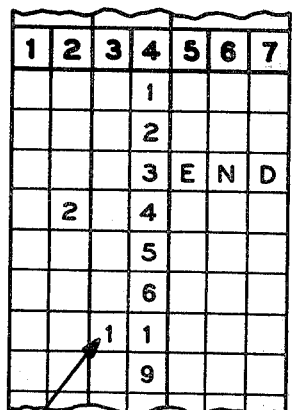
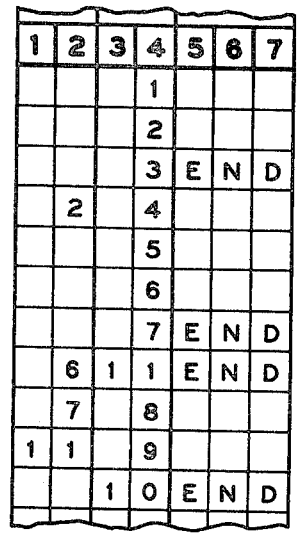
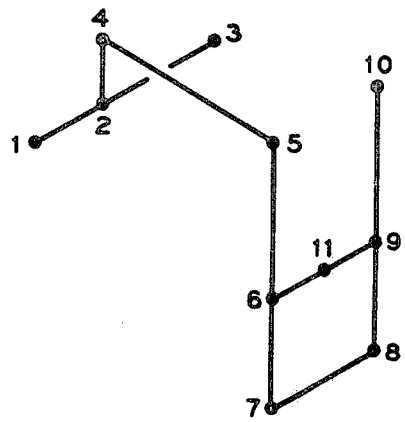
WORK POINT SEQUENCE (EXAMPLE 2)
FIG. 25
FIG. 26
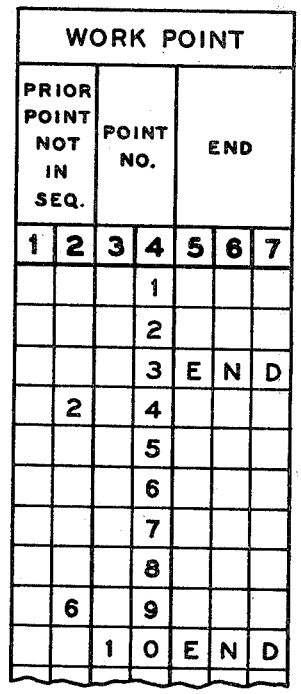
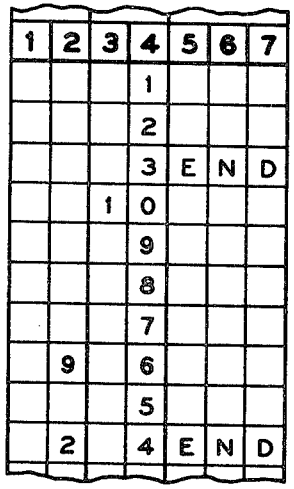
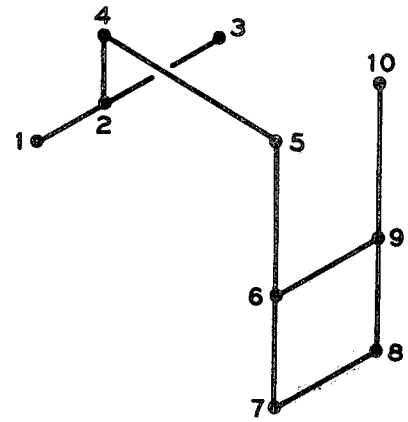
WORK POINT SEQUENCE (EXAMPLE 1)
FIG. 27
FIG. 28

WORK POINT POSITION FOR CHANGES
OF DIRECTION AND JUNCTIONS

WORK POINT POSITION FOR FLANGES
(EXCEPT BLIND AND ORIFICE)

WORK POINT POSITION FOR VALVES,
ORIFICE FLANGES AND SPEC. BLINDS

WORK POINT POSITION FOR CONNECTORS

WORK POINT POSITION ENDS

WORK POINT POSITION
FOR ECCENTRIC REDUCERS

WORK POINT SEQUENCE AND WORK POINT LOCATION

ILLUSTRATION OF SYMBOL CODES

| ITEM CODE | | | | |
|---|---|---|---|---|
| 12 | 13 | 14 | 15 | 16 |
| BLANK | | 3 | 1 | 0 |
| | | 3 | 2 | 0 |
| | | 3 | 3 | 0 |
| | | 3 | 4 | 0 |
| | | 3 | 5 | 0 |
| | | 3 | 6 | 0 |
| | | 3 | 7 | 0 |
| | | 4 | 1 | 0 |
| | | 4 | 2 | 0 |
| | | 4 | 3 | 0 |
| | | 4 | 4 | 0 |
| | | 4 | 5 | 0 |
| | | 4 | 6 | 0 |
| | | 4 | 7 | 0 |
| BLANK | | 0 | 8 | 0 |
| | | 0 | 9 | 0 |
| | | 1 | 0 | 0 |
| | | 2 | 0 | 0 |
| | | 3 | 0 | 0 |
| | | 4 | 0 | 0 |
| BLANK | | 1 | 0 | 0 |
| | | 2 | 0 | 0 |
| | | 3 | 0 | 0 |
| | | 4 | 0 | 0 |

I. SYMMETRICAL ABOUT ONE WORK POINT

A. CENTERLINES
       VERTICAL
       NORTH-SOUTH
       VERTICAL AND NORTH-SOUTH
       EAST-WEST
       VERTICAL AND EAST-WEST
       NORTH-SOUTH AND EAST-WEST
       VERTICAL, NORTH-SOUTH, AND EAST-WEST

B. MATCHLINES
       VERTICAL
       NORTH-SOUTH
       VERTICAL AND NORTH-SOUTH
       EAST-WEST
       VERTICAL AND EAST-WEST
       NORTH-SOUTH AND EAST-WEST
       VERTICAL, NORTH-SOUTH, AND EAST-WEST

C. POINTS
       MATHEMATICAL
       PIPE CUT-OFF

II. BETWEEN TWO WORK POINTS
       LIGHT LINE
       HEAVY LINE
       CENTER LINE
       MATCH LINE

A. CENTERLINES (SYMMETRICAL ABOUT A WORK POINT)
   310 VERTICAL
   320 NORTH-SOUTH
   330 VERTICAL AND NORTH-SOUTH
   340 EAST-WEST
   350 VERTICAL AND EAST-WEST
   360 NORTH-SOUTH AND EAST-WEST
   370 VERTICAL, NORTH-SOUTH, AND EAST-WEST

B. MATCHLINES (SYMMETRICAL ABOUT A WORK POINT)
   410 VERTICAL
   420 NORTH-SOUTH
   430 VERTICAL AND NORTH-SOUTH
   440 EAST-WEST
   450 VERTICAL AND EAST-WEST
   460 NORTH-SOUTH AND EAST-WEST
   470 VERTICAL, NORTH-SOUTH, AND EAST-WEST

C. POINTS
   080 MATHEMATICAL
   090 PIPE CUT-OFF

D. LINES BETWEEN TWO WORK POINTS
   100 LIGHT LINE
   200 HEAVY LINE
   300 CENTER LINE
   400 MATCH LINE

TABLE OF SYMBOL CODES

FIG. 32

1. NO ENTRY IS REQUIRED IF ORIENTATION IS 0°.
2. NO ENTRY IS REQUIRED IF INCLINATION IS 90°.
3. FOR VERTICAL LINE USE N FOR 0°, E FOR 90°, S FOR 180° AND W FOR 270°.
4. FOR NON-VERTICAL LINE USE N FOR 0°, AND D FOR 180° WHILE LOOKING FROM PRIOR WORK POINT.
5. WHEN INCLINATION IS 0° OR 180°, ORIENTATION IS IRRELEVANT.
6. CHECK VALVE SYMBOL DISREGARDS ORIENTATION.

ORIENTATION AND INCLINATION EXAMPLES (VALVES)

FIG. 35

| OLD | NEW | IPRI | W.P. | NORTH | EAST | ELEV. | CNTR. | IDATA | SYMBOL | CON.NO. | ITEM NO. | LENGTH | SIZE | | |
|-----|-----|------|------|-------|------|-------|-------|-------|--------|---------|----------|--------|------|---|---|
| 1 | 1 | 0 | 1 | 2046696 | 3778408 | 38976 | 9 | 0 | 320 | −1 | | 0 | 3 X | X | |

| 9 | 32 | 0 | 0 | 2044308 | 3779656 | 42296 | 9 | 133 | 1 | 1 | L11EA2A | 2244 | 3 X | X | |
|---|----|---|---|---------|---------|-------|---|-----|---|---|---------|------|------|---|---|
| 9 | 33 | 0 | 9 | 2044200 | 3779656 | 42296 | 9 | 137 | 3 | 1 | L51MA1 | 108 | 3 X | 3 X | 3 |
| 9 | 34 | 0 | 0 | 2044092 | 3779656 | 42296 | 9 | 0 | 0 | 1 | | 108 | X | X | |

NOCOL * 1,DATA *    3,500,SUBSCRIPTS *  2 AND 1

NOCOL * 2,DATA *    0,216,SUBSCRIPTS *  3 AND 1

NOCOL * 4,DATA *    116,SUBSCRIPTS *  1 AND 1

NOCOL * 4,DATA *    116,SUBSCRIPTS *  1 AND 2

NOCOL * 6,DATA *    264,SUBSCRIPTS *  4 AND 1

NOCOL * 6,DATA *    52,SUBSCRIPTS *  4 AND 2

NOCOL * 7,DATA *    43,000,SUBSCRIPTS *  5 AND 1

NOCOL * 8,DATA *    1,849,SUBSCRIPTS *  6 AND 1

| 10 | 35 | 0 | 0 | 2042396 | 3779656 | 42296 | 9 | 144 | 1 | 1 | L11EA2A | 1696 | 3 X | X | |
|----|----|---|---|---------|---------|-------|---|-----|---|---|---------|------|------|---|---|
| 10 | 36 | 0 | 10 | 2042280 | 3779656 | 42296 | 9 | 148 | 52 | 1 | L42FA3DF | 116 | 3 X | X | |
| 10 | 37 | 0 | 0 | 2042164 | 3779656 | 42296 | 9 | 0 | 0 | 1 | | 116 | X | X | |
| 11 | 38 | 0 | 0 | 2041512 | 3779656 | 42296 | 9 | 156 | 1 | 1 | L11EA2A | 652 | 3 X | X | |
| 11 | 39 | 0 | 11 | 2041512 | 3779656 | 42296 | 5 | 0 | 90 | −1 | | 0 | 3 X | X | |
| 13 | 40 | 0 | 13 | 2044200 | 3778408 | 38976 | 9 | 0 | 320 | −1 | | 0 | 3 X | X | |
| 14 | 41 | 0 | 0 | 2044200 | 3778408 | 39156 | 9 | 160 | 1 | 1 | L11FA2A | 180 | 3 X | X | |
| 14 | 42 | 0 | 14 | 2044200 | 3778408 | 39256 | 9 | 164 | 51 | 12 | L40FA3DE | 100 | 3 X | X | |
| 15 | 42 | 0 | 0 | 2044200 | 3778408 | 39260 | 9 | 172 | 61 | 8 | L61FGC | 4 | 3 X | X | |
| 15 | 44 | 0 | 0 | 2044200 | 3778408 | 39360 | 9 | 175 | 51 | 12 | L40FA3DE | 100 | 3 X | X | |
| 15 | 45 | 0 | 0 | 2044200 | 3778408 | 39360 | 9 | 183 | 1 | 1 | L11FA2A | 0 | 3 X | X | |
| 15 | 46 | 0 | 15 | 2044200 | 3778408 | 39504 | 9 | 187 | 1162 | 1 | L50MA1BC | 144 | 3 X | X | |
| 15 | 47 | 0 | 0 | 2044200 | 3778552 | 39504 | 9 | 0 | 0 | 1 | | 144 | X | X | |
| 16 | 48 | 0 | 0 | 2044200 | 3778660 | 39504 | 9 | 193 | 1 | 1 | L11EA2A | 108 | 3 X | X | |
| 16 | 49 | 0 | 16 | 2044200 | 3778660 | 39504 | 9 | 197 | 863 | 51 | L36NBDT | 0 | 3 X | 3 X | 3/4 |
| 16 | 50 | 0 | 0 | 2044200 | 3778660 | 39504 | 9 | 0 | 0 | 5 | | 0 | X | X | |
| 17 | 51 | 0 | 0 | 2044200 | 3778768 | 39504 | 9 | 204 | 1 | 1 | L11EA2A | 108 | 3 X | X | |
| 17 | 52 | 0 | 0 | 2044200 | 3778868 | 39504 | 9 | 208 | 51 | 12 | L40FA3DF | 100 | 3 X | X | |
| 17 | 53 | 0 | 0 | 2044200 | 3778872 | 39504 | 9 | 216 | 61 | 8 | L61FGC | 4 | 3 X | X | |
| 17 | 54 | 0 | 17 | 2044200 | 3779072 | 39504 | 9 | 219 | 512 | 2 | L22FA3PA | 200 | 3 X | X | |
| 17 | 55 | 0 | 0 | 2044200 | 3779272 | 39504 | 9 | 0 | 0 | 2 | | 200 | X | X | |
| 18 | 56 | 0 | 0 | 2044200 | 3779276 | 39504 | 9 | 226 | 61 | 8 | L61FGC | 4 | 3 X | X | |
| 18 | 57 | 0 | 0 | 2044200 | 3779376 | 39504 | 9 | 229 | 51 | 12 | L40FA3DF | 100 | 3 X | X | |
| 18 | 58 | 0 | 0 | 2044200 | 3779512 | 39504 | 9 | 237 | 1 | 1 | L11FA2A | 136 | 3 X | X | |
| 18 | 59 | 0 | 18 | 2044200 | 3779656 | 39504 | 9 | 241 | 1162 | 1 | L50MA1BC | 144 | 3 X | X | |
| 18 | 60 | 0 | 0 | 2044200 | 3779656 | 39648 | 9 | 0 | 0 | 1 | | 144 | X | X | |
| 19 | 61 | 0 | 0 | 2044200 | 3779656 | 40032 | 9 | 247 | 1 | 1 | L11EA2A | 384 | 3 X | X | |
| 19 | 62 | 0 | 0 | 2044200 | 3779656 | 40132 | 9 | 251 | 51 | 12 | L40FA3DF | 100 | 3 X | X | |
| 19 | 63 | 0 | 0 | 2044200 | 3779656 | 40136 | 9 | 259 | 61 | 8 | L61FGC | 4 | 3 X | X | |
| 19 | 64 | 0 | 19 | 2044200 | 3779656 | 40314 | 5 | 262 | 122 | 2 | L20FA3DA | 178 | 3 X | X | |
| 22 | 65 | 4 | 0 | 2046696 | 3778660 | 39594 | 9 | 38 | 0 | 9 | | 90 | 3/4 X | X | |
| 22 | 66 | 0 | 22 | 2046696 | 3778660 | 39624 | 5 | 0 | 80 | −1 | | 0 | 3/4 X | X | |
| 24 | 67 | 16 | 0 | 2044200 | 3778660 | 39594 | 9 | 197 | 0 | 5 | | 90 | 3/4 X | X | |
| 24 | 68 | 0 | 24 | 2044200 | 3778660 | 39624 | 5 | 0 | 80 | −1 | | 0 | 3/4 X | X | |
| 25 | 69 | 19 | 0 | 2044200 | 3779656 | 40492 | 9 | 262 | 0 | 2 | | 178 | 3 X | X | |
| 25 | 70 | 0 | 0 | 2044200 | 3779656 | 40496 | 9 | 271 | 61 | 8 | L61FGC | 4 | 3 X | X | |
| 25 | 71 | 0 | 0 | 2044200 | 3779656 | 40596 | 9 | 274 | 51 | 12 | L40FA3DF | 100 | 3 X | X | |
| 25 | 72 | 0 | 0 | 2044200 | 3779656 | 42188 | 9 | 282 | 1 | 1 | L11EA2A | 1582 | 3 X | X | |
| 25 | 73 | 0 | 9 | 2044200 | 3779656 | 42296 | 5 | 286 | 3 | 1 | L51MA1 | 108 | 3 X | 3 X | 3 |

FIG. 36

CLASSIFICATION INDEX
FOR PIPING ITEM CATEGORIES J-L-S

- J0 INSTRUMENT VALVES
- J1 INSTRUMENT FITTINGS
- J2 MINOR INSTRUMENTS AND ACCESSORIES
- J3 CONTROL VALVES (ITEMS NOT IN CATALOG)
- L0 TUBING AND HOSE
- L1 PIPE
- L2 VALVES
    - L20 GATE
    - L21 GLOBE
    - L22 CHECK
    - L23 ANGLE
    - L24 PLUG
    - L25 BALL
    - L26 BUTTERFLY
    - L27 DIAPHRAGM
    - L28 MULTIPORT
    - L29 MISCELLANEOUS
- L3 SCREWED AND SOCKETWELD FITTINGS
- L4 FLANGES AND BLINDS
- L5 FLANGED AND BUTTWELD FITTINGS
- L6 BOLTS, NUTS, GASKETS AND LINED PIPE RING SPACERS
- L7 MISCELLANEOUS
- L8 TUBING AND HOSE FITTINGS
- S1 DRAIN PIPE
- S2 DRAIN FITTINGS

MATERIAL ITEM NUMBER SYSTEM

FIG. 38

VALVES

L2 - - - - - -

| SUBTYPE | RATING | MATERIAL | CONNECTIONS | CONSTRUCTION FEATURES (DESIGN) | (TRIM) | (OPERATOR) |
|---|---|---|---|---|---|---|
| 0 GATE | A 120-125 LB | A C.S.-A105, A181, A216 | 0 SCREWED (FEMALE) | A UNION BONNET | A 12 CR (CRANE X) | |
| 1 | B 150 LB | B C.S.-A105 ONLY | 1 SOCKETWELD | B INSIDE SCREW BONNET | B 12 CR / HYCAR | A |
| 2 | C 175 LB | C C.S.-NORMALIZED | 2 FLANGED - PF | C BOLTED BONNET - NO GASKET | C 12 CR / VITON | B |
| 3 | D 200 LB | D C.S.-A105 | 3 FLANGED - RF | SPEC. - FULL PORT | D 12 CR/ STELLITE | C |
| 4 | E 250 LB | | (500 RMS FINISH) | D BOLTED BONNET - CONFINED | E 12 CR OR STELLITE | D |
| 5 | F 300 LB | | 4 FLANGED - ST | GASKET - FULL PORT | (CRANE XU, XN, X | E WITH POSITION INDICATOR |
| 6 | G 400 LB | E C.S.-LO TEMP. | 5 FLANGED - SG | E BOLTED BONNET - RJ GASKET | OR U) | F BEVEL GEAR OP. RT. ANGLE |
| 7 | H 500 LB | F 304 | 6 FLANGED - RJ | ONLY - FULL PORT | F STELLITE (CRANE D) | TO RUN CRANE N (RS) |
| 8 | J 600 LB | G 304 L | 7 FLANGED - RF | F | G MFG. STD. | G BEVEL GEAR OP. PARALLEL |
| 9 | K 800 LB | H 316 | 8 NO FINISH SPEC | G | H MFG. STD. / HYCAR | WITH RUN - CRANE 0 |
| | L 900 LB | J 316 L | 9 SCREWED (M & F) | | J | H BEVEL GEAR OP. RT. ANGLE |
| | M 1,000 LB | K 321 | MSS FLANGE | H BOLTED BONNET - CONFINED | K MFG. STD. / TEFLON | TO RUN CRANE U (NRS) |
| | N 1,200 LB | L 347 | A WE-SCH-5S | GASKET - REDUCED PORT | L 304 | J SPUR GEAR - CRANE P (RS) |
| | P 1,500 LB | M ALLOY-20 | B WE-SCH-10 (10S) | J | M 316 | K SPUR GEAR - CRANE S (NRS) |
| | Q 2,000 LB | N 3-1/2 NI | C WE-SCH-20 | | N ALLOY-20 | L |
| | R 2,500 LB | P C-1/2 MO | D WE-SCH-30 | K BOLTED BONNET - RJ GASKET | P MONEL | M |
| | S 3,000 LB | Q 1 CR-1/2 MO | E WE-SCH-40 (40S) | FULL PORT - GREASE SEAL | Q HASTELLOY B | N GEAR OP. W/ L/S |
| | T 4,000 LB | R 1 1/4 CR-1/2 MO | F WE-SCH-60 | L BOLTED BONNET - CONFINED | R HASTELLOY C | P |
| | U 5,000 LB | S 2 1/4 CR-1 MO | G WE-SCH-80 (80S) | GASKET - FULL PORT - | S 347 | Q |
| | V 6,000 LB | T 5 CR-1/2 MO | H WE-SCH-100 | GREASE SEAL | T | R |
| | W 7,500 LB | U MONEL | J WE-SCH-120 | M WELDED BONNET | U | S HANDWHEEL WITH POSITION |
| | X 10,000 LB | V HASTELLOY B | K WE-SCH-140 | N PRESSURE SEAL | V | INDICATING LS |
| | Y | W HASTELLOY C | L WE-SCH-160 | P BOLTED BONNET - EXPAND- | W | T |
| | Z SPECIAL | X | M WE-STD WT | ING GATE | X | U BODY BLEED STYLE A |
| | | Y | N WE-XS | Q THRU CONDUIT - FULL OPEN | Y | V BODY BLEED STYLE B |
| | | Z SPECIAL | P WE-XXS | PRESSURE SEAL - EXPAND- | Z SPECIAL | W BODY BLEED STYLE C |
| | | 1 CI-126 | Q WE-0.188W | ING GATE | 1 CI | X BODY BLEED STYLE D |
| | | 2 | R 0.203W | R THRU CONDUIT - VENTURI | 2 321 | Y |
| | | 3 | S 0.219W | BOLTED BONNET - EXPAND- | 3 | Z SPECIAL |
| | | 4 | T 0.250W | ING GATE | 4 | 1 SOLID WEDGE |
| | | 5 BRASS OR BRONZE | U 0.312W | S THRU CONDUIT - VENTURI | 5 BRASS | 2 SPLIT WEDGE |
| | | 6 | V 0.375W | PRESSURE SEAL - EXPAND- | 6 BRONZE | 3 BODY BLEED STYLE B-GO PER P |
| | | 7 ALUMINUM BRONZE | W 0.500W | ING GATE | 7 | 4 |
| | | 8 | X TABLES | T | 8 | 5 |
| | | 9 | Y TABLES | U THRU CONDUIT - FULL OPEN | 9 | 6 |
| | | | Z SPECIAL | O-RING SEAL SLAB GATE | | 7 |
| | | | | V | | 8 |
| | | | | W THRU CONDUIT - VENTURI | | 9 |
| | | | | O-RING SEAL - SLAB GATE | | |
| | | | | X WAFER | | |
| | | | | Y | | |
| | | | | Z SPECIAL | | |
| | | | | 1 BOLTED BONNET - RJ GASKET FULL PORT GRAYLOC HUBS | | |
| | | | | 2 | | |
| | | | | 3 | | |
| | | | | 4 | | |
| | | | | 5 | | |
| | | | | 6 | | |
| | | | | 7 | | |
| | | | | 8 | | |
| | | | | 9 | | |

MATERIAL ITEM NUMBER SYSTEM

FIG. 39

ENGINEERING DEPARTMENT SIZE CODES

| | | | | | |
|---|---|---|---|---|---|
| 774 | 7/8X5-1/2 IN | 948 | 1X8-1/4 IN | 1158 | 1-1/4X6-3/4 IN |
| 777 | 7/8X5-3/4 IN | 951 | 1X8-1/2 IN | 1161 | 1-1/4X7 IN |
| 780 | 7/8X5-7/8 IN | 952 | 1X8-5/8 IN | 1164 | 1-1/4X7-1/4 IN |
| 783 | 7/8X6 IN | 953 | 1X8-3/4 IN | 1167 | 1-1/4X7-1/2 IN |
| 786 | 7/8X6-1/4 IN | 954 | 1X9 IN | 1170 | 1-1/4X7-3/4 IN |
| 789 | 7/8X6-3/8 IN | 957 | 1X9-1/4 IN | 1173 | 1-1/4X8 IN |
| 792 | 7/8X6-1/2 IN | 960 | 1X9-1/2 IN | 1176 | 1-1/4X8-1/8 IN |
| 795 | 7/8X6-5/8 IN | 962 | 1X10-1/2 IN | 1179 | 1-1/4X8-1/4 IN |
| 798 | 7/8X6-3/4 IN | 963 | 1X10 IN | 1182 | 1-1/4X8-1/2 IN |
| 801 | 7/8X6-7/8 IN | 964 | 1X11 IN | 1185 | 1-1/4X8-3/4 IN |
| 804 | 7/8X7 IN | 966 | 1X12 IN | 1191 | 1-1/4X9 IN |
| 805 | 7/8X7-1/8 IN | 981 | 1X24 IN | 1194 | 1-1/4X9-1/4 IN |
| 807 | 7/8X7-1/4 IN | 982 | 1X30 IN | 1197 | 1-1/4X9-1/2 IN |
| 809 | 7/8X7-1/2 IN | 994 | 1-1/8X3-1/4 IN | 1200 | 1-1/4X9-3/4 IN |
| 814 | 7/8X8-1/2 IN | 999 | 1-1/8X4-1/2 IN | 1203 | 1-1/4X10 IN |
| 822 | 1X1/4 IN | 1005 | 1-1/8X5 IN | 1204 | 1-1/4X10-1/4 IN |
| 825 | 1X3/8 IN | 1008 | 1-1/8X5-1/4 IN | 1205 | 1-1/4X10-1/2 IN |
| 828 | 1X1/2 IN | 1011 | 1-1/8X5-1/2 IN | 1207 | 1-1/4X10-3/4 IN |
| 829 | 1X5/8 IN | 1014 | 1-1/8X5-3/4 IN | 1208 | 1-1/4X11 IN |
| 831 | 1X3/4 IN | 1017 | 1-1/8X6 IN | 1212 | 1-1/4X12 IN |
| 834 | 1X1 IN | 1020 | 1-1/8X6-1/4 IN | 1213 | 1-1/4X13 IN |
| 835 | 1X1-1/4 IN | 1026 | 1-1/8X6-1/2 IN | 1215 | 1-1/4X13-1/2 IN |
| 837 | 1X1-1/2 IN | 1032 | 1-1/8X6-3/4 IN | 1228 | 1-3/8X8-1/4 IN |
| 840 | 1X1-5/8 IN | 1035 | 1-1/8X7 IN | 1230 | 1-3/8X8-1/2 IN |
| 843 | 1X2 IN | 1041 | 1-1/8X7-1/4 IN | 1233 | 1-3/8X8-3/4 IN |
| 844 | 1X2-1/4 IN | 1047 | 1-1/8X7-1/2 IN | 1236 | 1-3/8X9 IN |
| 846 | 1X2-1/2 IN | 1053 | 1-1/8X7-3/4 IN | 1239 | 1-3/8X9-1/4 IN |
| 852 | 1X2-7/8 IN | 1059 | 1-1/8X8 IN | 1240 | 1-3/8X9-1/2 IN |
| 855 | 1X3 IN | 1065 | 1-1/8X8-1/4 IN | 1241 | 1-3/8X9-3/4 IN |
| 856 | 1X3-1/4 IN | 1074 | 1-1/8X8-1/2 IN | 1251 | 1-3/8X10 IN |
| 858 | 1X3-1/2 IN | 1077 | 1-1/8X8-3/4 IN | 1254 | 1-3/8X10-1/4 IN |
| 867 | 1X4 IN | 1080 | 1-1/8X9 IN | 1257 | 1-3/8X10-1/2 IN |
| 870 | 1X4-1/4 IN | 1086 | 1-1/8X9-1/2 IN | 1261 | 1-3/8X11 IN |
| 873 | 1X4-1/2 IN | 1087 | 1-1/8X9-3/4 IN | 1262 | 1-3/8X11-3/4 IN |
| 876 | 1X4-3/4 IN | 1089 | 1-1/8X10 IN | 1263 | 1-3/8X11-1/4 IN |
| 879 | 1X5 IN | 1091 | 1-1/8X10-1/4 IN | 1264 | 1-3/8X11-1/2 IN |
| 882 | 1X5-1/4 IN | 1092 | 1-1/8X10-1/2 IN | 1265 | 1-3/8X12 IN |
| 885 | 1X5-1/2 IN | 1105 | 1-1/4X1/4 IN | 1266 | 1-3/8X12-1/2 IN |
| 888 | 1X5-5/8 IN | 1107 | 1-1/4X1/2 IN | 1267 | 1-3/8X13 IN |
| 891 | 1X5-3/4 IN | 1110 | 1-1/4X3/4 IN | 1268 | 1-3/8X12-3/4 IN |
| 897 | 1X6 IN | 1113 | 1-1/4X1 IN | 1269 | 1-3/8X12-1/4 IN |
| 903 | 1X6-1/4 IN | 1114 | 1-1/4X1-1/2 IN | 1275 | 1-1/2X1/4 IN |
| 906 | 1X6-3/8 IN | 1119 | 1-1/4X2 IN | 1281 | 1-1/2X3/8 IN |
| 909 | 1X6-1/2 IN | 1122 | 1-1/4X2-1/2 IN | 1284 | 1-1/2X1/2 IN |

SIZE CODE FILE PRINTOUT

ENGINEERING DEPARTMENT MATERIAL PRICES

| ITEM NO. | SIZE CODE | SIZE | PRICE | DATE |
|---|---|---|---|---|
| J00XA0 | 9 | 1/8 IN | 3.81 | E/69 |
| J00XA0 | 15 | 1/4 IN | 3.81 | E/69 |
| J00XA0 | 18 | 3/8 IN | 4.45 | E/69 |
| J00XA0 | 21 | 1/2 IN | 5.70 | E/69 |
| J00XA0 | 27 | 3/4 IN | 15.90 | CRP71 |
| J00XA0 | 33 | 1 IN | 15.64 | E/69 |
| J00XA0 | 2190 | SZE CODE NOT IN FILE | 969.96 | A/71 |
| J01SA0H | 15 | 1/4 IN | 7.50 | PFP69 |
| J01SA0J | 15 | 1/4 IN | 7.70 | PFP69 |
| J02PA0 | 21 | 1/2 IN | 65.00 | |
| J02UAC | 0 | | 14.14 | CRP71 |
| J02UAC | 21 | 1/2 IN | 14.14 | CRP71 |
| J02UA0 | 0 | | 37.81 | CRP71 |
| J02UA0 | 21 | 1/2 IN | 37.81 | CRP71 |
| J02VHC | 0 | | 82.00 | E/68 |
| J02VHC | 21 | 1/2 IN | 82.00 | E/68 |
| J02VH0 | 0 | | 64.65 | CRP71 |
| J02VH0 | 21 | 1/2 IN | 64.65 | CRP71 |
| J03TAAB | −0 | | 23.50 | |
| J03TAAB | 21 | 1/2 IN | 23.50 | |
| J03TFAB | 21 | 1/2 IN | 45.00 | |
| J04FA3 | 51 | 2-1/2 IN | 535.00 | A/68 |
| J04FA3 | 54 | 3 IN | 685.00 | A/68 |
| J04FA3 | 60 | 4 IN | 905.00 | A/68 |
| J04FA3 | 66 | 5 IN | 1400.00 | A/68 |
| J04FA3 | 69 | 6 IN | 1400.00 | A/68 |
| J04JA0H | 15 | 1/4 IN | 33.18 | F/69 |
| J04JA0H | 18 | 3/8 IN | 33.18 | E/69 |
| J04JA0H | 21 | 1/2 IN | 39.69 | E/69 |
| J04JA0H | 27 | 3/4 IN | 46.90 | E/69 |
| J04JA0H | 33 | 1 IN | 58.45 | E/69 |
| J04JA0H | 39 | 1-1/4 IN | 87.99 | E/69 |
| J04JA0H | 42 | 1-1/2 IN | 124.74 | E/69 |

PRICE FILE PRINTOUT

MATERIAL WITHDRAWALS – ENGINEERING DEPARTMENT

| ITEM NO. | SIZE | DWG. NO. | SHT. | ACCT. ITEM NUMBER | QUANTITY PER DWG. SHOP | QUANTITY PER DWG. FIELD | TOTAL QUANTITY SHOP | TOTAL QUANTITY FIELD |
|---|---|---|---|---|---|---|---|---|
| | PIPE SMLS SCH 20 CS BFW | | (FT) | | | | | |
| L11CA2A | 12 IN | 4114 | 0 | 4-080 | -138 | -28 | | |
| L11CA2A | 12 IN | PA-15-1098-0 | | 15-080 | 0 | -8409 | | |
| L11CA2A | 12 IN | 15113 | 0 | 15-080 | -75 | -312 | -213 | -8749 |
| L11CA2A | 20 IN | 16115 | 0 | 16-080 | -427 | -303 | -427 | -303 |
| L11CA2A | 24 IN | PC-8-509-0 | -21 | 8-080 | 0 | -1481 | 0 | -1481 |
| | PIPE SMLS SCH 30 CS BFW | | (FT) | | | | | |
| L11DA2A | 8 IN | 8102 | 0 | 8-080 | -202 | -103 | | |
| L11DA2A | 8 IN | PD-15-1076-1 | | 15-080 | 0 | -3303 | -202 | -3406 |
| L11DA2A | 10 IN | 4116 | 0 | 4-080 | -176 | -221 | -176 | -221 |
| | PIPE SMLS SCH 40 CS BFW | | (FT) | | | | | |
| L11EA2A | 2 IN | PD-4-211-3 | | 4-080 | 0 | 8808 | | |
| L11EA2A | 2 IN | 4114 | 0 | 4-080 | -12 | -127 | | |
| L11EA2A | 2 IN | 4116 | 0 | 4-080 | -24 | -213 | | |
| L11EA2A | 2 IN | PA-36-3046-0 | | 36-080 | 0 | -11076 | -36 | -21224 |
| L11EA2A | 2-3/4 IN | 15115 | 0 | 15-080 | 0 | -3302 | 0 | -3302 |
| L11FA2A | 3 IN | PB-16-4082-1 | | 16-080 | 0 | -1240 | | |
| L11FA2A | 3 IN | PA-36-3046-0 | | 36-080 | 0 | -9851 | | |
| L11FA2A | 3 IN | 36102 | 0 | 36-080 | -417 | -153 | -417 | -11344 |
| L11FA2A | 4 IN | 4114 | 0 | 4-808 | -824 | -117 | | |
| L11FA2A | 4 IN | 4102 | 0 | 8-080 | -113 | -210 | | |
| L11FA2A | 4 IN | PB-16-4051-0 | | 16-080 | 0 | -8027 | -937 | -8354 |
| | PIPE SMLS SCH 80 CS PF | | (FT) | | | | | |
| L11GA1A | 3/4 IN | PF-16-4037-0 | -12 | 16-080 | 0 | -1787 | | |
| L11GA1A | 3/4 IN | 36102 | 0 | 36-080 | 0 | -213 | 0 | -2000 |

CUMULATIVE COSTS BY ACCOUNTING ITEM NUMBERS

| ACCOUNTING ITEM NUMBERS | CUMULATIVE SUM | | MISSING UNIT PRICES |
|---|---|---|---|
| | SHOP | FIELD | |
| 4-080 | 2,878.74 | 235,577.80 | $ |
| 8-080 | 88,855.56 | 34,737.60 | |
| 15-080 | 195.00 | 45,436.72 | $ |
| 16-080 | 2,730.12 | 49,201.07 | $ |
| 36-080 | 36,910.87 | 125,302.55 | |
| TOTALS | $ 131,570.29 | $ 490,255.74 | |

EXPENDITURE REPORT  ←142

FIG. 49

| | CUMULATIVE PURCHASE DATA THIS PERIOD | | | | |
|---|---|---|---|---|---|
| ITEM NO. | CODE SIZE | QUANTITY SIZE | QUANTITY FIELD | REQN CODE | REV NO. |
| L11CA2A | 84 | -0 | 7500 | 1 | -0 |
| L11DA2A | 75 | -0 | -400 | 1 | -2 |
| L11EA2A | 60 | -0 | -1500 | 1 | -1 |
| L11GA1A | -0 | -0 | 1234 | 1 | -2 |
| L20BA3CA | 75 | -0 | 12 | 2 | -1 |
| L31SBD | 33 | -0 | 202 | 5 | -1 |
| L36SBAT | 1515 | -0 | -55 | 4 | -1 |
| L36SBAT | 1521 | -0 | -30 | 4 | -0 |
| L50MA13C | 54 | -0 | -500 | 8 | -0 |

SORTED AND EDITED PRINTOUT OF CURRENT PURCHASES

CUMULATIVE PURCHASE DATA TO DATE

| ITEM NO. | SIZE CODE | QUANTITY SHOP | QUANTITY FIELD | REQN CODE | REV NO. |
|---|---|---|---|---|---|
| J02UAC | 21 | 0 | 40 | 37 | −0 |
| J02UAO | 21 | 0 | 30 | 37 | −0 |
| J02VHC | 21 | 0 | 20 | 37 | −0 |
| J04JAOL | 33 | 0 | 10 | 38 | −0 |
| J11EABDBC | 21 | 0 | 10 | 39 | −0 |
| J11GABC | 21 | 0 | 10 | 39 | −0 |
| J11GABC | 27 | −0 | 5 | 39 | −1 |
| J190ABH | 15 | 0 | 100 | 40 | −0 |
| J20PF40C | 42 | 0 | 20 | 39 | −0 |
| J20PF40C | 48 | 0 | 5 | 39 | −0 |
| J20PF70C | 42 | 0 | 15 | 39 | −0 |
| J200FOOE | 85 | 0 | 30 | 39 | −0 |
| J2205OB | 15 | 0 | 100 | 40 | −0 |
| J23090 | 15 | −0 | 15 | 50 | 0 |
| J25E80 | 15 | 0 | 10 | 41 | −0 |
| J25E90AH | 15 | 0 | 10 | 41 | −0 |
| J25E90AJ | 15 | 0 | 150 | 41 | −0 |
| L01A11 | 15 | 0 | 1000 | 42 | −0 |
| L01B11 | 18 | 0 | 500 | 42 | −0 |
| L01B71 | 15 | 0 | 500 | 42 | −0 |
| L01C71 | 18 | 0 | 500 | 42 | −0 |
| L01JA | 21 | 0 | 50 | 43 | −2 |
| L01JA | 27 | 0 | 200 | 43 | −0 |
| L01JF | 21 | 0 | 1200 | 43 | −0 |
| L01JF | 21 | 0 | 1000 | 43 | −1 |
| L02FH | 18 | 0 | 200 | 43 | −0 |
| L02JF | 21 | 0 | 1000 | 43 | −0 |
| L02JF | 21 | 0 | −1000 | 43 | −1 |
| L02JH | 27 | 0 | 200 | 43 | −0 |
| L02PF | 21 | 0 | 100 | 43 | −2 |
| L02PF | 27 | 0 | 100 | 43 | −2 |
| L11CA2A | 75 | 0 | 3000 | 7 | −0 |
| L11CA2A | 75 | 0 | 840 | 47 | −0 |
| L11CA2A | 75 | 0 | 2500 | 52 | −0 |
| L11CA2A | 81 | 0 | 2500 | 7 | −0 |
| L11CA2A | 81 | 0 | 1200 | 24 | −0 |
| L11CA2A | 81 | 0 | 1000 | 52 | −0 |
| L11CA2A | 84 | 0 | 1000 | 7 | −0 |
| L11CA2A | 84 | 0 | 4300 | 24 | −0 |
| L11CA2A | 87 | 0 | 900 | 24 | −0 |
| L11CA2A | 87 | 0 | 200 | 47 | −0 |
| L11CA2A | 87 | 0 | 500 | 52 | −0 |
| L11CA2A | 93 | 0 | 200 | 24 | −0 |
| L11CA2A | 96 | 0 | 800 | 24 | −0 |
| L11CA2A | 96 | 0 | 200 | 47 | −0 |
| L11CA2A | 96 | 0 | 400 | 52 | −0 |
| L11CA2A | 99 | 0 | 600 | 24 | −0 |
| L11CA2AB | 75 | 0 | 40 | 47 | −0 |
| L11CA2AB | 84 | 0 | 60 | 47 | −0 |
| L11CA2AB | 84 | 0 | 60 | 47 | −1 |
| L11CA2AB | 93 | 0 | 180 | 47 | −1 |
| L11CA2AB | 99 | 0 | 100 | 47 | −1 |
| L11CA2AC | 81 | 0 | 40 | 5 | −2 |
| L11CA2AC | 84 | 0 | 60 | 5 | −2 |
| L11CA2AC | 93 | 0 | 200 | 24 | −0 |

PRINTOUT OF NEW PURCHASED ITEM FILE TAPE 135

FIG. 46b

PROJECT MATERIAL CONTROL SUMMARY

| ITEM NO. | SIZE | PURCHASES ORDER NO. | REV. | QUANTITY | WITHDRAWALS ACCT. ITEM | SHOP | FIELD | BALANCE SHOP | FIELD | PC S | WITH F | NO PRICE | PAGE 1 |
|---|---|---|---|---|---|---|---|---|---|---|---|---|---|
| J02UAC | | BYPASS MANIFOLD 5000LB CS FLG/SC | | (EA) | | | | | | | | | |
| J02UAC | 1/2 IN | JS-98-L37 | -0 | 40 | 2537-060 | 0 | -4 | 0 | 36 | | | | |
| J02UAO | | BYPASS MANIFOLD 5000LB CS SCRD | | (EA) | | | | | | | | | |
| J02UAO | 1/2 IN | JS-98-L37 | -0 | 30 | 24-060 | 0 | -3 | | | | | | |
| | | | | | 2537-060 | 0 | -2 | | | | | | |
| | | | | 30 | | 0 | -5 | 0 | 25 | | | | |
| J02VHC | | BYPASS MANIFOLD 6500LB 316 FLG/S | | (EA) | | | | | | | | | |
| J02VHC | 1/2 IN | JS-98-L37 | -0 | 20 | | | | 0 | 20 | | | | |
| J04JAOL | | FLOW CONT VLV 600LB CS SCRD 4-PT | | (EA) | | | | | | | | | |
| J04JAOL | 1 IN | JS-98-L38 | -0 | 10 | | | | 0 | 10 | | | | |
| J11EABDBC | | SEAL POT SCH 40 CS SCD 4IN H FAB | | (EA) | | | | | | | | | |
| J11EABDBC | 1/2 IN | JS-98-L39 | -0 | 10 | | | | 0 | 10 | | | | |
| J11GABC | | SIPHON SCH 80 CS SCRD FAB | | (EA) | | | | | | | | | |
| J11GABC | 1/2 IN | JS-98-L39 | -0 | 10 | | | | 0 | 10 | | | | |
| J190ABH | | VENT PLUG CS SCRD | | (EA) | | | | | | | | | |
| J190ABH | 1/4 IN | JS-98-L40 | -0 | 100 | 24-060 | 0 | -6 | | | | | | |
| | | | | | 2537-060 | 0 | -4 | | | | | | |
| | | | | 100 | | 0 | -10 | 0 | 90 | | | | |
| J20PF40C | | THERMOWELL 1500LB 304SS ST 9-IN | | (EA) | | | | | | | | | |
| J20PF40C | 1-1/2 IN | JS-98-L39 | -0 | 20 | | | | 0 | 20 | | | | |
| J20PF40C | 2 IN | JS-98-L39 | -0 | 5 | | | | 0 | 5 | | | | |

FIG. 47

PROJECT MATERIAL SHORTAGE LIST

| ITEM NO. 1......9 | SIZE CODE 12-15 | SIZE | TOTAL PURCHASED | WITHDRAWN SHOP | WITHDRAWN FIELD | BALANCE SHOP | BALANCE FIELD | UNIT PRICE | MINIMUM ORDER SHOP | MINIMUM ORDER FIELD | ACTUAL ORDER SHOP 18-23 | ACTUAL ORDER FIELD 26-31 |
|---|---|---|---|---|---|---|---|---|---|---|---|---|
| L01A1 | 15 | TUBING SMLS .030W CU REFRIG 1/4 1/4 IN | 0 (FT) | 0 | -6 | 0 | -6 | 0.08 | | | | |
| L01A11 | 15 | TUBING SMLS .030W CU PVC COATED 1/4 IN | 1000 (FT) | 0 | -10 | 0 | 990 | 0.28 | | | | |
| L01A11 | 18 | TUBING SMLS .030W CU PVC COATED 3/8 IN | 0 (FT) | 0 | -100 | 0 | -100 | 0.38 | | | | |
| L01JA | 21 | TUBING SMLS .065W CS 3/8-7/8 1/2 IN | 0 (FT) | 0 | -45 | 0 | -45 | 0.35 | | | | |
| L01JA | 27 | TUBING SMLS .065W CS 3/8-7/8 3/4 IN | 200 (FT) | 0 | -45 | 0 | 155 | 0.30 | | | | |
| L01JF | 21 | TUBING SMLS .065W 304SS 1/2 IN | 2200 (FT) | 0 | -140 | 0 | 2060 | 1.50 | | | | |
| L02FH | 18 | TUBING SMLS/WELD .049W 316SS 3/8 IN | 200 (FT) | 0 | -57 | 0 | 143 | 0.83 | | | | |
| L02JH | 27 | TUBING SMLS/WELD .065W 316SS 3/4 IN | 200 (FT) | 0 | -26 | 0 | 174 | 1.47 | | | | |
| L02PF | 21 | TUBING SMLS/WELD .018W 304SS 1/2 IN | 0 (FT) | 0 | -19 | 0 | -19 | 0.93 | | | | |
| L11CA2A | 75 | PIPE SMLS SCH 20 CS BFW 8 IN | 3840 (FT) | -171 | -171 | | 3669 | 2.11 | | | | |
| L11CA2A | 81 | PIPE SMLS SCH 20 CS FFW 80 IN | 3700 (FT) | -4 | -996 | | 2704 | 2.75 | | | | |
| L11CA2A | 84 | PIPE SMLS SCH 20 CS BFW 12 IN | 5300 (FT) | -130 | -383 | | 4917 | 3.32 | | | | |
| L11CA2A | 87 | PIPE SMLS SCH 20 CS BFW 14 IN | 1100 (FT) | -47 | -13 | | 1087 | 4.40 | | | | |
| L11CA2A | 93 | PIPE SMLS SCH 20 CS BFW 16 IN | 200 (FT) | 0 | -10 | | 190 | 5.22 | | | | |
| L11CA2A | 96 | PIPE SMLS SCH 20 CS BFW 18 IN | 1000 (FT) | -19 | -17 | | 983 | 6.63 | | | | |

FIG. 48

MATERIALS REQUISITION
144
DATE _____
SHEET ____ OF ____
| ORDER NUMBER | ORDER CODE | REV. NO. | BATCH |
|---|---|---|---|
| K P R 9 8 L _ _ 1 | _ _ _ 1 | 1 3 | 0 4 |
| 32  35  37   42 | 44 - 47 | 52-53 | 79-80 |
| ITEM NUMBER | SIZE CODE | QUANTITY SHOP | QUANTITY FIELD | OLD QUANTITY | SIZE (IF NO SIZE CODE) |
|---|---|---|---|---|---|
| 1-9* | 12-15 | 18-23 | 26-31 | 54-59 | 60-78* |
| L20BA3CA | 48 | | 37 | 35 | |
| L20KAZ7 | 27 | | 113 | 111 | |
| L21B50A6 | 33 | | 5 | 0 | |
| ↓ | 42 | | 4 | 0 | |
| L21JA0DF | 33 | | 13 | 12 | |
| L22A12P6 | 48 | | 2 | 0 | |
| L29JH0DJ | 27 | | 4 | 0 | |
| L39JBABA | 27 | | 9 | 7 | |
| L39JBDEA | 33 | | 2 | 9 | |
| | | | | | |
REQUISITION REVISION
FIG. 51
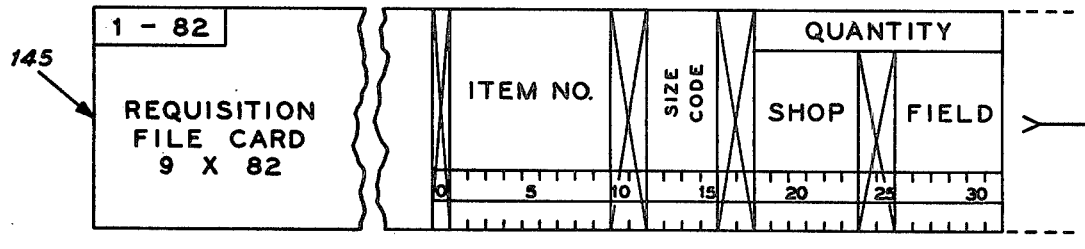
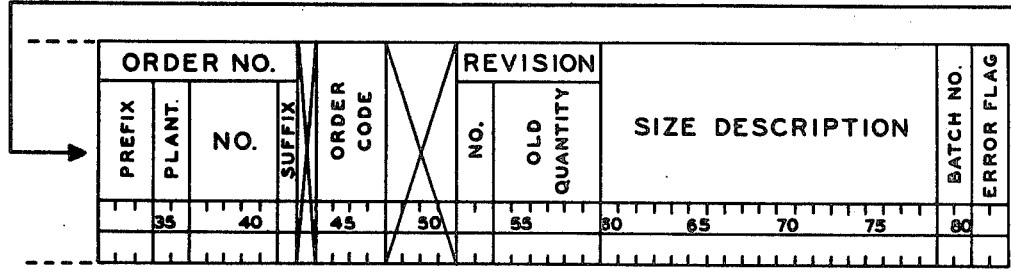
REQUISITION RECORD FORMAT
FIG. 52

LIST SHEET

NUMBER __KPR98L__  __1__

SHEET __3__ OF __34__ SHEETS

| ITEM NO. | QUANTITY | SIZE | DESCRIPTION |
|---|---|---|---|
| | | | VALVE–GATE, 150 LB. USAS, FLANGED, 1/16 RF, F/D, OS&Y, CAST CARBON STEEL PER ASTM A-216 GRADE WCB, 12 CHROME STEEL SEAT, DISC AND STEM, SOLID WEDGE, BOLTED BONNET. PER API STD. 600. CRANE FIG 47X, PACIFIC 150-1 OR EQUAL APPROVED BY PURCHASER. PACIFIC FIG. 3150-1 IS ACCEPTABLE SUBSTITUTE FOR 1-1/2 AND 2 IN. SIZES. SEE NOTE G. |
| L20BA3CA | 35 | 2 IN | 37 |
| L20BA3CA | 41 | 3 IN | 38 |
| L20BA3CA | 38 | 4 IN | 39 |
| L20BA3CA | 35 | 6 IN | 40 |
| L20BA3CA | 10 | 8 IN | 41 |
| L20BA3CA | 1 | 10 IN | 42 |
| | | | VALVE– GATE, 150 LB. USAS, FLANGED, 1/16 RF, F/D, OS&Y, CAST CARBON STEEL PER ASTM A-216 GRADE WCB, 12 CHROME STEEL SEAT, DISC AND STEM. SOLID WEDGE, BOLTED BONNET, BEVEL GEAR OPERATED CRANE N OR EQUAL. PER API STD. 600. CRANE FIG. 47X, PACIFIC 150-1 OR EQUAL APPROVED BY PURCHASER. SEE NOTE G. |
| L20BA3CAF | 2 | 12 IN | 43 |
| L20BA3CAF | 3 | 14 IN | 44 |
| L20BA3CAF | 1 | 16 IN | 45 |

↙ 149

NEW PURCHASE ORDER LIST SHEET

FIG. 53

LIST SHEET

NUMBER KPR98L 1 14

SHEET 2 OF 6 SHEETS

| ITEM NO. | QUANTITY | SIZE | DESCRIPTION | |
|---|---|---|---|---|
| L11CA2A | 6260 | | PIPE – BEVELED ENDS, SCH. 20, SEAMLESS CARBON STEEL PER ASTM A-106, A-53 OR API 5L, GRADE B ONLY. BESSEMER STEEL NOT ACCEPTABLE. (UNIT FT.) | |
| L11CA2A | 6260 | 8 IN | QUANTITY WAS 1000 | 1 |
| L11CA2A | 4840 | 10 IN | QUANTITY WAS 200 | 2 |
| L11CA2A | 72 | 12 IN | QUANTITY WAS 60 | 3 |
| L11CA2A | 380 | 18 IN | | 4 |
| | | | VALVE– GATE, 150 LB. USAS, FLANGED, 1/16 RF, F/D, OS&Y, CAST CARBON STEEL PER ASTM A-216 GRADE WCB, 12 CHROME STEEL SEAT, DISC AND STEM, SOLID WEDGE, BOLTED BONNET. PER API STD. 600. CRANE FIG 47X, PACIFIC 150-1 OR EQUAL APPROVED BY PURCHASER. PACIFIC FIG. 3150-1 IS ACCEPTABLE SUBSTITUTE FOR 1-1/2 AND 2 IN. SIZES. SEE NOTE G. | |
| L20BA3CA | 38 | 2 IN | QUANTITY WAS 37 | 12 |
| L20BA3CA | 39 | 4 IN | QUANTITY WAS 38 | 13 |
| L20BA3CA | 15 | 6 IN | QUANTITY WAS 11 | 14 |
| L20BA3CA | 1 | 10 IN | | 15 |

REVISED PURCHASE ORDER LIST SHEET

FIG. 54

LIST SHEET

NUMBER KPR98L 1 14

SHEET 6 OF 6 SHEETS

| ITEM NO. | QUANTITY | SIZE | DESCRIPTION |
|---|---|---|---|
| | NOTE G | | A METAL OF AT LEAST 2,000 F MELTING POINT AND 10% ELONGATION IS REQUIRED FOR THE YOKE BUSHINGS, SLEEVES OR DRIVE NUTS, YOKE SLEEVE NUTS, AND GLAND FOLLOWERS ON ALL STEEL AND ALLOY STEEL OS&Y VALVES. ANSI C12L14 LEADED STEEL, TYPES 303MA, 416, OR 430 STAINLESS, DUCTILE IRON, NI-RESIST TYPES D-2C, D-3A, OR D-5 ONLY ARE EXAMPLES OF ACCEPTABLE MATERIALS. |
| | | | ATTACHMENTS GB-L-31368 |
| | | | MARK EACH ITEM WITH ITEM NUMBER AND ORDER NUMBER END |

← 149

PURCHASE ORDER NOTES

FIG. 55

MATERIAL CATALOG SYSTEM DIAGRAM

COMPUTER-AIDED GRAPHICS SYSTEM INCLUDING A COMPUTERIZED MATERIAL CONTROL SYSTEM AND METHOD OF USING SAME

CROSS-REFERENCE TO RELATED APPLICATIONS

This is a continuation of application Ser. No. 144,951, filed May 19, 1971, now abandoned and a continuation-in-part of application Ser. No. 134,389, filed Apr. 15, 1971, entitled "Computer-Aided Graphics System and Method," now abandoned.

FIELD OF THE INVENTION

This invention relates to new and useful improvements in general-purpose digital computing apparatus and methods for operating general-purpose digital computers. More particularly, the present invention has to do with an apparatus and method for producing numerical data typifying in two variables selected aspects of given data having two or three variables. The invention has particular applicability in control of design and plotting of a three-dimensional pipeline as a two-dimensional planar representation in which selection of associated fittings including valves can occur automatically including preparation of a list of materials meeting all service requirements in easy-to-understand symbols.

BACKGROUND OF THE INVENTION

The making of planar representations (perspective and various types of axonometric projections) of three-dimensional piping systems can be difficult and usually requires a good deal of skilled effort. Where the piping system is to be utilized in a fluid processing plant, such as an oil refinery or chemical plant, a design effort can represent a substantial portion of the entire engineering costs—usually 30-35% of the total design effort relates to design of the piping system. Further, the piping system is usually always the last to be completed, since design of the larger fluid-handling vessels must be finalized before locations of the piping and its associate equipment are known.

Huge quantities of piping valves and fittings are also required for large scale processing plants. These items are required in many sizes, pressure ratings, materials and end-connections and other special features since, for each class of service, the correct selection of associated piping equipment must be made. Experiences show that an average fluid processing plant used in processing of hydrocarbons may require fifteen or more different classes of service; for example, piping equipment is associated with the handling of hydrocarbons at high pressure, high corrosive fluids at different pressures and temperatures, steam, water, etc.

Sections of pipeline must also be carefully dimensioned so that after fabrication in the welding shop, they can be assembled in the field with an error tolerance of about 1/16". It is difficult, if not impossible, to bend or stretch a section of large diameter welded pipe after fabrication.

Finally, ordering of hundreds of different piping items usually must occur early in the design period to insure that they will be available at the job site when needed. Erection of the piping usually is a controlling factor in the construction schedule and hence missing materials can adversely affect the completion date for the plant project. Historically, piping material has been ordered in generous quantities to avoid shortages; this has resulted in a significant surplus of many items at the end of the construction period. Further, these items are unreturnable to suppliers.

Although computerized isometric drawing systems including the preparation of lists of materials have been attempted, the complexity of system aims in view of service requirements for the pipeline and the ability of the draftsman-designer to interpret such aims in an easy coding format understandable by the computer have required too many human adjustments and decisions to be made to allow the systems to be effective.

OBJECT OF THE PRESENT INVENTION

An object of the present invention is to provide a novel computer-aided graphics system that simplifies draftsman-designer input communication requirements to the computer whereby the computer can select and dimensionally calculate and scale correct associated piping equipment even though only a minimum of input coded data has been presented; as well as monitor material piping items required and purchased for a given pipeline project, and in that way achieve a substantial reduction in the total effort related to design, drawing preparation and purchase of piping items of interest.

SUMMARY OF THE INVENTION

The present invention relates to a digital computer-aided graphics system producing in a plane having two-dimensional coordinates axes a planar representation of a three-dimensional pipeline described in easy-to-understand coded input format as a series of workpoints paired into overlapping sets, each set containing a dominant and subservient point identified by relative three-dimensional coordinates. This system features automatic selection of fittings for use within the pipeline in accordance with serive requirements of the line; automatic calculation of all three-dimensional coordinates of workpoints as well as mating workpoints derived therefrom; automatic provision of isometric coordinates and generation of command signals to select the best view for plotting; automatic creation of lists of materials in easy-to-understand symbols; automatic monitoring of all material piping items of interest; automatic generation of up-to-date status reports; and automatic creation of purchase orders, as required.

DETAILED DESCRIPTION OF DRAWINGS

The present invention will become more apparent from the following detailed description of an embodiment thereof taken in conjunction with the following drawings in which:

FIG. 2 is a schematic diagram illustrating the isometric computer system (ICS) of the graphics system of FIG. 1.

FIG. 3 is a block diagram illustrating the materials control and purchasing system for use with the graphics system of the present invention.

FIGS. 5, 6 and 7 illustrate printouts of data comprising the piping specification file of FIG. 4.

FIG. 9 is a printout of the item number reference table of the dimensional data file of FIG. 8.

FIGS. 10a and 10b relate to printout of data stored within the dimensional tables, and the dimensional sequence tables of the item number reference table of FIG. 9, respectively.

Figure 11:
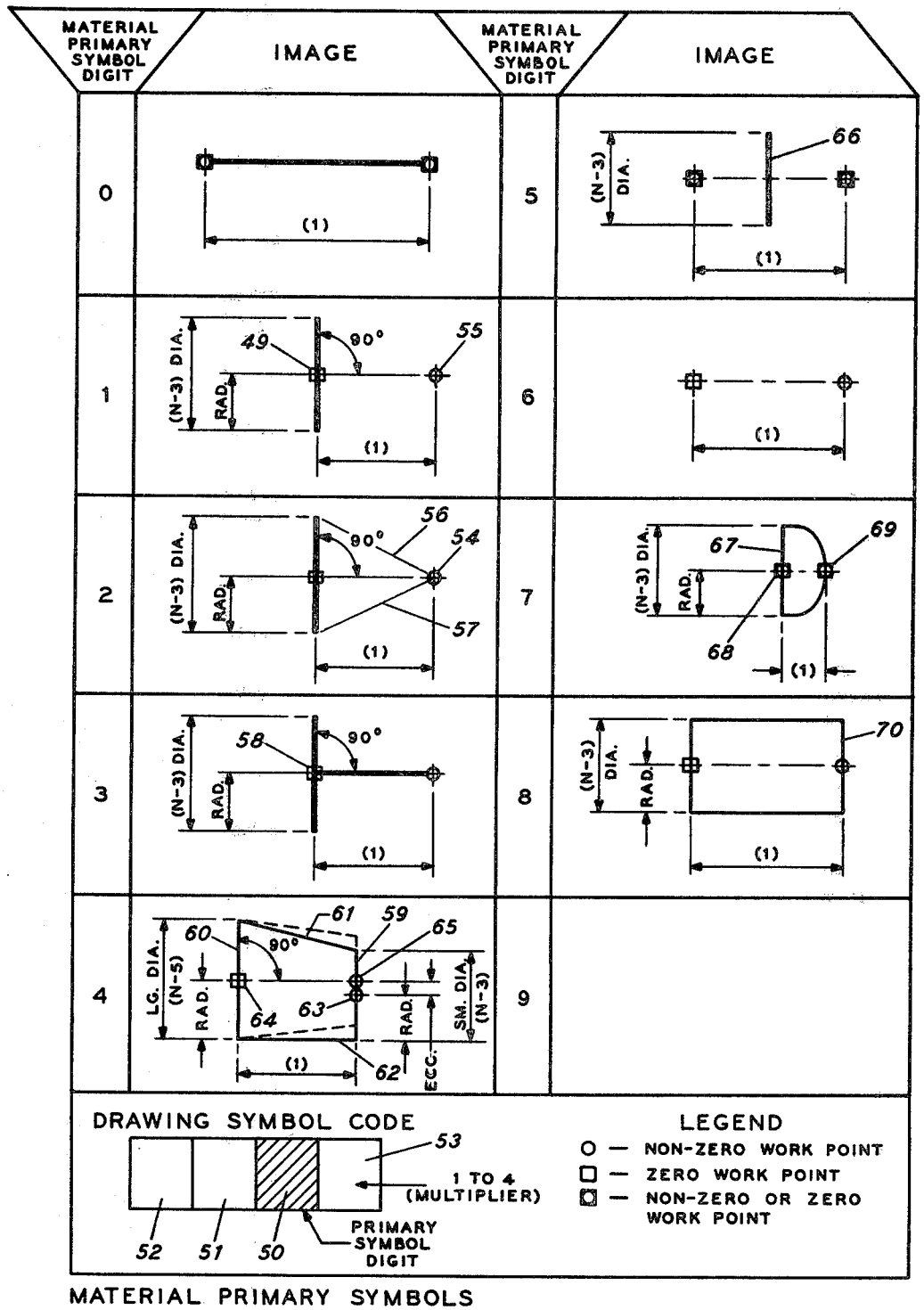
Figure 12:
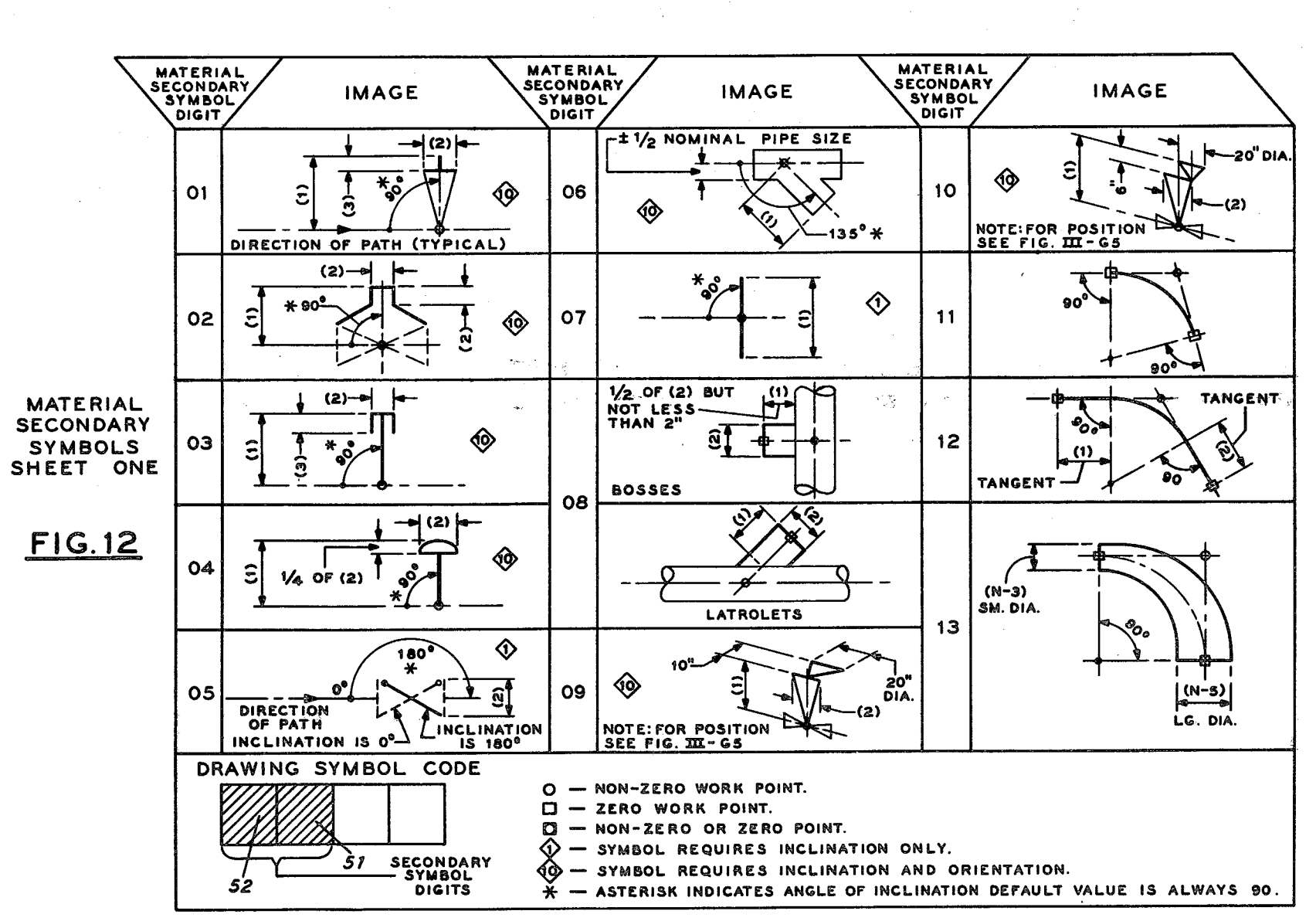
Figure 13:
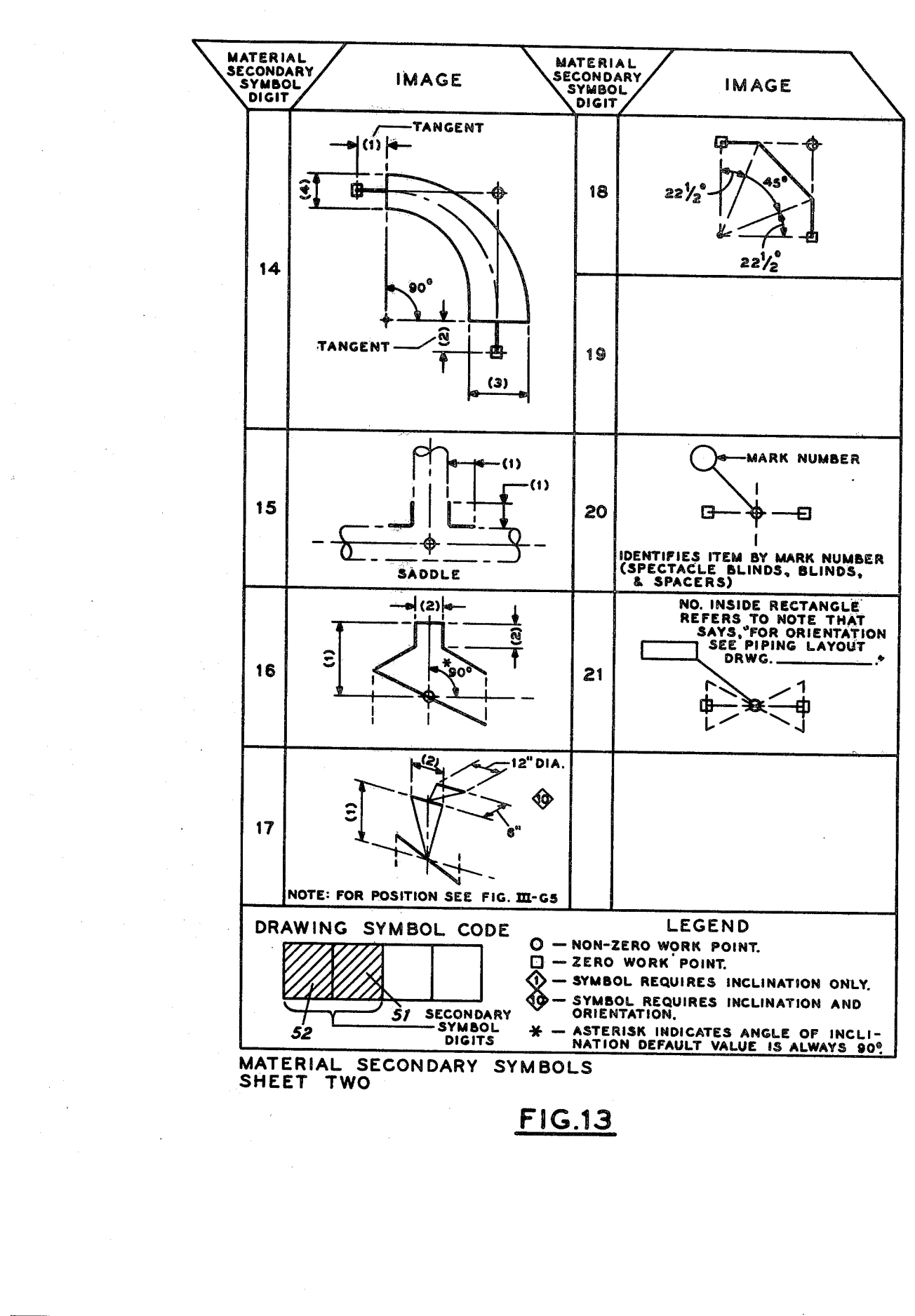

FIGS. 11, 12 and 13 illustrate primary drawing symbols utilized in forming appropriate display images of piping elements in the system of the present invention.

FIGS. 14 and 15 illustrate primary symbols used in illustrating non-material items in the final display representation of the present invention.

Figure 16:
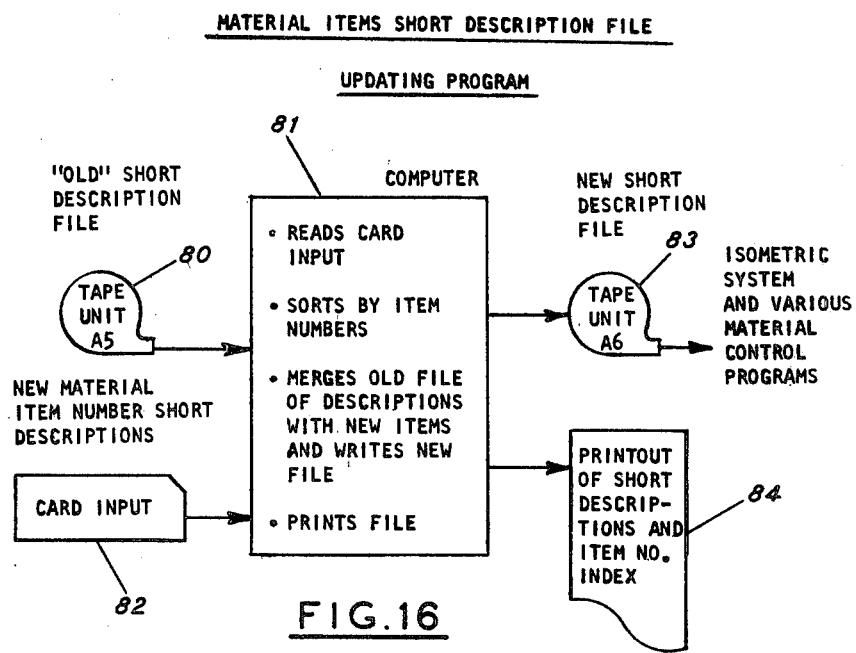

FIG. 16 is a block diagram of the material from the description file illustrating a subroutine useful in updating information within the short description file.

Figure 17:
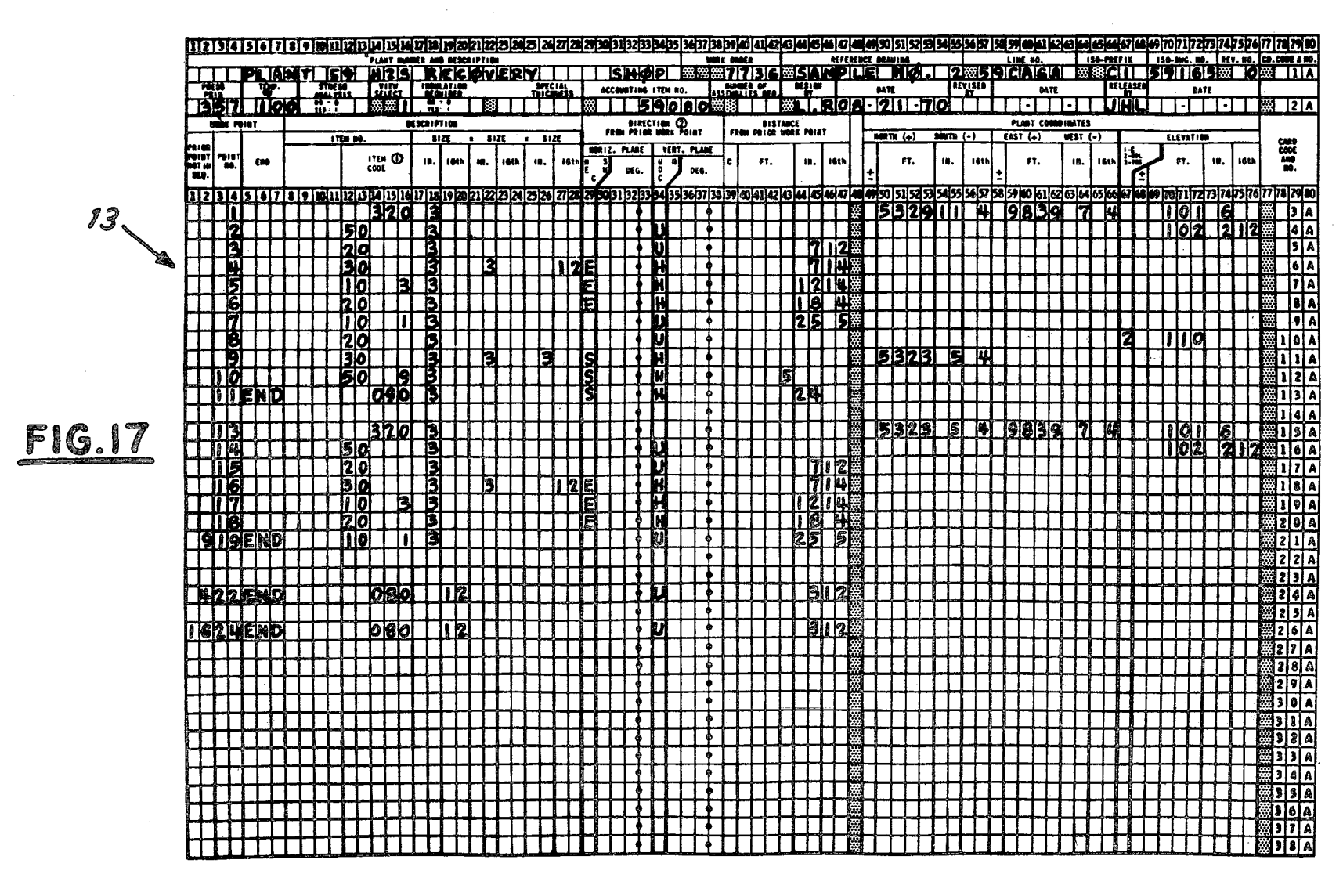
Figure 18:
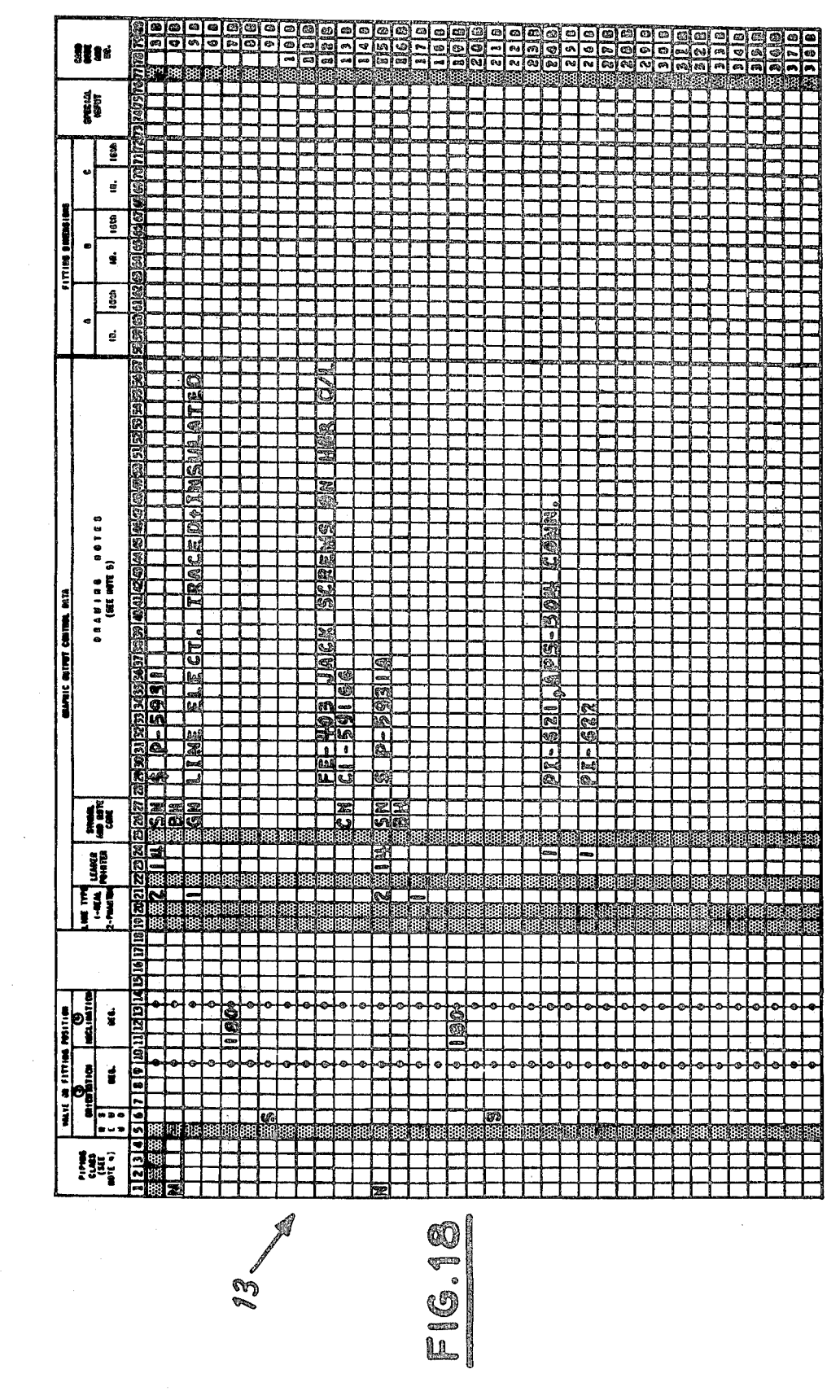

FIGS. 17 and 18 illustrate data sheets used by originator-designers to encode input information into the computer-aided graphics system of the present invention, the encoded information related to a selected three-dimensional pipeline with its associated valves and fittings.

Figure 19:
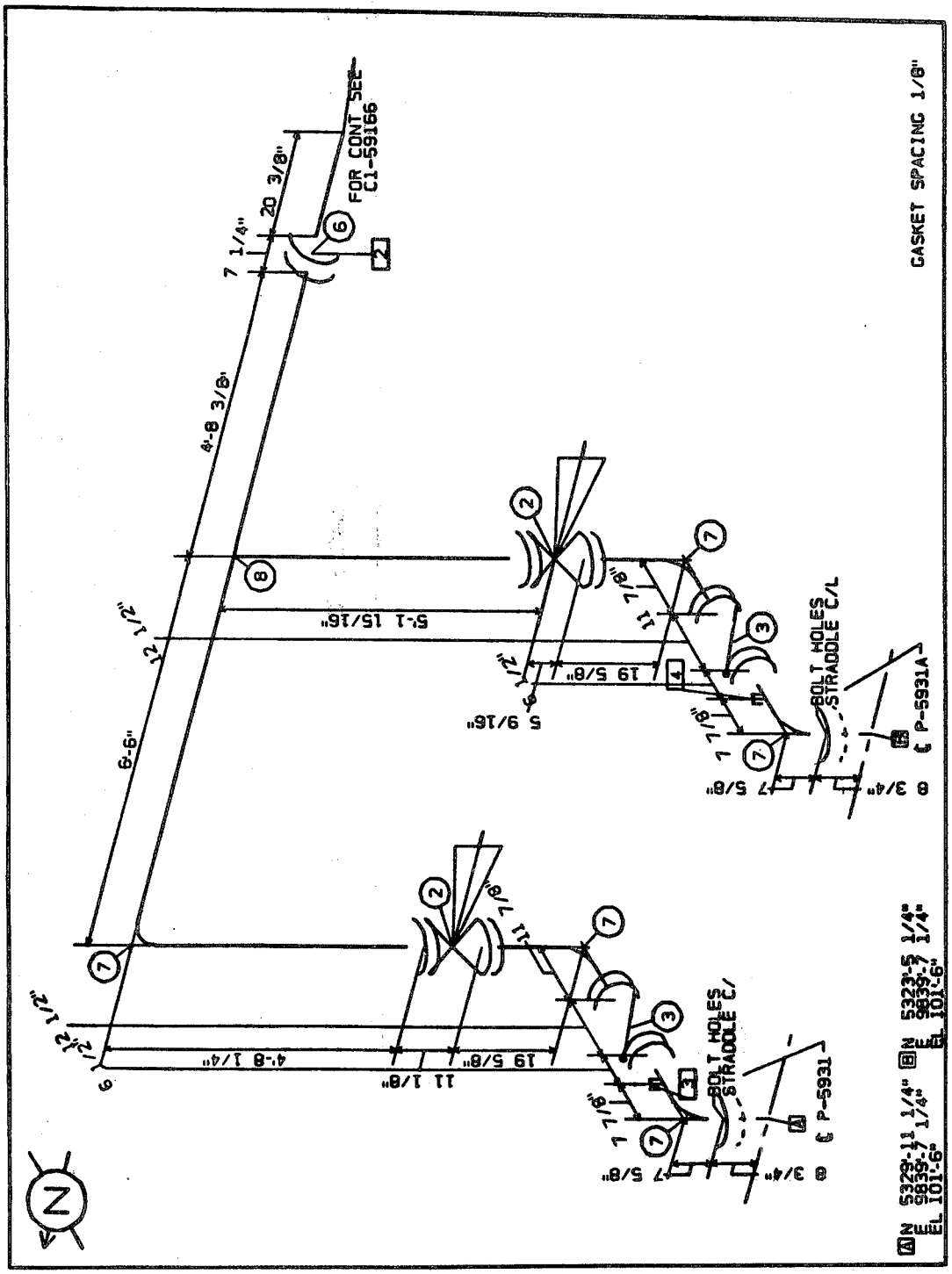

FIGS. 19 and 20 are pictorial displays which result from utilization of the data illustrated in FIGS. 17 and 18 manipulated in accordance with the graphics system of the present invention.

Figure 21:
Figure 22:

FIGS. 21 and 22 illustrate legend information which accompanies the data sheets of FIGS. 17 and 18.

Figure 23:
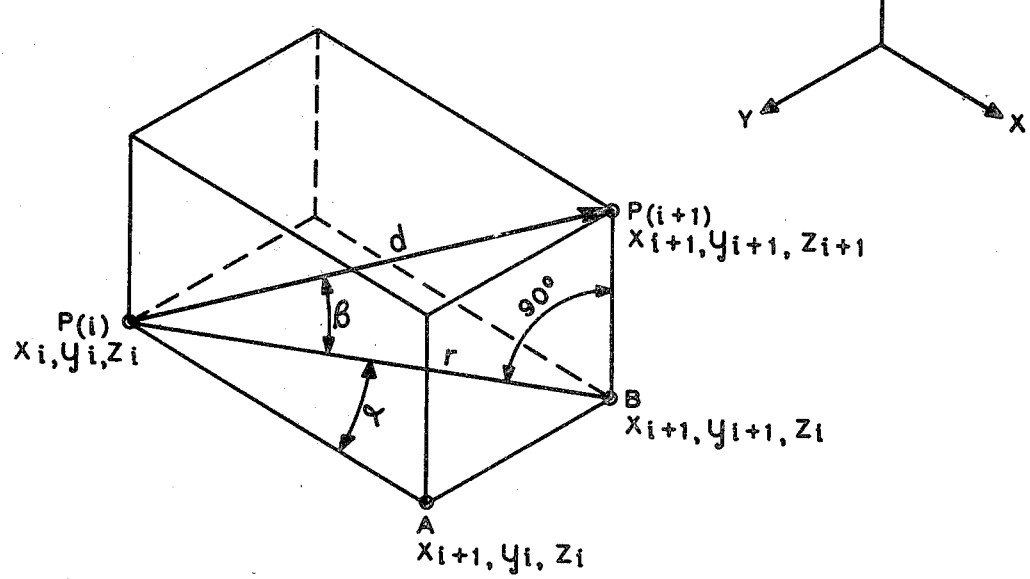
Figures 24, 37:
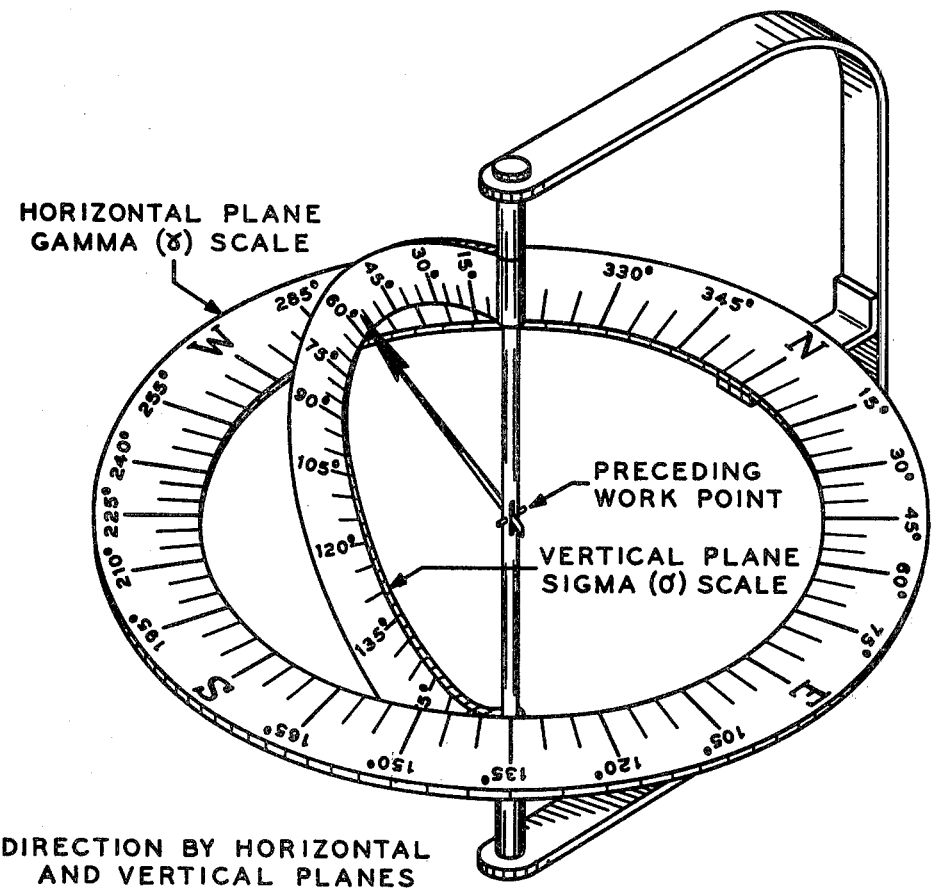

FIGS. 23 and 24 illustrate the mathematical modeling concepts useful in carrying out the present invention; FIG. 23 illustrating adjacent points in space with their appropriate spacial coordinates.

FIGS. 25, 26, 27 and 28 illustrate the concept of utilizing workpoints in which sets of workpoints are used to describe spacial characteristics and/or structural characteristics of key data of the three-dimensional pipeline to be displayed.

FIGS. 29a, 29b, 29c, 29d, 29e and 29f illustrate workpoint locations for selected pipeline items.

Figure 29A:
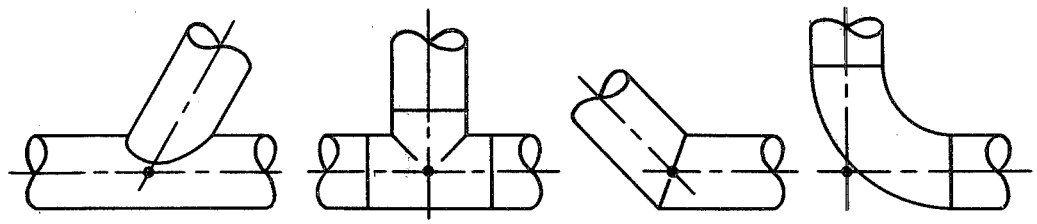
Figure 29B:
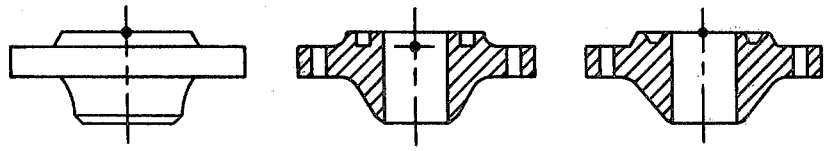
Figure 29C:
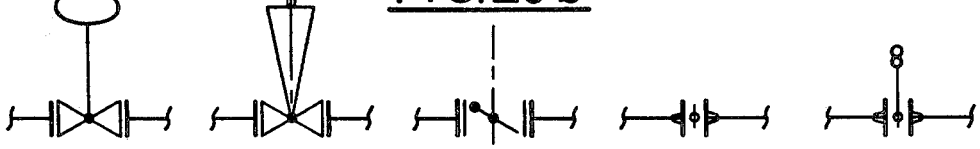
Figure 29D:
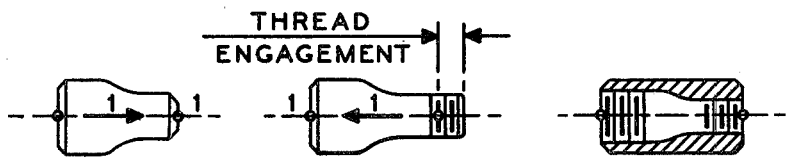
Figure 29E:
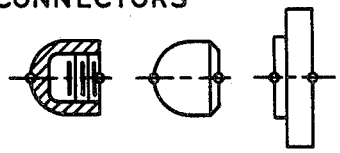
Figure 29F:
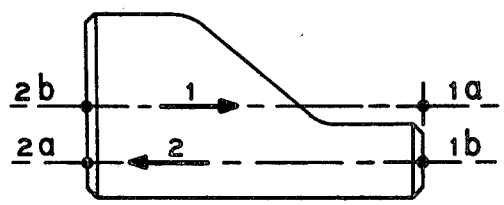
Figure 30:
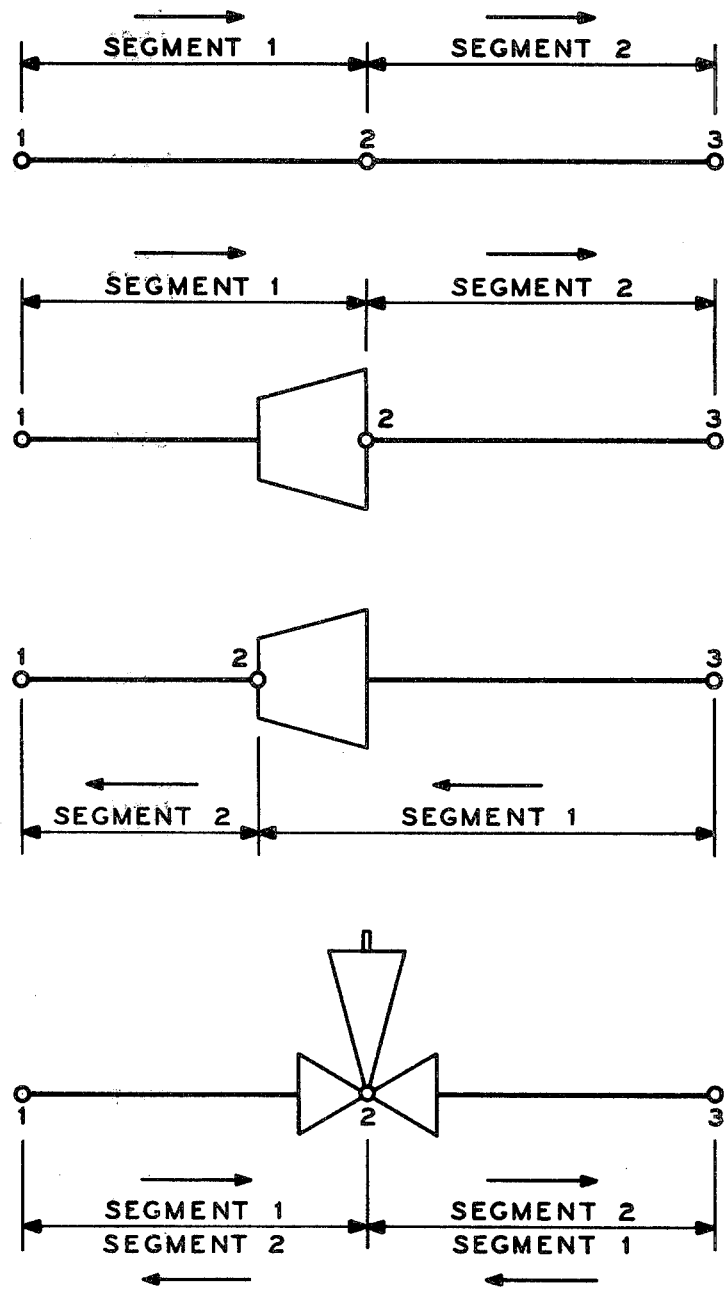

FIG. 30 illustrates the flexibility of using the workpoint sequence and location system of FIGS. 29a–29f.

Figure 31:
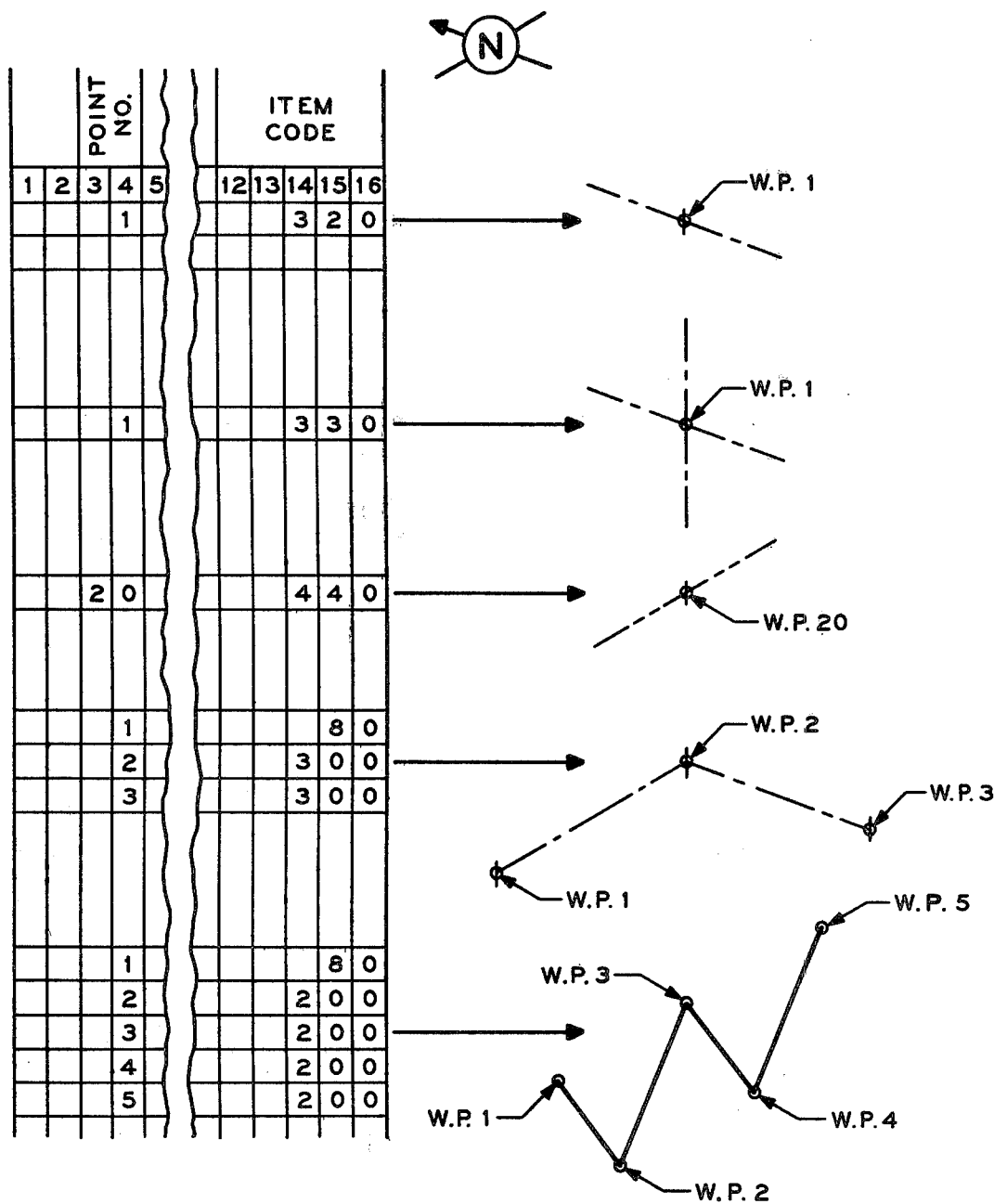

FIGS. 31 and 32 illustrate symbol codes useful in producing correct display command signals.

Figure 33:
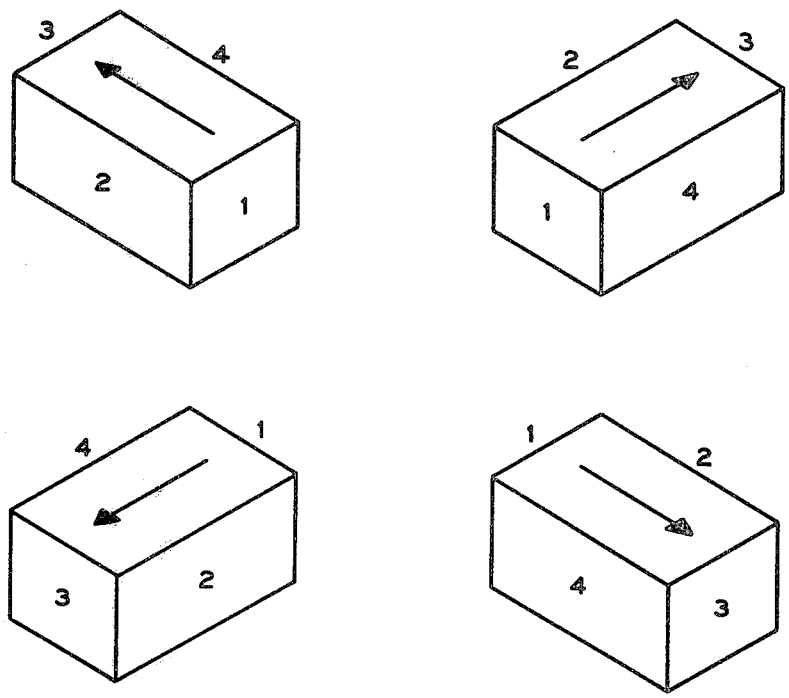

FIG. 33 illustrates a subroutine called "Best View" which selects the best view for each isometric drawing based on an algorithm based on calculated vertical and horizontal distances described by one of four possible views.

Figure 34:
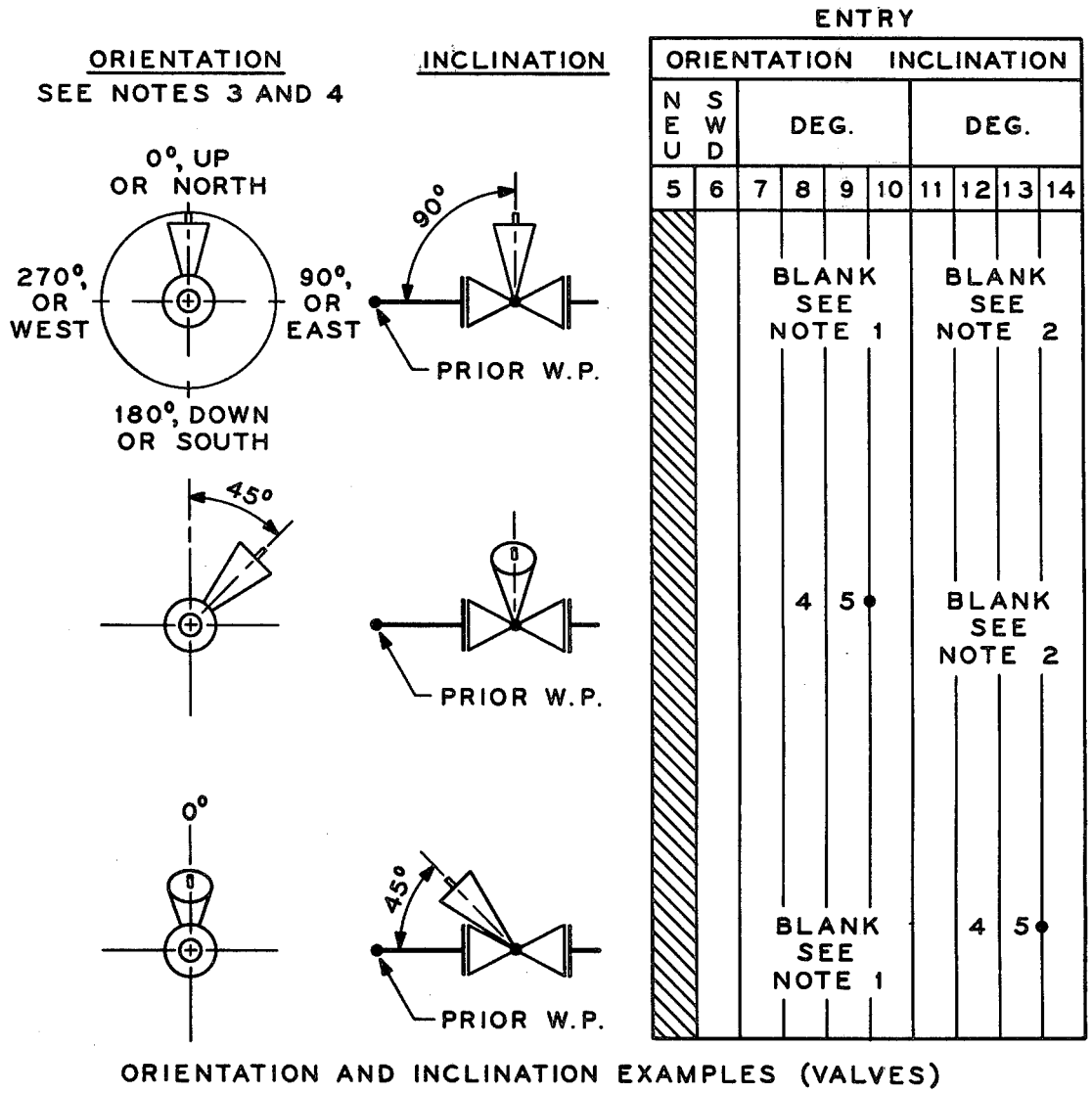

FIG. 34 illustrates the coding of selected piping items for correct orientation and inclination in the final display.

Figure 35:
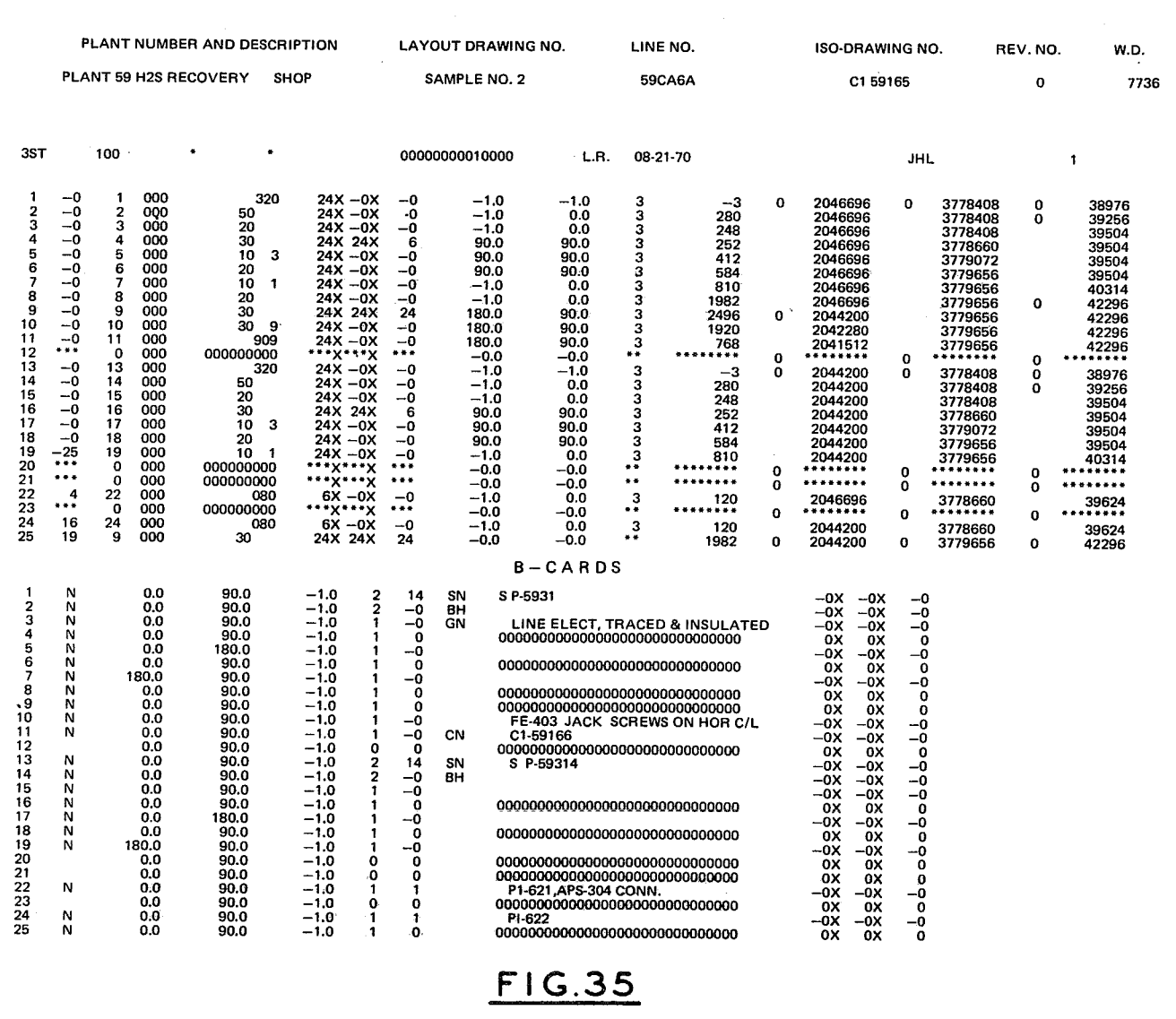

FIGS. 35 and 36 represent manipulated data arrays within the central processor of the computer of the present invention; the data array of FIG. 35 occurring first in time illustrating calculation of three-dimensional coordinates of encoded data and FIG. 36 occurring later in time illustrating the concept of generated mating (non-zero) workpoints, as well as indicating subscripts useful in calling appropriate data related to the dimensional data file or the piping specification file from the central processor.

FIG. 37 illustrates a printout of the list of materials provided by the input sheet of FIG. 18; the list of materials then being augmented through the use of the material items short description file before printout into the final form illustrated in FIG. 20.

FIG. 38 illustrates a classification index useful in the material item numbering system of the present invention for monitoring material items required and purchased for a given piping project.

FIG. 39 is a further aspect of the classification index of FIG. 38.

Figure 40:
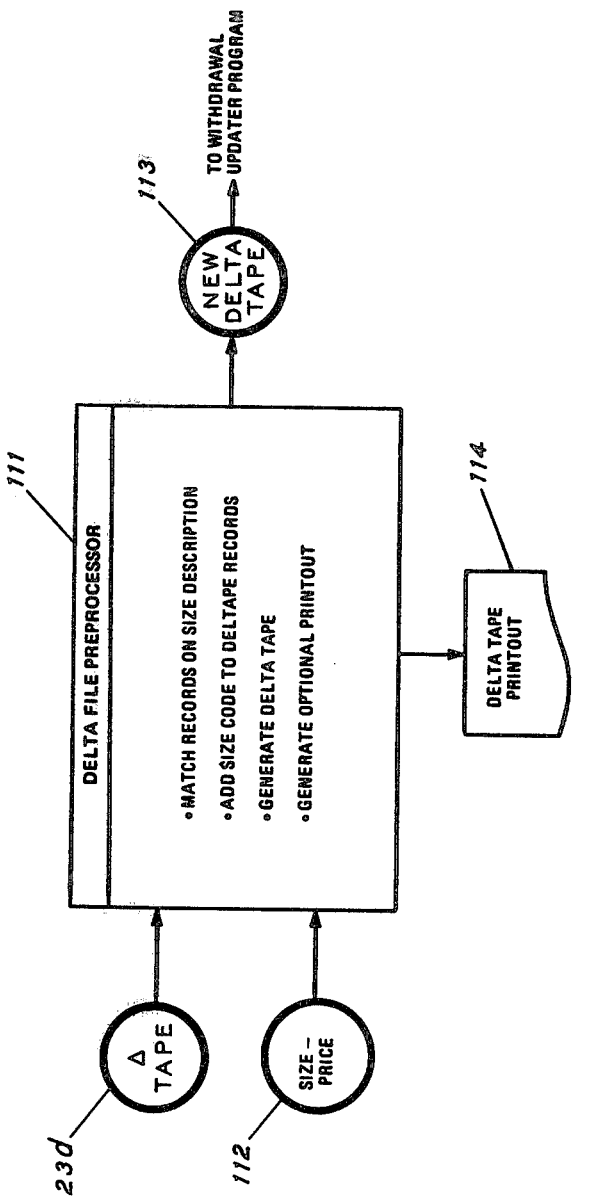

FIG. 40 is a block diagram of a delta file preprocessor useful in updating information useful in monitoring the material items by the classification code of FIG. 38.

Figure 41:
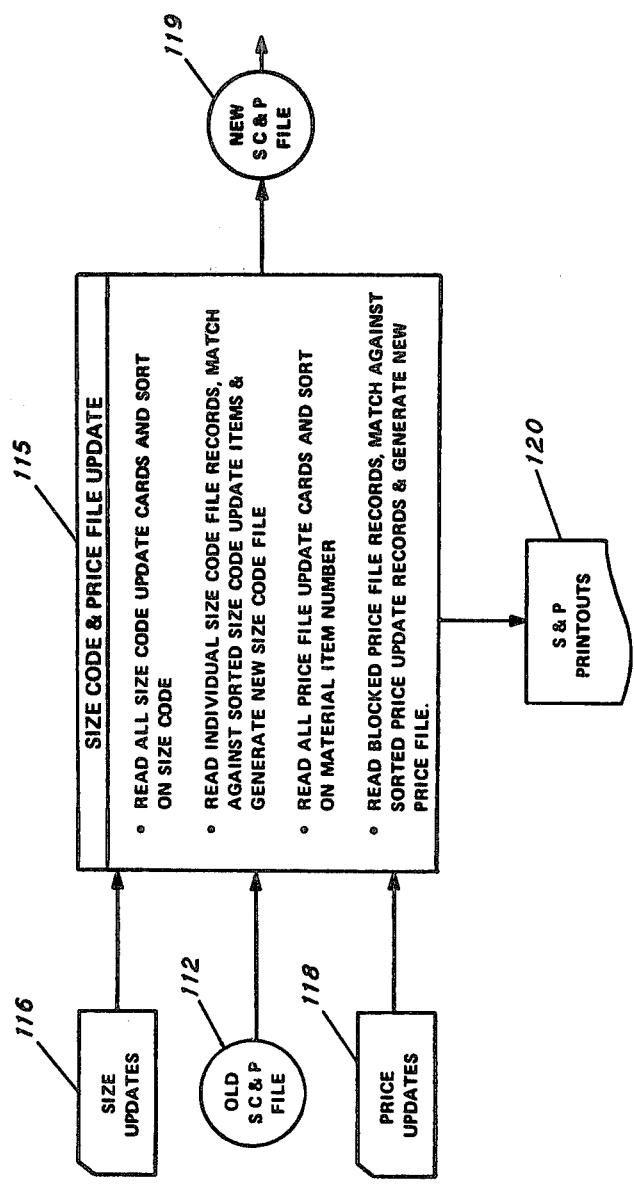

FIG. 41 is a block diagram of the size code and price file preprocessor for updating (as well as initially creating) records for matching the size code to material item number and vice versa.

FIGS. 42 and 43 are printouts of the preprocessor of FIG. 41.

Figure 44:
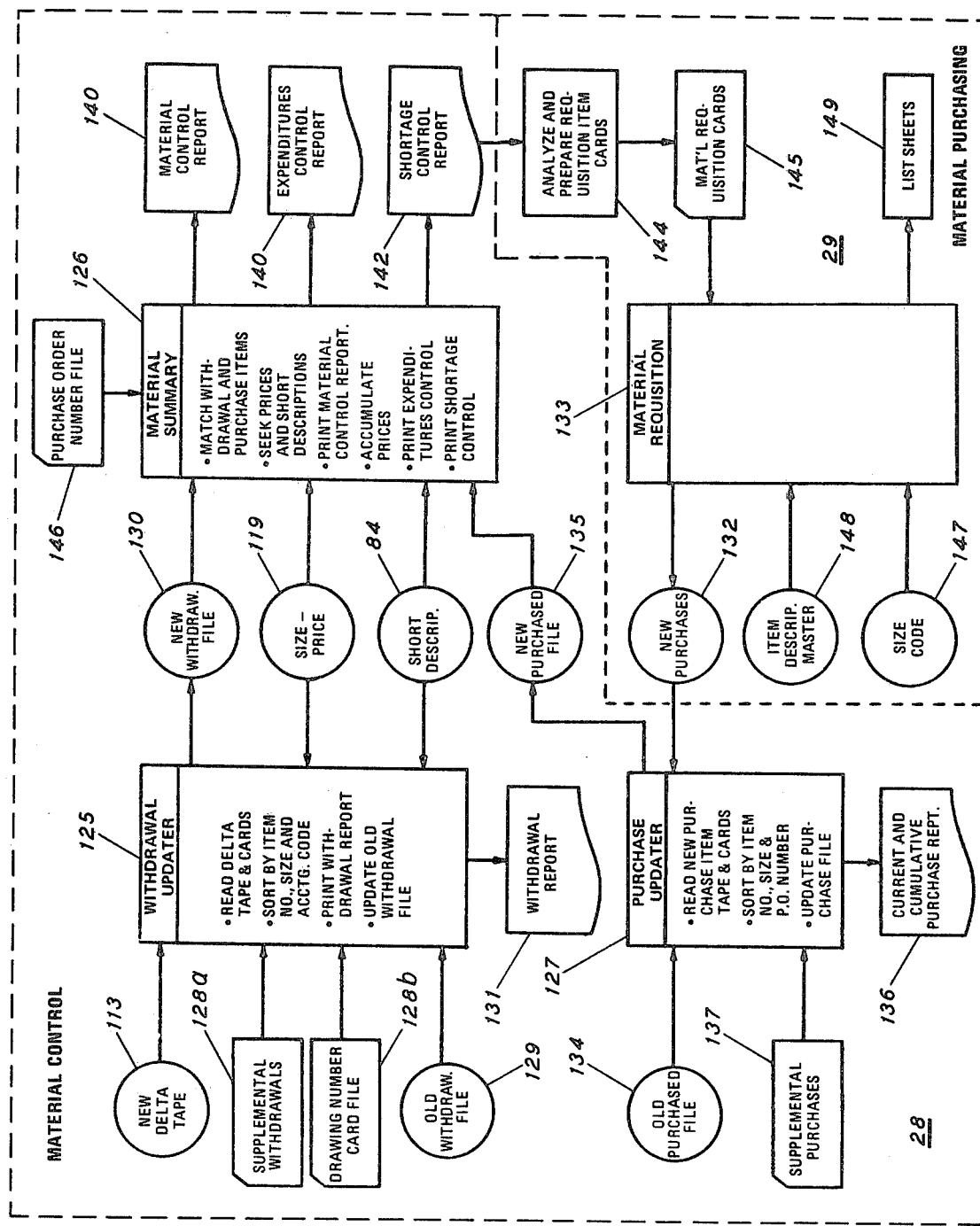

FIG. 44 is a block diagram of certain aspects of the computerized material control system means of the present invention, to wit: the material status information system and the material requisition system.

FIG. 45 is a printout of a withdrawal report generated by withdrawal update processor of the material status information system of FIG. 44.

FIGS. 46a and 46b are reports and file tapes, respectively, generated by the purchase update processor of the material status information system of FIG. 44.

FIGS. 47, 48 and 49 are reports generated by the material summary processor of the material status information system of FIG. 44.

Figure 50:
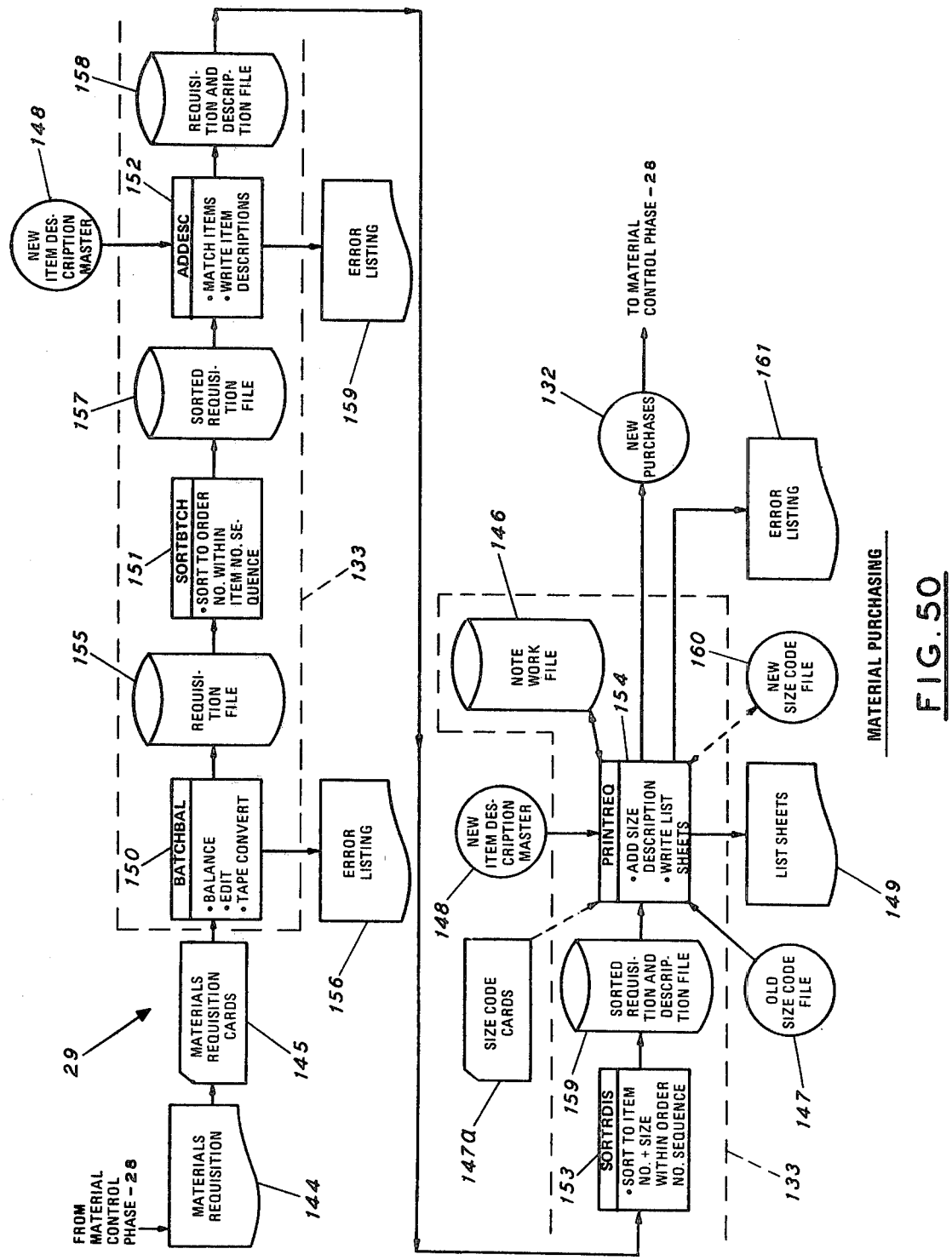

FIG. 50 is a block diagram illustrating, in more detail, the material requisition system of FIG. 44.

FIG. 51 illustrates the manner in which revisions of the material requisition system of FIG. 50 can be had.

FIG. 52 illustrates the format in which requisition data can be easily keypunched for use in the material requisition system of FIG. 50.

FIG. 53 is a list sheet report generated by a program called "printreq" of the material requisition system of FIG. 50.

FIG. 54 illustrates the manner in which a purchase order list sheet generated by the program "printreq" of the material requisition system of FIG. 50, can be revised.

FIG. 55 is a list sheet generated by the program "printreq" of the material requisition system of FIG. 50 illustrating the manner in which notes for attachment to purchase orders can be automatically generated.

Figure 56:
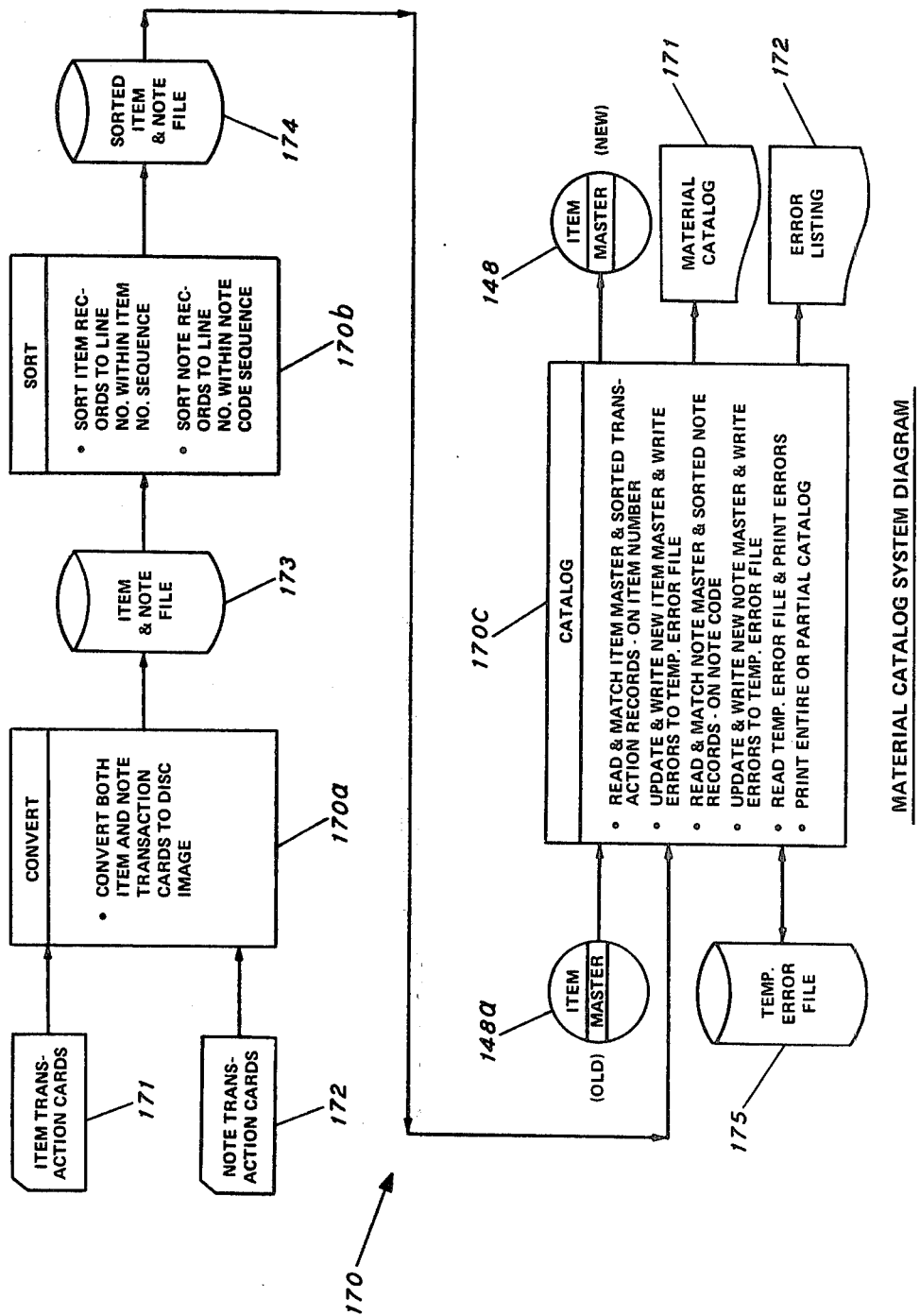

FIG. 56 is a block diagram of a material catalog system useful in the material requisition system of FIG. 50.

DESCRIPTION OF ONE EMBODIMENT OF THE INVENTION

Considerable effort is required to make a planar perspective representation of a set of points sufficient to characterize a complexly oriented pipeline, say for example, one having a series of 90° elevational changes with several loops also indicated. Where it is desired to change the viewpoint of the observer from among a set of four observation points, the task can be even more difficult even though the coordinate positions of the points can be readily determined by scaling or the like.

Still greater difficulties must be surmounted to make as planar, perspective representation of a set of non-coplanar points where each object to be displayed must be selected based upon external design standards. Features of dominant interest concerning a pipeline can be highlighted to a desired degree of accuracy by judicious selection of pairs of points connected by straight-line segments if sufficient flexibility is attended the selection process.

The present invention provides a novel computer-aided graphics system which will provide an easy-to-understand input and output coding system capable of being used by a piping draftsman, the final display being a drawing of a two-dimensional representation of the three-dimensional pipeline with all attendant selection and isometric coordinate calculations automatically provided for through the use of a properly programmed digital computer. Further, the present invention provides a digital computer routine that will (in conjunction with a general purpose digital computer and the provision of positional data of a sequence of points) produce an output definitive of the two-dimensional positions of the corresponding sequence of points of the planar representation of given points of a pipeline in which equipment symbols from data arrays within the memory of the computer are correctly selected. An additional aim of the present invention provides a routine which will include selectively-operable subroutines for determining if the character of the planar representation is best in view of predetermined selection requirements. Yet another aim of the invention in accordance with the preceding aims provides routines that will produce sets of output data characterizing representation useful in materials control and purchasing of items set forth in the list of materials of each pipeline representation.

Figure 1:
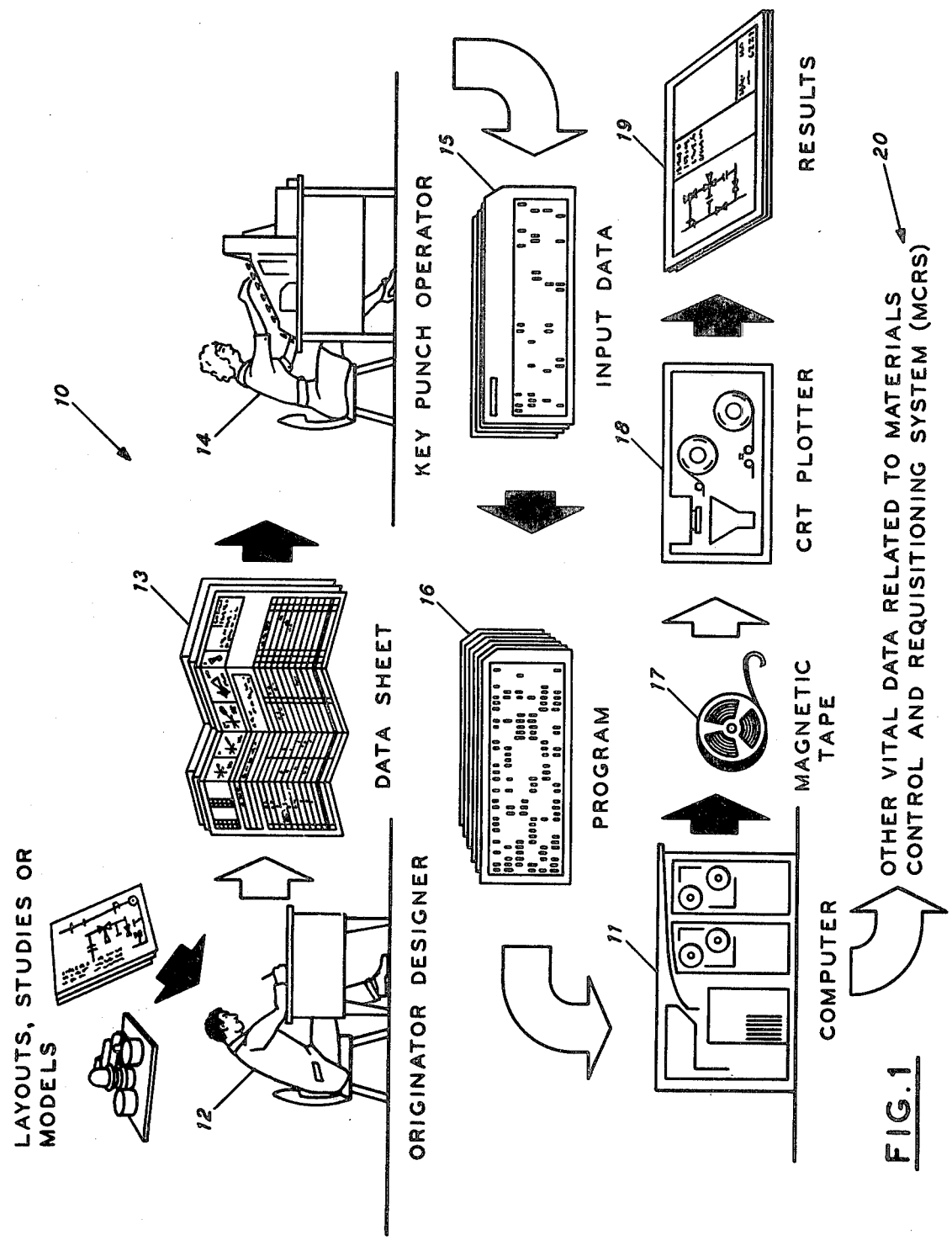
FIG. 1 is a block diagram of the computer-aided graphics system of the present invention.

Attention is now directed to FIG. 1. There is shown an all-over illustratiion of one embodiment of the present invention in the form of a computer graphics system 10. Subsequent sections of this application will describe principal features in greater detail and illustrate how each particular section contributes to the all-over effectiveness of the system.

As shown, computer 11 is typically a large general purpose computer such as an IBM 7094 or IBM 36 0/65 having a central processor, a large high-speed memory and an input-output device or devices controlled by a central controller. In order to provide data for preparation of an isometric drawing, FIG. 1 depicts an originator-designer 12 who studies all available two-dimensional layout drawings and three-dimensional models of the pipeline to be described, and then encodes data on a data sheet 13 in a selected format as described in detail hereinafter. Keypunch operator 14 keypunches the data into a binary codable format as a card deck 15, which is combined with the system program deck 16; the deck 16 is then read into the computer in accordance with commands from the central controller. Through operation of the computer 11, control signals are generated for manipulating the input data mostly in real time, i.e. quickly. It should be recalled that the program deck specifically controls operation in several ways: by specifically authorizing certain operations; by calls for input or output functions; by alternating flows of controls so that groups of statements can then be executed repeatedly or the sequence otherwise changed; as well as the insertion of certain statments which provide information without requiring further computation. As changes in the data occur to accumulation of results within the computer the output device can be controlled to provide a magnetic tape 17 onto which have been read plotting signals for use in conjunction with a well-known CRT plotter 18 such as an SC-4060 CRT plotter to produce an isometric drawing 19. Other data can also be outputted from the computer through its I/O device using conventional printing or punching devices, such data being generally indicated by numeral 20. The method of picture formation in the CRT plotter 18 is point plotting on 1024×1024 raster. Lines and characters are formed from closely spaced points. Thus the display is classed as a dot or point display.

HARDWARE

The central processor, see computer 11, acts in response to data signals generated by the I/O device or by control signals from the controller. These signals activate programs in the computer memory. In executing the program or programs, digital words—say a 32-bit word—are accessed from the memory and temporarily stored in the central processor. There, the operational code and arguments are interpreted and the appropriate action (such as add, shift, accumulate, load, store, control, print, etc.) is performed. As a result, sequence of data arrays is generated within the central processor and provide all information needed to display the three-dimensional pipeline as a planar representation. A series of display command signals can be generated which can be recorded on magnetic tape 17 for later loading into plotter 18.

Plotter 18 is a cathode ray device such as a SC-4020 or SC-4060 (Stromberg Datagraphics) or FR-80 (Information International). These devices convert the plotting tape data signals into lines and letters and record the information into microfilm at high speed. It takes about two seconds to complete the two frames of information that make up the isometric drawings of the present invention. The visual enlargement to a complete engineering drawing is an enlargement on paper vellum of the two film frames. The left-hand frame, for example, portrays the actual isometric drawing with a list of materials, notes and references and data and titles contained in the right-hand frame. The exact size of the drawing depends on a number of different factors including the make of the plotting device and the type of film, either 16 or 35 mm. film.

Internal Coordinate System - Raster Area

All points, lines and curves occurring in the three-dimensional space are transposed into the two-dimensional (isometric) space by the computer 11, and then, as are all items to be displayed on the cathode ray tube, they are fitted into a coordinate system with a finite number of locatable points. The plotter beam is deflected to a selected position on the tube face. The deflection circuitry allows the beam to be deflected to the limited number of positions, called rasters.

A square raster area of 1024×1024 addressable positions is used in the present invention. One may consider the (0,0) point as being on the lower left-hand corner and the (1023,1023) point in the upper right-hand corner.

Left Frame—Pictorial Representation

Isometric Projection

In the standard projection, the isometric axes from three equal angles, 120°, with each other. The plotter 18 under instructions has modified this slightly by rotating the axis representing the Y-axis direction 10 degrees closer to the vertical Z-axis. The observation point is assumed to be at infinity although modifications as taught, for example in U.S. Pat. No. 3,519,997, for "Planar Illustration Method and Apparatus", W. D. Bernhart et al. can be used.

Dimensioning

Dimensioning follows industry-wide standards. Linear dimensions are grouped close to the items in a continuous string.

Scale

Contrary to manually prepared piping isometrics, the isometric of the present invention is drawn to scale, i.e., the linear dimension parallel to the three major axes are reduced by the same scale factor. The scale factor is constant for a particular drawing only, and varies with each isometric. The system utilizes the available drawing space (about 8"×8"), as far as possible, expanding smaller and reducing larger piping configurations. Accordingly, overall dimensions, height and width, determine the actual drawing proportion.

CODES

In reliance upon the analogy that control logic can be most appropriately illustrated from the input, output and intermediate data character, a detailed discussion of the data structure will now be presented.

Overall cooperation of card and tape input data to the computer 11 is shown in FIG. 2. The originator-designer starts the problem by coding data onto data sheet 13 from which punched cards 15 are provided. At processing time, the computer has been loaded with associated inputs via magnetic tape, to wit: magnetic tape 22a, containing input data arrays, relates to selection tables for piping items to be used and design of pipelines having specified standards to meet, magnetic tape 22b to dimensional data of the piping items; and magnetic tape 22c relates to a short description data file useful in providing easy-to-understand symbols for the final display. When an isometric drawing is to be revised, an additional magnetic tape 22d can be utilized to input the "old" list of materials for each isometric so that as changes are made, the "new" list of materials can reflect these changes.

These data bases are placed in memory within the computer, then fetched and manipulated by the control processor as needed to provide the desired function. It should be kept in mind that the information stored within the computer may be at least two types: stored graphical data, which has been inputted by either card or magnetic tape as shown in FIG. 2 in various stages of array selection, as well as programmed instructions for operating on this data for fetching, sorting, and accumulating changes in the data. As a result of such supervisory program, the following output definitions are provided: editing of the input data via printout 23a; item numbers location from the standard file; determination of dimensions of valves and other fittings; completion of the coordinate system in space; scaling as required; converting three-dimensional coordinates to isometric coordinates; selecting the best view for plotting; indicating drawing symbols for drawing vectors with proper weights, and selecting and drawing of dimension lines and leaders; finding available space for annotation and drawing notes, references; preparing lists of materials and generating plotter signals, as by tape 23b; and comparing lists of materials from previous revision, if any, in entering net changes in quantities as separate output functions, if needed, as by means of tapes 23c and 23d.

I/O device of computer 11 provides the plotter tape 23b, as well as additional magnetic tapes 23c and 23d used in various control functions of the system of the present invention, as for example as depicted in FIG. 3. For example, the tapes can be utilized in a material file preprocessor 27, then within material status information system 28, and finally in a requisition system 29 so as to adequately control all phases of storing and purchasing items to be used in construction of a pipeline system.

The following sections describe the structure of the data input to the computer 11 in still more detail.

Magnetic Tape File Inputs

All graphical information is stored within the central processor of the computer in the form of data words or sequences of data signals in the form of voltage levels, maagnetization states, etc. In general, the function of data on tapes 22a, 22b, and 22c is to provide information for selection of materials, dimensions and weights of piping items and descriptions thereof. Although the present invention specifies these files be on magnetic tapes, magnetic disk files can also be used.

Piping Specification File (Tape 22a)

The piping specification file is for the exclusive use of the user to allow him to attach appropriate instructional notes and to aid in the correct selection of piping items in view of service conditions of the piping system. Upon presentation by the user-designer of the correct code, the system will select the required item for the specification file and aid in specifying the correct usage of the item within the pipeline system. The piping specification file is unique for each project since it contains the specific material selections and design instructions for the plans being designed. This file is used by the computer to provide the intelligence for selection of appropriate piping items from a coded input by the designer. It also provides title information for the isometric drawing blocks, as well as provides information for branching reinforcement, change in directions (elbows, miters, and so forth), valve temperature limitations and groupings of materials for shop fabrication, or field erection.

Figure 4:
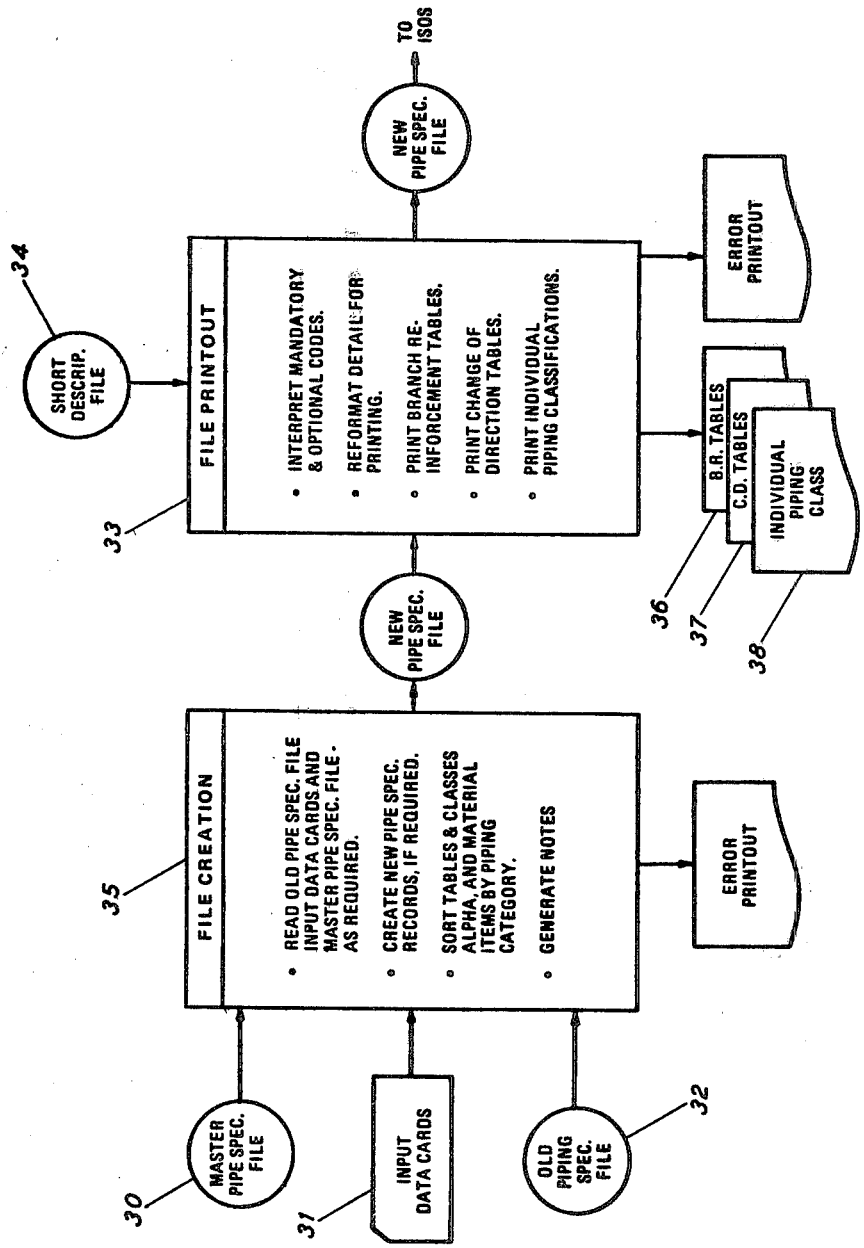
FIG. 4 is a block diagram illustrating creation and updating of a piping specification file for use in the present invention.

Before proceeding with a detailed description of the method of utilizing the piping specification file, a brief description of the method of creating such a file may be instructive. Briefly, as shown in FIG. 4, a piping specification file can be created from a number of sources. For example, a master piping specification file such as a magnetic tape 30 can be used. Similarly, a complete input data card can be created as illustrated by card symbol 31; similarly an old piping specification file can also be used, which is more up to date and more in line with the present project such as symbolized by magnetic tape input 32. Within the computer, a file is created symbolized by block 35 in which various sort tables and decisional tables can be created by piping categories. Similarly, notes can be generated of a particular nature. File printout 33 is accomplished using a printer after the new piping specification file has been inputted thereto in parallel with a short description file 34 to be described hereinafter. File printout 33 is under control of the central processor of the computer in combination with the I/O controller so as to interpret mandatory optional codes, if any, provide brief format and detail for printing, as well as print branch reinforcement tables, branch change of direction tables, and branch individual piping classifications, as required. Printout sheets are illustrated as numerals 36, 37 and 38.

FIGS. 5, 6 and 7 illustrate these printouts in more detail. As shown in FIG. 5, the branch reinforcement tables consist of a series of decisional tables which provide data for 90° intersections by specifying the type of connection between the pipe header and the branch that is required. These tables are used automatically by the system to select the desired item from those listed on the applicable section of the individual classifications. As shown, the relevant abscissa and ordinant designations (row and columns) are branch size and run size. Only a few general tables are usually required to serve all the piping classifications.

FIG. 6 illustrates the printout of the individual piping classification sheets. As shown, the data is arranged in rows and columns. The rows along the left-hand side of FIG. 6, for example, are based upon the size of the pipe. The second column establishes an item number in alphanumeric format. The third column specifies a selection code to be utilized in the selection of individual fittings and valves. The fourth column specifies the description of the particular item number, and in printing out such a designation the short description file of FIG. 4 is utilized. The fifth column specifies notes of interest. Several features are worthy of additional comment. The selection code serves three purposes:

(i) Its value must be carefully chosen. For each group of materials listed on the classification sheets, there must be only one series of items that has the same selection code number. There can be no duplication of selection codes within a size range. For example, all first choice block valves, regardless of size, must be given selection code 1. If in changing sizes, different valves become first choice, it gets the selection code 1: the first use of the selection code is indicated to the computer which item is to be chosen in categories where a choice of similar items of a similar nature can be had. Except for categories where the selection is made on the basis of different criteria, for example, junction and change of direction, the system will automatically choose the proper type of item within the smallest selection code.

(ii) Many times the designer himself will want to select an item for use. Of course, he can enter the complete item number to do so. In order to simplify this task and reduce the possibility of error when writing the item number on the design sheet, the designer should enter the selection code on his data sheet. In the example above, the designer could select a two and one-half inch plug valve by entering either the item number L24BA3GB or utilizing the selection code 4 for valves for that diameter.

(iii) The third use of the selection code is to aid the computer in properly analyzing requirements of the piping system. In order to detect items other than elbows that denote a change in direction, elevation, etc., the selection code is adjusted to a number greater than 100, for example, number 205 for an angle valve having item number L23JAODF; thus the program will sense that the item so referenced is a straight-through item such as a gate valve or a tee. Instructions can, therefore, then be made within the program to utilize such information.

As a general requirement, exact size must be available for each item. If a gate valve is to be used under two size designations, it must be listed twice in the piping classification illustrated in FIG. 6.

Also of interest in the data printout depicted in FIG. 6 are the following:

(i) The temperature limit for each valve selected from the specification is checked against the line temperature limitation shown in FIG. 6. Although the valve temperature limit will not appear on the regular printout, it is part of the valve data stored within the pipe specification file;

(ii) Asterisks will appear in the classification at certain locations indicating the bore of flanges, as in connections of nipples and the like. The purpose of the asterisk is to allow the program to fill that space with the required character to properly complete the item number. As will be explained later on, if two styles of gear operator are available, further designer coded information will be utilized by the program to make the proper gear operator choice.

(iii) Mandatory notes have been developed for printout on all isometrics. These are listed as Notes 1-8 in FIG. 6. Additional notes can be added as required, as illustrated in the latter-appearing column of FIG. 6.

FIG. 7 illustrates the change of direction tables which provide data for directional changes from 0° to 90° by specifying fittings for fabrication types. As shown, there are groups of tables A through C, the first column of which specifies the size, the remaining columns are specified in angle of change of direction. These tables are used by the computer to select the desired item from those listed for utilization in the final display. Only a few general tables will be required to serve all the classifications.

Material Items Dimensional Data File (Tape 22b)

Figure 8:
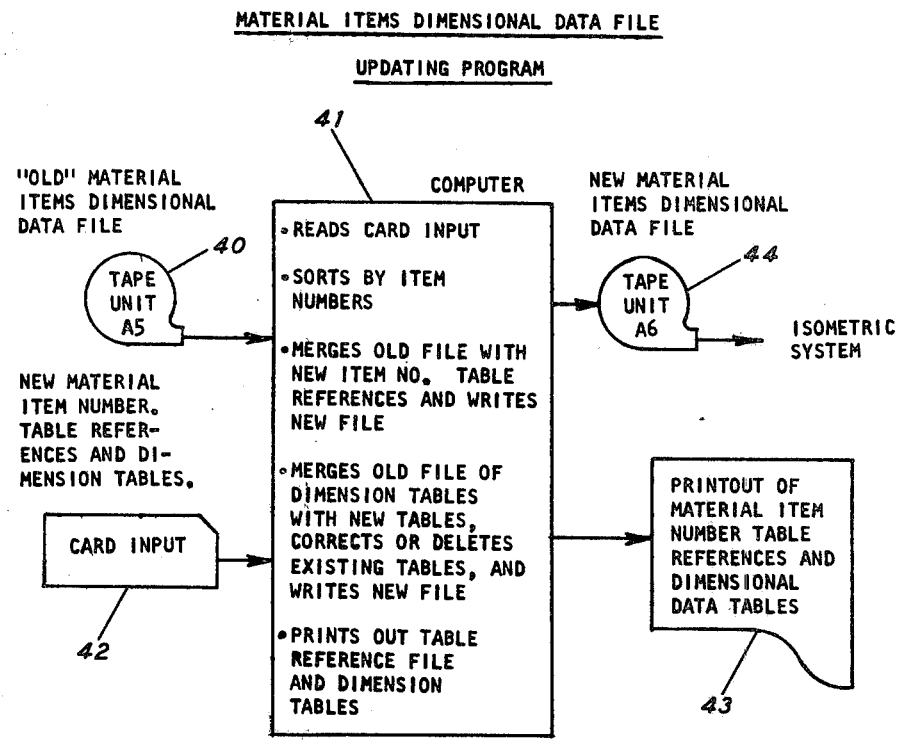
FIG. 8 is a block diagram of a program for updating the dimensional data file useful in the graphic system of the present invention.

In addition to the piping specification file, material items dimensional data file is also inputted into the computer. Such a file contains dimensions, weights, symbol codes and connection indices for piping materials including control valves for all standard sizes generally used for refinery process plants. This file is common for all projects; it contains data for many more material items than will be used in any one project. This file is used by the computer to provide dimensions and symbol codes of material items so that material symbols can be drawn to scale and isometric drawings properly dimensioned. This saves the designer much time in looking up and entering exact dimensions in the input data sheet for piping items. It also provides weights of pipe and piping materials to allow the system to calculate empty and full weights of the pipeline needed in designing pipe support. Although the data is more often than not structure within the memory of the computer without a printout being made, a printout can be obtained when such a file is created or when such a file is updated in order to check for errors. With regards to the latter, FIG. 8 illustrates how the material items dimensinal data file can be updated. As shown, a tape unit 40 inputs old material items and dimensional data into the central processor 41 of the computer. Also new material items, table references and dimensional tables can be entered by card input 42. Within the processor, the card inputs are read and sorted by item numbers. The old item file numbers are merged with the new item numbers and table references and new files are written. Also, new dimensional tables are merged, corrections or deletions are made and a new file is written. A printout of the table references and dimensional table can also be obtained as printout 43 The new material dimensional data file is outputted on magnetic tape 44 for further use in the system.

FIGS. 9, 10a and 10b illustrate the data structure of the material items dimensional data file. As indicated, that consists of logical files placed within the processor: an item number reference table file as illustrated in FIG. 9, a series of tables, one of which being illustrated in FIG. 10a and another in FIG. 10b. These files provide the information to completely describe the material item to the computer system given the item number or the nominal size of the item.

For example, as shown in FIG. 9 the left column is entitled "Item Number" and lists the item number as an alphanumeric item. Columns 2 and 3 relate to a connection code and to a drawing symbol code, respectively. The remaining columns specify dimensional tables and subroutine references. The Item Number Reference Table of FIG. 9 has several important features: the drawing symbol code specifies the symbol that is to be used to represent a particular item in the final isometric drawing. The number of dimensions and other information expected from the material items dimensional data file and the order in which these data are supplied are determined from the connection index and a drawing symbol code. As shown, the connection code contains one digit, either a 1 or a 2, while the drawing symbol code can either be a 1, 2, 3 or 4 digit code, the order of which has specific requirements in both accumulation of data within the computer as well as specifying drawing symbols at the output. Before proceeding with the detailed description of the method of utilizing the drawing symbol code, a brief description of the method of creating such a code may be instructive.

Drawing Symbol Code

In general, piping engineering has developed schematic symbols for the representation of valves, fittings and pipe. Pipe, for example, is represented simply by a single straight heavy line. Gate or globe valve body symbols resemble the letter "X" with its ends closed. Although these symbols neglect many of the features making up the piping item, they must depict certain dimensional properties within accurate engineering standards true to scale and in proper perspective. For example, for the valve symbol the face-to-face dimension, the stem height and the handle width, and even the outside diameter of the end connections are drawn to scale. The valve body on the other hand is schematic and fails to indicate features like a bonnet but rather indicates valve type which is important. From a drawing standpoint, the position of any item may affect the appearance of the symbol. Non-symmetrical items require at least two symbols. It is for this reason that the concept of a data set containing all symbols in their possible positions was not used in the present invention. The drawing symbol code in accordance with the present invention contains all the information in the form of 1 to 4 digits. Since this concept is basic to efficient utilization of the invention, the method of creating the codes will now be described in some detail. First, however, since the system creates symbols which are not piping items, such as center lines and match lines, drawing symbols are first classified in accordance with material and non-material functions.

Material Drawing Symbol Code

The material drawing symbol code is generated with respect to a certain group of piping items. Within this group, the symbol itself remains unchanged. Any further variations are dimensional and are mostly due to factors like size and rating. All the dimensional information is kept in the material items dimensional data file. The drawing symbol code is part of these data. For example, in FIG. 10b, the drawing symbol code for a gate valve is 122. The drawing symbol code is in the third column of that Figure and is specific to a particular piping item within the data bank. However, non-material drawing symbol data are part of the memory of the computer system and are not stored in the dimensional data file.

Material drawing symbol codes are illustrated in detail in FIGS. 11–13.

As shown in FIG. 11, the symbol code is a combination of three logical parts, a primary symbol digit located at digit position 50, the secondary symbol located at positions 51 and 52, and the multiplier digit located at position 53. In the drawing symbol code for the gate valve then, which is 122, the secondary symbol is 1, the primary symbol is 2, and the multiplier is 2. The primary symbol is the basic building block which forms along or in groups the essential part of the drawing symbol and is always directed along the path to straight lines as determined by the originator-designer in his description of the three-dimensional piping system. Since it is positioned by the piping path, the primary symbol code is generated with respect to the piping path to the straight line through the symbol whether or not it changes direction. In this regard an angle valve and a regular straight-through valve would have the same primary symbol code.

The reason for the primary and multiplier symbols is that when we analyze piping drawing symbols, the distinction can be made between parts which are continuation of and connected to the pipe and parts which furnish additional information and are not directly connected to the pipe. In the case of the valve, it is the valve body symbol which is a continuation of the pipe run, while the handwheel symbol shows the rotation position of the valve only. Without the valve body symbol, the piping run would be interrupted, showing a break in the line. This is not so with the handwheel symbol: its presence or absence does not affect the continuity of the piping run. In other words, it is the piping path to which the primary symbol refers.

However, more than one of the same primary symbols may make up the drawing symbol part along the path chosen. The number of primary symbols required to indicate such a condition is by the digit sequence of the multiplier. It must be at least "1" for all material drawing symbol codes. Its exact number depends on the function to which the particular code is being put. For example, on a valve, if we consider a central point at the center of the "X" of the valve, then the segments along the path are in either direction so that the multiplier would have the value of 2. In a similar manner, for a tee symbol, the multiplier equals "3." If the workpoint chosen is at either end of the symbol as for instance in flanges, connectors (reducers) and ends (caps, plugs), only one segment is used and the multiplier equals 1. The concept of workpoints is discussed in detail below. In FIG. 11, there are eight ranges of material primary symbols, 0 to 8. It also should be noted by the legend to the right of the Figure that a series of points are indicated as being at particular positions with respect to points of interest. In that legend, the symbol "o" is the non-zero workpoint, the symbol "□" is a zero workpoint and the symbol "⌑" is a non-zero or zero workpoint. The explanation of these zero workpoints, non-zero workpoints and non-zero or zero workpoints is set forth below. At the upper portion of the workpoint figure, the material primary symbols are illustrated with reference to that legend. For example, when the primary digit is "0," it represents a heavyweight straight line running along the designer's path of interest. The symbol "1" represents a heavyweight line normal to the path with its center located at workpoint 55. Between workpoint 55 and workpoint 49 there is a geographically empty space which usually is filled by the secondary symbol to be hereinafter explained. It can be used for a great variety, such as in the display of check and butterfly valves, screwed and socket weld elbows and strainers. The symbol "2" is in reality an isosceles triangle whose vertex is at 54. Point 54 is coincident with the designer's input workpoint for a valve as explained below. Its ends are connected by lightweight lines 56 and 57 to the point 54. It is used in all types of valves.

The primary symbol "3" represents the heavyweight line normal to the path centered at the workpoint of interest, workpoint 58. It is used for flanged, screwed and socket weld tees and crosses.

The primary symbol "4" represents two heavyweight lines 59 and 60 both normal to the path, their corresponding ends being connected by two heavyweight lines 61 and 62. In case of concentricity (ECC=0) only one non-zero point at 63 and one zero workpoint at 64 will appear, while in the case of eccentricity a workpoint will appear at 65.

The symbol "5" represents a hevy line 66 and is used in all types of flanges.

The symbol "6" represents an empty space along a path and is used for a gap in the drawing specifying a piping symbol as for a gasket. The secondary symbol will complete that piping symbol.

The symbol "7" represents a heavyweight line 67 projected normal to the path with its center at workpoint 68 forming the major axis of a semi-ellipse touching the other workpoint 69. It is used for pipe caps.

The symbol "8" represents a mediumweight line, a rectangle 70 whose opposite sides are centered at normal to the path. It is used for pipe plugs.

Material Secondary Symbols

Each secondary symbol is a building block very similar to the primary symbol. As shown in FIGS. 12 and 13, it has a definite "hinging" point through which it connects to the primary symbols to complete the drawing symbol representation. Three factors make it substantially different than the primary symbol: one secondary symbol is used per drawing symbol, it is not required for all drawing symbols, and position visually is not constant with respect to the piping path.

As shown in more detail in FIGS. 12 and 13, secondary symbol digit would occupy the positions 51 and 52. The system assigned the first two digits of the secondary symbol for a total of 99 different images. Their numeric code ranges from 1 to 99. The subject of whether or not a symbol is inclined or oriented makes primary use of the secondary symbol. Most of the secondary symbols can be inclined or oriented, for example, we find that secondary symbols "1-7," "9," "10," and "16" and "17" of FIGS. 12 and 13 can be either inclined or oriented. In this regard, the piping paths of the axis of rotation for orientation is the basis for calculation for the angle of inclination.

Secondary symbols "8," "11-15" and "20, 21" of FIGS. 12 and 13 can neither be oriented nor inclined. They are used with the exception of symbol "15" to fill in the gaps generated by the primary symbol "6" of FIG. 11. To further describe the codes of the present invention, consider the following example: a drawing symbol code "1162." That symbol code represents a butt-weld elbow whose ends are fixed by the zero workpoint. The secondary symbols of FIGS. 12 and 13 are utilized as follows:

| | |
|---|---|
| 00 | Indicates that a secondary symbol is not used. |
| 01 | Indicates stem and handwheel of handwheel-operated valve, either rising or non-rising stem. Example: Flanged Gate Valve 122. |
| 02 | Indicates shank of wrench or lever-operated valve. Example: Screwed Plug Code 222. |
| 03 | Indicates cap of spring assembly for safety relief valves. Example: Flanged Relief Valve 322. |
| 04 | Indicates diaphragm of control valves. Example: Flanged Control Valve 422. |
| 05 | Indicates hinged flapper of check valve. Not affected by orientation. Example: Flanged Swing Check Valve 522. |
| 06 | Indicates "water leg" of strainer. Example: Screwed Y-Type Strainer 612. |
| 07 | Indicates heavy line (projected circle), showing the outside of the union nut. Not affected by orientation. Example: Screwed Union 712. |
| 08 | Indicates the outline of a boss or weldolet. The line located by the non-zero workpoint is normal to the path (branch) and represents a projected circle. Not affected by orientation and inclination. Example: Weldolet 861. |
| 09 | Indicates stem and 20" handwheel of a bevel gear-operated valve. Example: Flanged Bevel Gear-Operated Globe Valve 922. |
| 10 | Indicates stem and 20" handwheel of a spur gear-operated valve. Example: Flanged Spur Gear-Operated Gate Valve 1022. |
| 11 | Indicates an arc representing elbow or bend. Not affected by orientation and inclination. Example: Butt Weld Elbow 1162. |
| 12 | Indicates an arc with a tangent on both ends representing elbow or bend. Not affected by orientation and inclination. Example: Screwed Elbow 1212. |
| 13 | Indicates the outline of a reducing elbow. The two faces, located by the non-zero workpoints, are normal to the path and represent projected circles. Not affected by orientation and inclination. Example: Butt Weld Reducing Elbow 1362. |
| 14 | Indicates the outline of a reducing elbow with tangents on each end. The two faces, located at the start of tangent, are normal to the path and represent projected circles. Not affected by orientation and inclination. Example: Flanged Reducing Elbow 1412. |
| 15 | Indicates schematically a reinforcing saddle, located at the point of junction and parallel to the header and branch. Not affected by orientation and inclination. All of its dimensions are contained in the system's programs. Saddles are not stored in the material items dimensional data file. Example: Weld Saddle 1503. |
| 16 | Indicates shank of wrench or lever-operated valve and the symbol of a butterfly valve. Example: Flanged Butterfly Valve 1612. |
| 17 | Indicates stem and 12" handwheel of a bevel gear-operated valve, and the symbol of a butterfly valve. Example: Flanged Gear-Operated Butterfly Valve 1712. |
| 18 | Indicates a "double miter". Not affected by orientation and inclination. Example: Butt Weld Double Miter 1862. |
| 19 | Not assigned. |
| 20 | Will generate "mark number" inside circle pointing to the item for categories not automatically provided. Example: Spectacle Blind 2062. |
| 21 | Will generate reference to a note, provided through input for this item, by inserting the note number inside small box. It is used for all special or non-standard items where standard piping symbols might be misleading. |

-continued

Example: Flanged 900 lb. Ball Valve 2122.
22–99 Not assigned.

Non-Material Symbol Codes

Non-material symbol codes are represented in FIGS. 14 and 15. As indicated in FIG. 14 and in FIG. 15, the primary symbol digit for non-material items is at digit position 70 while digit positions 71 and 72 are occupied by secondary symbols. The multiplier position is always zero as shown. As the name indicates, the non-material symbol code is not connected to any material item. while the system of the present invention finds the drawing symbol code for each material item in the material items dimensional data file, it receives the non-material symbol code through direct input by the originator-designer on his data sheet. Non-material symbols are therefore related to particular workpoints of the system, such as center lines, match lines and mathematical points. As far as the primary symbols "1–7" are concerned, they represent three basic lines and all their possible combinations. The basic lines are: a vertical line (Code 1), a north-south line (Code 2) and an east-west line (Code 4). By adding codes of lines to be combined we obtain the code for these combinations. For example, 2 (north-south) plus 4 (east-west) equals 6 (combinations of the two). The output, therefore, is an image as depicted in FIG. 14. The purpose of the secondary symbols of the non-material symbols as depicted in FIG. 15 is to specify to the system the type of graphic representation for the plotting of the primary symbol pattern. Presently there are only four types as illustrated.

In order to fully illustrate the codes used in carrying out the present invention, the concept of a data sequence code will now be described.

Data Sequence Code

Returning again to FIG. 10b, it is seen that the fourth column of that Figure is labeled "Data Sequence Numbers". Whenever the system needs information about essential characteristics of a piping material item it will search the material items dimensional data file and in that file it will fine a definite order of the stored data and position indicating its meaning. The primary status sequence corresponds to the order of entries in the item number table reference as depicted in FIG. 9.

| | | |
|---|---|---|
| (a) Column "2" | connection index, | |
| (b) Column "3" | drawing symbol, and | |
| (c) Columns "4–11" | 1 to 8 references to dimensional data subroutines or actual dimensions. | |

The sequence of this set of data is extremely important to finding each type of piping element. By designation, in column "2", the connection code "1" specifies a butt-welded connection, while the symbol "2" specifies a flange connection. The remaining columns 1–7 relate to dimensional table and subroutine references. A set of table numbers or rather references is seen to be associated with each material item number. These references specify the source of the dimensions, weights, and size reductions for a particular nominal size of the item. The reference may be to a dimensional table such as the one depicted in FIG. 10a which, as shown, contains a set of dimensions, weights or other information for a range of nominal pipe sizes and has a "call" code specified by table number as indicated by the note at the lower position of FIG. 10a. A dimensional code accompanies each dimensional set. It serves to identify the type of data in the table and to indicate how the data is to be used. The code is made up of three digits, the first denoting the dimension type, the second is the multiplier and the third is the divisor. The dimension type code indicates whether the dimensional set is a dimension in thirty-seconds of an inch (Codes 0, 1, 2) or a dimension in inches (Codes 3, 4 and 7) or a weight in pounds (Code 5) or a number representing size reductions (Code 6). The multiplier indicates the number of times the dimensional set is to be used. In addition, division may be required of the dimension in the table. In this case the code divisor will be indicated within the dimensional code.

To illustrate the primary and secondary dimensional sequence and the dimensions obtained from the dimensional data file, consider the following example:

A 6" flange gate valve with raised face, 150 lb. rating, carbon steel, bolted bonnet, 12 chrome trim, handwheel operated, item number L20BA3CA.

Extracts for the sequence illustrated for this valve are found in FIG. 10b and in FIG. 9 as depicted in Tables I and II below, respectively:

TABLE I

| Piping Item | Dwg. Symbol | Data Sequence No. | Data Item | Reference No. |
|---|---|---|---|---|
| VALVES | 122 | 1 | Length along path | 1 |
| (Handwheel- | | 2 | Length along path | 1 |
| Operated) | | 3 | Stem Height | 2 |
| Gate | | 4 | Handwheel Diameter | 2 |
| Globe | | 5 | Screw Length | 3 |
| Angle | | 6 | Flange OD | 4 |
| Orbit Ball | | 7 | Flange Thickness | 4 |
| Twin Seal | | 8 | Weight Empty | 5 |
| Plug | | 9 | Weight of Water | 6 |

TABLE II

| Conn. Code | Dwg. Sym. | 1 | 2 | 3 | 4 | 5 | 6 | 7 | 8 |
|---|---|---|---|---|---|---|---|---|---|
| 2 | 122 | 104 | 105 | 900005 | 58 | 106 | | 900006 | |

With the six references of Table II, dimensional tables 104, 105, 58, 106 and subroutines 5 and 6 provide the nine data items required for the flange gate valve. The actual data obtained from the tables and subroutines are summarized below in Table III.

TABLE III

| | Data for 6" (size index 15) Gate Valve | | | | | |
|---|---|---|---|---|---|---|
| Data Sequence No. | Data Obtained From Table | Value from Table | Dim. Code | Dim. Units | Converted/ Calculated Values | Data Items |
| 1 | 104 | 336.000 | 022 | 32nds | 5.25" | ℄ to flange face |
| 2 | 104 | | | | 5.25" | ℄ to flange face |
| 3 | 105 | 1128.000 | 111 | 32nds | 38.375" | Stem Height |

TABLE III-continued

| Data for 6" (size index 15) Gate Valve | | | | | | |
|---|---|---|---|---|---|---|
| Data Sequence No. | Data Obtained From Table | Value from Table | Dim. Code | Dim. Units | Converted/ Calculated Values | Data Items |
| 4 | 105 | 448.000 | 111 | 32nds | 14.0" | Wheel Dia. |
| 5 | Sub. −5 | | | in. | 6.0" | Screw Length |
| 6 | 58 | 352.000 | 111 | 32nds | 11.0" | Flange OD |
| 7 | 58 | 32.000 | 211 | 32nds | 1.0" | Flange Thickness |
| 8 | 106 | 240.000 | 511 | lbs. | 240 lbs. | Weight of Valve |
| 9 | Sub. −6 | | | lbs. | 10.7 lbs. | Weight of Water |

It should be apparent that the usage of the drawing symbol "calls" in operation programmed functions within the central processor of the computer. Moreover, each drawing symbol may require the sequential sorting and accumulation of dimensional data to determine distances between ends of flanges, etc. Where the primary or secondary symbol is used, a data sequence for each may be necessary to completely describe the printed symbol.

Material Items Short Description File (Tape 22c)

In addition to the piping specification file and material items dimensional data file, a further magnetic input is the material items short description file. That file consists of abbreviated descriptions of the piping materials. All descriptions on the file are referenced by a material item number. This file is used by several programs in the system to provide short descriptions of the material items for printed display.

It is often required that the short description file be updated and such an updating program is depicted in FIG. 16 in which the old description magnetic tape 80 is inputted to the processor 81 of the computer while new material item number short descriptions are entered by card input 82. Within the computer the processor is organized to store the card input by item number and merge the old file description with the new items and command the writing of new files, such new files appearing as tape 83. A printout of the short descriptions and item number index can also be had by printout sheet 84. Such a printout consists of a material description having a first column depicting the item number and a second column giving a short list of materials type description for that particular item. For example, item number L20FA3DA would be given the following description:

"Gate VLV 300 LB. CS RF BB 12CR (EA)"

Materials Management Control

Returning again briefly to FIG. 2, in addition to the previously mentioned required magnetic tape inputs for this system, additional files of materials can also be inputted into the computer for utilization. The old file list of materials tape 22d contains shop and field quantities of all material items for previously processed isometrics on a particular project. This file is unique for each product and is used by the isometric drawing system for two purposes:

(a) When a revision of isometric drawings is processed a new list of materials is generated. This new list is then compared to the old list contained in the file and the net differences, if any, are then written on a new output tape called the delta file, tape 23d. This is used in the materials control system depicted in FIG. 3. All material items that are added, deleted or quantities changed by revision to the isometric will be identified in the isometric drawing list of materials with an asterisk;

(b) This file is also used to generate a set of index sheets 23e listing all isometric drawings processed to date for the project with revision dates. This serves as a check for management.

In addition to the delta tape 23d, as well as the isometric index sheet printouts 23e and printouts 23a of input errors, dimensions and procedures and other vital data, the computer also outputs an updated file 23c of list of materials during each run of the system of the present invention. This file becomes the old file list of materials on the next computer run so that material control and inventory purchasing can be strictly observed.

As previously mentioned, the delta file, tape 23d contains shop and field quantities of all material item required for each batch of isometric drawings processed. For new isometrics the entire list of materials is written on this file. For revised isometrics only net added or deleted quantities are written on this file. For each isometric drawing process material items are identified by isometric drawing number, accounting item number (code of accounts) and size descriptions (3×1½"), and then are processed by the materials control system of FIG. 3. However, it must be first put through an intermediate processing step to convert size description to a numerical size code and have the isometric drawing code and accounting code attached to each material item, necessary for sorting the material items in the material control system of FIG. 3.

Card Input Data by Card Deck 15

The simplicity of the encoding system of the present invention is illustrated by the organization of data sheet 13 of FIGS. 17 and 18. The data sheets of FIGS. 17 and 18 are placed side by side, and across the upper portions are provided coding ledges illustrated in FIGS. 21 and 22. The relationship between the encoding system to the actual three-dimensional piping system will now be described.

WORKPOINTS

Columns 1–7 of FIG. 17 are used to encode workpoint data to be utilized in describing a certain three-dimensional pipeline system. Since usually a piping system includes a sequence of elements, then interconnection must be correctly determined so that a mathematical model in correct spacial coordinates can be constructed. The workpoint method of the present invention provides such accuracy but in a simple and flexible manner so that the designer can traverse the pipeline in almost any direction he chooses, allowing interconnection of loops, yet not requiring extensive amounts of input data. In order to accomplish these ends, the present invention utilizes "workpoints" to identify each element of the pipeline or a location in space where certain additional information is needed. Each workpoint (columns 1–7) represents at least a particular relative three-dimensional coordinate position in space. In addition it performs several functions and it can be thought of as a call to data within the processor memory to establish many graphic functions based on either the change of direction or structural characteristics of a coded piping element associated with the workpoint. It can be readily appreciated that merely changing the code associated with a workpoint can change the entire function of the workpoint. Moreover, the workpoint can be used to generate mating workpoint or zero workpoint based on calls to data stored within the computer; e.g., if a valve is specified, the mating flange can be automatically determined with resulting dimensions also calculated using the dimensional data files in the manner previously described, without further workpoint selecting being required. As a further example, a change in direction of the piping run (elbow, miter, bend) requires some data to describe the direction and distance of the pipeline as traversed from the previous workpoint. Another example of a junction (tee or otherwise) is where a branch of the pipeline enters or leaves the main run; in addition to spacial position, the pipe size for both the main run and branch must be specified.

Advantages of the workpoint method of the present invention lies in its flexibility. The designer need not assign workpoints to every piping element as, for example, companion piping items such as mating flanges as described above. On the other hand, extra workpoints may be used for convenience whenever it is desired, such as positioning a note at some point along the pipeline.

Workpoint Code

Workpoints are identified by simple 1 or 2 digit code, the number itself being only a label and the numerical sequence of the numbers being immaterial. Hence a sequence of numbers such as 26, 2, 16, 84, and 3 is as good as 1, 2, 3, 4 and 5. The designer will find that some orderly sequence of workpoint code is the most effective to use but he may assign them in any way he feels convenient.

Rules of Using the Workpoint Code

The workpoint method has logical rules which facilitate manipulation of the data within the computer to avoid ambiguity and to provide the required logic to create a mathematical model. These rules include the following:

(i) Distinctiveness in that the same number may not be assigned to a second workpoint;

(ii) Single entries in that a workpoint number may be entered in the data sheet only once except that a workpoint number previously defined is entered again in columns 1 and 2 of the data sheet 13 (FIG. 17);

(iii) Sequence and continuity in that every workpoint is considered to be connected to the preceding workpoint except when the sequence is interrupted by an intentional program statement such as the use of the program statement "END." The next workpoint starts a new sequence and continues until the statement "END" is again used;

(iv) Connection to prior point not in sequence in that to make the connections for loops and branches, the designer can refer to workpoint previously specified but must enter the prior workpoint in columns 1–2 of the data sheet of FIG. 17, there are two conditions where this type of entry is inserted:

(1) where the sequence ended at a preceding workpoint and the new sequence starts with the prior workpoint so entered and continues with the new workpoint being entered; thus, the prior workpoint is treated just like a preceding workpoint, called a type 1 linkage; and (2) the sequence did not end at a preceding workpoint; in this case a new sequence is started, and new workpoint has two connections to the preceding workpoint.

Relative Three-Dimensional Coordinates

In order to understand the concept of distance and direction vectors required to specify adjacent sets of workpoints, consideration is now given to the mathematical model to be created by the central processor. As depicted in FIG. 23 the mathematical model to be created by the computer may be visualized as points in three-dimensional space, frequently connected to each other by straight lines, formed in one or more chains. Each prior workpoint $P_i$ (called a dominant point) has a definite location, expressed by its coordinates $X_i$, $Y_i$, and $Z_i$ in a three-dimensional Cartesian system.

Assuming point $P_i$ being connected to a present workpoint $P$ (i+1), (called a subservient point) as illustrated in FIG. 23, the distance between these two points would be $$d = \sqrt{(X_{i+1} - X_i)^2 + (Y_{i+1} - Y_i)^2 + (Z_{i+1} - Z_i)^2} \qquad (1)$$

This formula (1) requires input of coordinates for each workpoint. This, however, is not practical, since this information, even if available for critical workpoints, would require computation of "between-points."

In order to overcome the above, relative three-dimensional coordinate information such as relates to another reported point can be used. To report data relative to another reported point, distance (d) and direction expressed by two parameters $\alpha$ and $\beta$ are used as shown in FIG. 23. If we let the line r connecting points $P_i$ and B represent the projection of d on the horizontal plane containing $P_i$, we shall have the following relationships.

$$(Z_{i+1} - Z_i) = d \cdot \sin\beta, \qquad (2)$$

or $$r = d \cdot \cos\beta, \qquad (3)$$

and $$(X_{i+1} - X_i) = d \cdot \cos\beta \cdot \cos\alpha \qquad (4)$$

$$(Y_{i+1} - Y_i) = d \cdot \cos\beta \cdot \sin\alpha \qquad (5)$$

Equations (2), (4) and (5) express the algebraic component difference between the coordinates for points $P_i$ and $P_{i+1}$.

Since angular data may be positive or negative, requiring mathematical skill for handling, a "sextant" type angular measurement device, has been created dealing only with positive quantities.

As shown in FIG. 24, a vertical plane, with 0° as high point and 180° as low point, can be rotated about a vertical axis from 0° to 360°, where 0°=north, 90°=east, etc.

Let us consider $P_i$ with known coordinates and assume it to be located at the center of the vertical axis, labeled "Preceding Workpoints" in FIG. 24. We now are able to point to the point $P_{i+1}$ by rotating the hinged protractor, labeled "Vertical Plane" and raising or lowering the pointer, which shows $P_{i+1}$ to be west=270° in the horizontal plane and 45° in the vertical relative to $P_i$ (preceding workpoint).

To use the horizontal angular direction gamma scale ($\gamma$), and vertical sigma scale ($\sigma$) trigonometrically, then the following equations result:

$$\alpha = 90 - \gamma \text{ for } \gamma \leq 90 \quad (6)$$

$$\alpha = 450 - \gamma \text{ for } \gamma > 90 \quad (7)$$

while $$\beta = 90 - \sigma. \quad (8)$$

Whenever $$\sigma = 0 \quad (9)$$

$P_{i+1}$ is straight above, and when $$\sigma = 180 \quad (10)$$

$P_{i+1}$ is straight below of $P_i$ $$X_{i+1} = X_i \quad (11)$$

and $$Y_{i+1} = Y_i \quad (12)$$

since $\beta$ becomes either +90° or −90° by equation (8) the right-hand side of equations (4) and (5) becomes zero.

Equally, if $$\sigma = 90 \quad (13)$$

$\beta$ itself becomes zero, and the right-hand side of equation (2) becomes zero, so that $$Z_{i+1} = Z_i. \quad (14)$$

It should be noted that in case where equations (9) and (10) apply, the only additional information that point $P_{i+1}$ requires relative to point $P_i$ is the distance between the points.

Another important fact becomes evident from equations (2), (4) and (5), i.e., that there will never be more than three data required to solve them, e.g. $\alpha$, $\beta$ and d.

Indeed, if the directional data ($\sigma$) is 0° or 180°, only one other information is required.

The system gives to the user the choice to select these three data out of six, i.e., in $$6!/3!3! = 20 \quad (15)$$

possible ways.

Examples of Workpoint Rules

FIGS. 25–28 show two possible sequences for traversing the piping configuration illustrated. In this regard the illustrated three-dimensional pipeline is depicted in FIGS. 26 and 28 while the designer-draftsman's input such as on data sheet depicted in FIG. 17 is shown in FIGS. 25 and 27. Either sequence is satisfactory although the workpoint sequence and resulting three-dimensional illustration of FIGS. 27 and 28 is probably more logical.

Location of Workpoints on Fittings

The workpoint method of the present invention must know the exact location of each workpoint, as for elbows, junctions, valves and fittings of the pipeline system to be displayed so that it can properly dimension these items as they appear in the final isometric drawing. Location of the workpoints on fittings follow the conventions depicted in FIGS. 29a–29f. Although these drawings are self-descriptive, a few comments may be in order. With regard to the change of direction and junctions requirements, the workpoint location is at the intersection of the center lines of the pipe runs. Changes of direction greater than 90° must be defined by two workpoints. Further, the workpoint location for flanges as depicted in FIG. 25b is dependent upon whether the flange is raised-face, tongue-in-groove, or a ring-joint. The direction of the traverse must always be from the back towards the face of the flange. With regard to connectors of FIG. 29d, the workpoint is at either end of the center line. For threaded fittings (male) the workpoint is at the end of the threaded engagement while the end use of the workpoint location is at the far end in the direction of traverse. For ends as depicted in FIG. 29e the location of the workpoint is at the far end of the direction of traverse. As depicted in FIG. 29f the eccentric reducer requires two workpoints to define the offset of the piping path. As an example of utilization of the workpoint rules in FIGS. 29a–29f, FIG. 30 illustrates the location of workpoints in a sequence of piping elements when traversing the pipeline in either of two directions. Note that with the use of an eccentric reducer the workpoint "2" varies depending upon the direction of traverse.

Before further discussion is embarked upon the concept of workpoints a further feature should be discussed. That feature is whether the workpoint is an essential or specified workpoint or is one that is subsequently developed, i.e., a mating ("zero") workpoint. In this regard, certain piping elements always require workpoints, namely, as depicted in the legend of FIG. 21 (i) valves; (ii) changes in direction; (iii) junctions; (iv) connectors; and (v) ends. In this regard, flanges frequently do not require workpoints. If the flange valve or any other flange item is specified, the mating flanges will automatically be provided for by the system utilizing the concept of zero workpoints. A zero workpoint is a workpoint that is derived by the computer processor. A workpoint in such case is not required, but when a designer wants to overrule the piping specifications the additional workpoint can be added. Gaskets and bolts never require workpoints, they are provided automatically for every flange connection specified. As illustrated in FIGS. 21 and 22, the system of the present invention must be provided with certain information for each workpoint specified. As a minimum, the type of workpoint desired must be known, either by a material or non-material classification. If a material characteristic is specified (a pipe fitting, for example), the class of fitting must be known. However, the spacial location of the workpoint must be known in either case. As mentioned, specific piping items and dimensions may also be automatically selected in selected occurrences utilizing piping specification and dimensional data files previously described. Two-digit codes "10–70" are material item codes in a designated class of fittings while code "00" is a non-material code. Code 30 specifies a junction fitting of some type while the system will automatically select from the piping specification the normal fitting to be used for the particular size of pipe in the main or in the branch. Normally this selection is not required but can be used to select an alternate type of fitting if desired. Note there is no code for pipe.

To meet the requirement that the designer-originator has the power to overrule the system if he wishes, the present invention provides, in addition to the item codes, (a structure depicted in FIG. 21 for entry into columns 12 and 13 of the data sheet to define the type of workpoint and class of fitting, if mating) special selection codes. These selection codes in columns 14-16 of FIG. 17 allow the designer to easily select specific material items from the piping specification file and override the automatic selection process.

As previously mentioned, the special drawing symbol code for center lines, etc., in which 18 types of center lines, match lines and construction lines can be specified, requires the coding sequence of FIG. 21. Code "00" is entered in columns 12 and 13; columns 14-16 are used to create various types of center lines, match lines and construction lines.

To restate the item code structure again, three types of codes may be used to define the type of piping element either of a material or non-material nature: complete material item number, specified item code with or without a selection code, and a drawing symbol code. On the data sheet 13 of FIG. 17, columns 8-16 could be used to insert the complete item number. In general, material item numbers should not be entered since the piping specification file makes this selection automatically. The specified item code is entered at columns 12-16 and consists of two parts: the simplified code and the selection code. The simplified code is entered at columns 12-13 and the selection code is entered at columns 14-16, if desired. For center lines, match lines and construction lines, the item code consists of two parts: the simplified code and the drawing symbol code.

Pipe Size and Relative Spacing

Columns 17-28 of the data sheet 13 requires entry of nominal pipe size at each workpoint (if applicable) in units of inches. Since decisions within the central processor are based upon "size" as a logic key, pipe size must be specified where applicable, i.e., for material items. In columns 29-38, directional vectors are defined by the direction of travel in three-dimensional space from one workpoint to the succeeding workpoint. Hence, for each current workpoint, the direction to be entered assumes you are standing at the preceding workpoint and working toward the current workpoint. As previously identified with reference to FIG. 23, directional vectors can be defined by use of horizontal and vertical components. In this regard, columns 29-33 relate to horizontal plane changes which are either straight up or down or have a projection into the horizontal plane. As this projection into the horizontal plane is toward one of the four cardinal compass points, enter the following letter codes in column 29:

| Direction | Letter Code | Degrees |
| --- | --- | --- |
| North | N | 0 |
| East | E | 90 |
| South | S | 180 |
| West | W | 270 |

In columns 34-38 the vertical plane projection can be undertaken. If this projection of the vertical plane is straight up or down and the line is horizontal, enter the following letter codes in column 34:

| Direction | Letter Code | Degrees |
| --- | --- | --- |
| Up | U | 0 |
| Horizontal | H | 90 |
| Down | D | 180 |

Columns 39-47 specify the distance from the prior workpoint as frequently used in conjunction with the directional vector to specify the spacial relation position of the current workpoint to the preceding workpoint. In columns 49-76, normal drafting practice in the construction industry is to establish a set of base lines and base elevation for a plant so that equipment can be located on the plot by reference to these plant coordinates. Frequently the southwest corner of the plot is used at the reference points so that grid lines in a generally north direction are assumed to be the north coordinates and grid lines in the east direction are the east coordinates. The system of the present invention takes advantage of this practice by established north and east coordinates as positive values as previously mentioned. In columns 49-57 north (+) or south (−) coordinates are entered in feet and inches. Columns 58-66 enter east-west coordinates in feet and inches. Columns 67-76 enter elevational codes in accordance with the codes set forth below:

| Code | Elevation Location |
| --- | --- |
| 1 | Centerline of pipe |
| 2 | Bottom of pipe |
| 3 | Top of support for insulated piping |

Coordinates at the first working point: The first full set of plant coordinates must be entered for the first working point. The first working point is any working point not connected with a previously entered workpoint.

Data Sheet of FIG. 18

For the normal isometric drawing only a relatively few notes must be added. For insertion thereof, such data is entered in the designated columns of FIG. 18. The piping class may be entered at columns 1-14, while columns 6-14 can be used to establish graphic symbols for valves and fittings which clearly show the desired position for the valve stems and handwheels. These fitting symbols are all drawn appropriate to scale on the graphic output to provide dual checks for interference. In accordance with the present invention the part of the valve or fitting which requires supplemental data to define its position and space is called its characteristic. For example, the stem of handwheel- or lever-operated valves is a characteristic of these items. Two data items are used to define the position of the characteristic, namely, orientation and inclination. FIG. 34 illustrates the relationship between orientation and inclination and shows examples of data entries in various types of piping items.

As shown in FIG. 22 the designer is guided on orientation and inclination rules by legends established at the top of the data sheet 13 as depicted in FIG. 22.

Symbol Codes for Non-Material Items

There are four groups of symbol codes used for center lines, match line points and construction lines as illustrated in FIGS. 31 and 32. As indicated, the first three groups are symmetrical about a single workpoint; construction lines are drawn between two workpoints. As shown in the table of symbol codes of FIG. 32, the match line codes can be entered into the columns 14–16 of the data sheet of FIG. 17 in which columns 12 and 13 have been given the code "00." FIG. 31 illustrates all the codes and their use in depicting various center lines.

Returning now to the data sheet 13 depicted in FIGS. 17 and 18, additional comments may be instructive.

The data sheet 13 is divided into two halves, each half being keypunched on a separate card of 8 columns each. The cards on the left-hand side of the sheet of FIG. 17 are identified as "A" cards, while FIG. 18 is identified with "B-punch cards." The input instructions for these "A" cards include title of work order and drawing number which appears across the upper portion of the data sheet. Additional internal design pressure and temperature also are inputted into the computer. Additionally, the selection view can also be made, although normally this item is left blank. The processor commands the data in a sequential order to select the best view to be shown.

Best View Routine

The view selected by the system will be the designer's choice if he sketched the four possible uses to scale and selected the one showing the clearest presentation. In this regard, programming instructions to the computer which specify the best view is illustrated with reference to FIG. 33. Note in this regard that the box has sides labeled 1, 2, 3 and 4 and each box is analyzed from a point at infinity. Table IV sets forth below the programming instructions and the algorithm for bringing forth the clearest presentation.

TABLE IV

LISTING OF THE INPUT DECK
BEST VIEW SUBROUTINE | COMMENTS

```
 5  IF(NFORCE.GT.4) NFORCE=0
    IF(NFORCE.GE.3) GO TO 27
```
TEST FORCED VIEW PARAMETERS TO FIND EXTREME ISOMETRIC COORDINATES FOR TWO VIEWS

```
    DO 10 J=1,2
    CALL ISOCOR (J,JCORD (1,1); JCORD (1,2), JCORD (1,3), VAMX(J), WMAX(J))
    VMIN(J)=VMAX(J)
    WMIN(J)=WMAX(J)
```
SET INITIAL VALUES FOR OBTAINING MAX AND MIN ISOMETRIC COORDINATES

```
10  CONTINUE
    DO 20 I=2,NPTMAX
```
CYCLE THROUGH ALL POINTS FOR VIEWS 1 and 2

```
    JSYMBL=IYMBL(I)
    IF(JVALVE(ITAM(I,1),JSYMBL). EQ.0) GO TO 12
    N=2
    CALL DRWSYN(JSYMBL,LS,LP,NPATH)
    KH=IDATA(I)+NPATH
    HITE=FLDATA(DATA(KH))*QMAX
    CALL EXTARM(I,JC1,JC2,JC3,HITE)
    GO TO 13
```
COMPUTE EXTREMITY OF HANDWHEEL IF NECESSARY

```
12  N=1

13  DO 19 J=1,2
    GO #
14  CALL ISOCOR(J,JC1,JC2,JC3,V,W)
```
(15,14),N
OBTAIN ISOMETRIC COORDINATES FOR HANDWHEEL

```
    GO TO 16

15  CALL ISOCOR(J,JCORD(I,1),JCORD(I,2),JCORD(I,3),V,W)
```
OBTAIN ISOMETRIC COORDINATES OF GENERAL POINT

```
    VMAX(J)=AMAX1(VMAX(J),V)
    VMIN(J)=AMIN1(VMIN(J),V)
    WMAX(J)=AMAX1(WMAX(J),W)
    WMIN(J)=AMIN1(WMIN(J),W)
19  CONTINUE
20  CONTINUE
    IF(NFORCE.EQ.0) GO TO 23
    NBEST=NFORCE
    GO TO 50
```
OBTAIN CURRENT MAX AND MIN ISOMETRIC COORDINATES

TEST FOR FORCED VIEW PARAMETER TO COMPARE HORIZONTAL SPREADS

```
23  S1=VMAX(1)−VMIN(1)
    S2=VMAX(2)−VMIN(2)
    IF(S1-S2),30,25,25

25  NBEST=1
    GO TO 35

27  JB=NFORCE
    NBEST=NFORCE
```
SELECT VIEW WITH GREATEST HORIZONTAL SPREAD IN ISOMETRIC SPACE

TABLE IV-continued

LISTING OF THE INPUT DECK
BEST VIEW SUBROUTINE

| Code | Comments |
|---|---|
| `GO TO 36`<br>`30 NBEST=2`<br>`35 S1=WMAX(NBEST)−WMIN(NBEST)`<br>`   JB=NBEST+2` | SELECT VIEW 3 OR 4 FOR COMPARISON WITH VIEW HAVING GREATEST HORIZONTAL SPREAD |
| `36 CALL ISOCOR(JB,JCORD(1,1),JCORD(1,2),JCORD(1,3),VMAX(JB),WMAX(JB))`<br>`   VMIN(JB)=VMAX(JB)`<br>`   WMIN(JB)=WMAX(JB)`<br>`   DO 40 I=2,NPTMAX`<br>`   JSYMBL=ISYMBL(I)`<br>`   IF(JVALVE(ITAM(I,1),JSYMBL).EQ.0) GO TO 37`<br>`   CALL DRNSYM(JSYMBL,LS,LP,NPATH)`<br>`   KH=(IDATA(I)+NPATH`<br>`   HITE=FLDATA(DATA(KH))*OMAX`<br>`   CALL EXTARM(I,JC1,JC2,JC3,HITE)`<br>`   CALL ISOCOR(JB,JC1,JC2,JC3,V,W)`<br>`   GO TO 38` | REPEAT ANALOGOUS PROCEDURE THAT WAS USED FOR VIEWS 1 AND 2 TO FIND EXTREME ISOMETRIC COORDINATES OF NBEST COMPLEMENT |
| `37 CALL ISOCOR(JB,JCORD(I,1),JCORD(I,2),JCORD(I,3),V,W)`<br>`38 WMAX(JB)=AMAX1(WMAX(JB),W)`<br>`   WMIN(JB)=AMIN1(WMIN(JB),W)`<br>`   VMAX(JB)=AMAX1(VMAX(JB),V)`<br>`   VMIN(JB)=AMIN1(VMIN(JB),V)` | REPEAT ANALOGOUS PROCEDURE THAT WAS USE FOR VIEWS 1 AND 2 TO FIND EXTREME ISOMETRIC COORDINATES OF NBEST COMPLEMENT |
| `40 CONTINUE`<br>`   IF(NFORCE.NE.0) GO TO 50`<br>`   S2=WMAX(JB)-WMIN(JB)` | FIND VIEW HAVING GREATEST VERTICAL SPREAD |
| `43 IF(S1-S2)45,50,50`<br>`45 NBEST=JB` | |
| `50 DO 55 I=1,NPTMAX`<br>`   CALL ISOCOR(NBEST,JCORD(I,1),JCORD(I,2),JCORD(I,3)VISO(I),WISO(I)1)` | COMPUTE AND STORE ISOMETRIC COORDINATES OF BEST VIEW |
| `55 CONTINUE`<br>`   RETURN`<br>`   END` | |

As can be seen the algorithm is based on the fact that the view that presents the largest horizontal and vertical extents is the clearest presentation.

The system of the present invention has been successfully used in the formation of over 10,000 separate isometric drawings by the assignee of the present invention. As an illustration of the system in action, consider the construction of the workpoints 1–24 of FIG. 17. Table V describes the process in detail.

TABLE V

| | |
|---|---|
| Workpoint 1 | North-south centerline of a 3-inch pipe with coordinates in space of N5329 feet, 11 and 4/16 inches; E9839 feet, 7 and 4/16 inches; and an elevation of 101 feet, 6 inches. The accompanying "B" card information indicates that the line is phantom "2" and a short note "SN" on the drawing to read "LP-5931". (This note will appear on the drawing side, not the "notes" side of the final display.) |
| Workpoint 2 | A 3-inch flange going up from workpoint 1 to an elevation of 102 feet, 2 and 12/16 inches. The "B" card tells that this is piping classification "N" and that the bolt holes "BH" straddle the centerline. (This is a canned note, the whole note is retrieved by the two letters "BH"). |
| Workpoint 3 | We go to a 3-inch elbow, up from workpoint 2 a distance of 7 and 12/16 inches. Our "B" card tells us we are now generating a real line "I" and a general note "GN" will write "Line Elect. Traced and Insulated" in the "Symbols and Notes" column of the final display. |
| Workpoint 4 | We now go east (E) and horizontal (H) a distance of 7 and 14/16 of an inch to a junction (30) given by sizes 3" × 3" × 3/4" or 3" × 3" × 12/16" branch connection on a 3-inch line. |
| Workpoint 5 | We continue east (E) and horizontal (H) a distance of 12 and 14/16 inches to a 3-inch check valve (code "10" with selection code "3"). Our "B" card gives the inclination as 180° or the flapper points in the same direction as the direction of workpoint |

TABLE V-continued

| | |
|---|---|
| | travel. |
| Workpoint 6 | We then go east (E) and horizontal (H) a distance of 18 and 14/16 inches to a 3-inch elbow. |
| Workpoint 7 | From the elbow of workpoint 6 we go up (U) a distance of 25 and 5/16 inches to a gate valve (code "10" with a simplified code of "1"). Our "B" card tells us the orientation is south (S), i.e., the handwheel is pointed south. |
| Workpoint 8 | From the valve of workpoint 7 we continue up (U) to a 3-inch elbow to a bottom of line (BOL) (coded as "2" in column 67) elevation of 110 feet, 0 inch. |
| Workpoint 9 | We now go south (S) and horizontal (H) from the elbow of workpoint 8 to a 3-inch tee (coded as "30") at coordinate N5323 feet, 5 and 4/16 inches. |
| Workpoint 10 | Continuing south (S) and horizontal (H) a distance of 5 feet to an orifice flange (code "50" selection code "9-size 3"). Our "B" card carries the note "FE-403 Jack Screws on Hor. C/L". Because columns 26 and 27 are blank for this note, it will appear on the drawing as a small rectangle with a leader pointing to the workpoint location on the drawing. The rectangle will carry the numeral corresponding to the note number in the "Symbols and Notes" side of the display where the literal writeup will occur. |
| Workpoint 11 "END" | This ends the chain with a code of "090" which is designated as "Pipe Cut-off"; this gives a dimension and orders that the amount of pipe (in this case about 24 inches). Our "B" card has a shorthand note "CN" which means "for continuation see..."; the addition of Cl-59166 completes the note. This note will appear on the drawing side of the display. The space limitation for this type of shorthand note is 30 characters; any entry beyond line 39 will not be printed. |
| Workpoints 13-19 | Are repetitious with the exception of workpoint 19 which refers back to workpoint 9 (a 3-inch tee); this then ties in the branch, giving it direction. The branch connection of the tee accordingly pints down to meet the line coming up from workpoint 19. |
| Workpoint 22 "END" | Is a mathematical point "Q80" referring to workpoint 4 which is a 3/4-inch branch on a 3-inch line. We are going up 3 and 12/16 inches from the branch workpoint; the "080" mathematical point will order no pipe or material. Only the material required for the branch (code "30") will be ordered - in this case a Thredolet, a tradename of Bonney Forge Company of Allentown, Pa. |
| Workpoint 24 "END" | Is identical to workpoint 22 above except referring to workpoint 16 branch connection. The "B" cards for workpoints 22 and 24 above carry the designation of the branch connection, "PI-621, APS-304 Conn." and "PI-622"; these notes will appear on the "Notes and Symbols" column on the right-hand side of the display with a corresponding rectangle containing the respective note number at each of the branch connections on the left-hand side. |

The structural data under control of the processor utilizes control programming instruction to manipulate the data. The data arrays depicted in FIGS. 35 and 36 illustrate the change with time of the structured data. Of particular reference is FIG. 35; the data array as depicted corresponds to a rather early—in machine time—operation.

With reference to FIG. 35, the third column represents the workpoint numbers as presented by the work-sheet depicted in FIG. 17. The rightmost columns indicate the exact three-dimensional coordinates of the series of workpoints even though, say, only the initial workpoint "1" has been identified in absolute spacial coordinates. In this regard each pair of adjacent workpoints "overlap" in that the dominant and subservient points are interchanged in the direction of the advancement.

FIG. 36 represents data array in machine time after all command functions have occurred. In more detail, note that the workpoint numbers 1–24 have now been expanded to 73 workpoints. The new workpoints are automatically established by the system at "non-zero" or mating workpoints for specified piping items. In this regard, new dimensions are also determined where applicable using structured data within the processor. Relevant dimensions are calculated and correct drawing symbols generated. Thereafter, the isometric coordinates are generated from the three-dimensional coordinates illustrated in the array of FIG. 36 to provide an isometric representation of the depicted pipeline of FIGS. 19 and 20. FIG. 37 depicts the lists of materials derived from the data sheet 13 of FIG. 18. A program for generating the isometric coordinates is conventional in view of the scaling factor used, as previously discussed. An example of an alternate coordinate generation system can be found in U.S. Pat. No. 3,519,997. Other systems can also be utilized since the manipulation of the data to provide isometric connotations where all coordinates are known is well established.

For example, the generation of the data arrays illustrated in FIGS. 35 and 36 could possibly be modified if a new data structuring code was used, as, for example, that described and claimed in U.S. Pat. No. 3,534,338 for "Computer Graphics System" issued to C. Christensen et al.

MATERIAL CONTROL AND REQUISITION SYSTEM 9

Returning to FIG. 3, there is seen—in schematic form—isometric graphics system 8 interfaced to material control and requisition system 9. In the manner set forth below, the record files generated by the graphics system 8 can be efficiently used by the computerization of the material control system 9 to monitor all material piping items required and purchased for a given project as well as provide up-to-date status reports of inventories of such items, as required. Before describing the material control system 9 in detail, however, a general description of the problems associated with the purchase and control of materials related to a given piping project is believed to be in order.

Among major engineering tasks involved in the design and construction of fluid processing facilities are the determination of the quantities of piping materials needed, timely purchasing of these materials to insure delivery at fabrication and construction sites, and generation of current status reports during the course of the design and construction phases.

Several thousand different pipe items are required for the average petroleum refinery. Initial purchases of such items will be based on estimates, and subsequent purchases on actual counts of material required—as piping drawings are prepared. A continuing update of records covering both requirements and purchases is necessary, since these records will provide the basis for periodic decisions regarding issuance of supplemental orders. This process will continue over a substantial time span, and may well consume several hundred man-hours. Since much of the material must be purchased before a firm count of the requirements is available, in order to meet delivery needs, it is convenient to think of materials covered by purchase orders as a "storehouse supply," even though they may not yet be delivered, and quantities of materials shown on lists of materials as being "withdrawn" from the available "storehouse supply". For this reason, the term "withdrawal" appears frequently in the description of the invention, and refers to the functions of material quantities required as determined by actual counting. Furthermore, it is of note that materials purchased are not charged against specific accounting codes, but rather are placed in a general expense account. Withdrawal of materials results in charges to specific accounting codes.

Most input data to the material control system 9 is generated by the isometric drawing system 8 and is written on magnetic tape or disc for direct input through material file preprocessor system 27 to material status information system 28 and requisition (purchasing) system 29. The method of inputting data is designed to be as simple and flexible as possible, and status reports generated by the material control system 9 are designed to be as clear and meaningful as possible in the manner set forth below. Since several design projects may be running concurrently, separate files of data covering material status must be maintained for each project. Certain auxiliary files, however, can be used commonly by all projects. Difficulties arising from keypunching errors in system 28 will be seen to be minimized through error detection techniques, and it is seldom that an invalid item is written on the files. Even when this occurs, auxiliary error detection techniques are available. Error lists with action codes are produced by each program. In addition, optional printouts are available for verification of the file updating process which may be requested at the discretion of those responsible for monitoring material records. Key to obtaining such simplicity of operation: the structure of the data within the control system 28.

DATA STRUCTURE

The data structure of the material control system 9 includes a digital code at least indexed to material item number of piping items of interest. Within the graphics system 8, as previously mentioned, the material item number is the basic sorting and file searching key. The function is also carried over to the material control system 9. Since the material item number is usually an alphanumeric code that varies from 5 to 9 characters in length, each character can represent a significant feature of a given item. The total of the code thus provides a unique description, or classification index, for each material item specified in either the graphics or material systems of the present invention.

CLASSIFICATION INDEX

The classification index of each item is a graphic matrix of the functions of the material item of interest broken down by category, subcategory, subtype and division.

FIG. 38 illustrates the nature of the classification index in more detail and particularly shows how a sequential scan of the classification index allows character-by-character development of a particular item number as well as, vice versa, shows that a given material item number represents only a particular class and type of piping equipment. As shown, the illustrated index is divided into three major categories indicated by the code letters: "J," "L" and "S." The "J" category encompasses those components within the piping system peculiar to instrumentation and is divided into three subcategories, as discussed in more detail hereinafter. The "S" category covers components of the piping system peculiar to drainage facilities and is divided into two subcategories to be discussed in more detail below. The "L" category cover all other piping components and is divided into nine subcategories.

All subcategories of the "L" category further divide into subtypes followed by divisions within subtypes for rating, connection and constructional features. Each page, therefore, of the classification index has a subcategory heading. Directly under this heading are the first two characters of the material item number followed by a series of dashes. The dashes represent additional significant characters that must be generated to complete the material item number. The sequence to be followed in generating a material item number is set forth in Table VI.

TABLE VI

| | |
|---|---|
| 1. Category | Alpha character only (J, L or S) |
| 2. Subcategory | Numeric character only (0 thru 9) |
| 3. Subtype | Numeric character only (0 thru 9) |
| 4. Rating | Alpha character only (A thru Z) |
| 5. Material | Alpha or numeric character |
| 6. Connections | Alpha or numeric character |
| 7. Construction Feature | Alpha or numeric character |
| 8. Construction Feature | Alpha or numeric character |
| 9. Construction Feature | Alpha or numeric character |

In order to illustrate the character-by-character development of the material item number, a typical example of material item number generation is set forth below. For illustrative purposes, assume that the originator-designer has assigned a material item number to a valve which can be described as follows:

"800 LB. SCRD. CARBON STEEL GATE VALVE WITH CHROME OR STELLITE TRIM. OS&Y, BOLTED BONNET, REDUCED PORT, SOLID WEDGE"

Reference to FIG. 38 reveals the item to be described to be related to piping rather than instrumentation or drainage. Accordingly, the first character of that material item number is, therefore, "L." FIG. 38 also shows that the function of the item, i.e., functioning as a valve, dictates that the second character of the material item number be a "2." Next, since the example is a gate valve, the next digit will, therefore, be a "0." Thus, the first three characters of the new material item number have been established as "L20."

FIG. 39 is an illustration of a further aspect of the classification index of the present invention. As indicated, the table of FIG. 39 is divided into columns related to valve constructional features and characteristics only, to wit: valve subtype, valve rating, valve material, valve connection, valve constructional design, valve constructional trim, and valve constructional operator. From these column (or "subtype") classifications, the balance of the characters needed for the new item number code for the above-mentioned valve can be developed, as in the following fashion:

Rating—800 lbs.=character "K";
Material—carbon steel (cast or forged)=character "A";
Connection—screwed=character "O";
Design—bolted bonnet, reduced port=character "H"; and
Trim—12 chrome or stellite=character "E."

The complete material item number generated would thus be "L20KAOHE." The ninth character is not used in this instance. If, however, there is a need, an additional distinguishing feature could be added, such as a solid versus split wedge valve design; then the character "1" could be used to indicate one of these features.

DELTA TAPE 23d

Referring briefly to FIG. 2, recall that delta tape 23d can be outputted from the processor of computer 11 simultaneously with or subsequent to the graphic output tape 23b. The use of the delta tape 23d has been previously stated, but to briefly recapitulate, when new isometric drawings are created or "old" drawings are revised, new material and items can be automatically designated and "old" material items can be automatically deleted or otherwise amended using delta tape 23d together with tape 23c. And in order to effect material control of net changes in the list of materials of isometric drawings, the delta tape 23d is most efficiently utilized as the control key in the materials control system of the present invention. Prior to direct use, tape 23d must be rearranged. Material file preprocessor system 27 of FIG. 3 renders the delta tape 23d input compatible with manually prepared inputs to later programs to be used in material control functions of the present invention.

MATERIAL FILE PREPROCESSOR SYSTEM 27

The delta tape 23d is the primary input to the material preprocessor system 27 of FIG. 3. It represents all withdrawal activity for a given batch of isometric drawings, i.e., isometric drawings related to the same project, and the tape information, in digital format, is usually sequenced as follows: "drawing number," "drawing revision number" and "material item number." Information is also classified as to "actual size," "shop quantity," field quantity," and "accounting code" for each material item number found within the list of materials of a particular isometric drawing. A sample printout of the tape 23d depicted in Table VII for two such isometric drawings—"Draw. No. 59165" and "Draw. No. 59834"—illustrates the data structures in detail.

TABLE VII

| Draw. No. | Draw. Rev. | Acctg. Code | Line Count |
|---|---|---|---|
| 59165 | 0 | 59080 | 5 |
| Item No. | Size | Shop Quan. | Field Quan. |
| L11EA2A | 3 In. | 24 | 0 |
| L20FA3DA | 3 In. | 0 | 2 |
| L22FA3PA | 3 In. | 0 | 2 |
| L36NBDT | 3 × ¾ In. | 2 | 0 |
| L40FA3DE | 3 In. | 10 | 0 |
| 59834 | 0 | 59080 | 3 |
| L11GA1A | ¾ In. | 0 | 11 |
| L11GA1A | 1 In. | 0 | 6 |
| L20KAOHE | ¾ In. | 0 | 2 |

DELTA TAPE PREPROCESSOR 111

By means of delta file preprocessor 111 of the system 27, the various commands and manipulations are carried out. First information contained in the input magnetic tapes 23d and 112 is read, size-price tape 112 being read in numeric sequence by size code, and delta tape 23d being read sequentially, as previously recorded. The preprocessor 111 matches the actual size fields of both tapes. After a match is found, a 1 to 3 digit size code of the appropriate size code file record is added to the "new" delta tape 113. The new data comprising the "new" delta tape 113 can be generated along with an optional printout tape 114. Table VIII sets forth the printout of new delta tape 113, illustrating the final order of the rearranged data.

TABLE VIII

| Item No. | Size | Size Code | Shop Quan. | Field Quan. | Acctg. Code | Draw. No. | Draw. Rev. No. |
|---|---|---|---|---|---|---|---|
| L11EA2A | 3 In. | 54 | 24 | 0 | 59080 | 59165 | 0 |
| L20FA3DA | 3 In. | 54 | 0 | 2 | 59080 | 59165 | 0 |
| L22FA3PA | 3 In. | 54 | 0 | 2 | 59080 | 59165 | 0 |
| L36NBDT | 3 × ¾" | 1758 | 2 | 0 | 59080 | 59165 | 0 |
| L40FA3DE | 3 In. | 54 | 10 | 0 | 59080 | 59165 | 0 |
| L11GA1A | ¾ In. | 27 | 0 | 11 | 59080 | 59834 | 0 |
| L11GA1A | 1 In. | 33 | 0 | 6 | 59080 | 59834 | 0 |
| L20KAOHE ¾ In. | 27 | 0 | 2 | 59080 | 59834 | 0 | |
| L21JAODF | ¾ In. | 27 | 0 | 2 | 59080 | 59834 | 0 |
| L22JAORAF | ¾ In. | 27 | 0 | 2 | 59080 | 59834 | 0 |
| L30SBAB | ¾ In. | 27 | 0 | 4 | 59080 | 59834 | 0 |

The new delta tape 113 is seen to be representative of the current withdrawal activity for the illustrated material items. Note also that the information on this tape is the same as the delta input tape 23d, except that a size code has been added, that is, information being sorted in accordance with isometric drawing number, material item number, actual size, size code, shop quantity, field quantity, accounting code, isometric drawing number and isometric drawing revision number.

SIZE-PRICE INDEX FILE 112

Also constituting the primary input to delta file preprocessor 111 is size-price file 112. A basic concept underlying design and use of the size-price index file 112 relates to best utilization of computer run time. Rather than carrying all size and price data in the various record files used throughout the materials control system of the present invention, periodic input of the size code and price file 112, as required, makes possible the maximum use of system effectiveness since sorting and other evaluation tasks are minimized. Further, consolidation within file 112 greatly facilitates maintenance of "old" price and size descriptions as well as eases creation of new data, as required. Since the size code and price file 112 contains size codes, size descriptions and prices for all material items currently used in the classification system, it has use in various other subroutines. Before such uses are discussed in detail, however, a brief description of how a new size code and price file is created may be instructive.

As shown in FIG. 41, inputs to size code and price file preprocessor 115 includes the following: size update data in the form of a card deck 116, magnetic tape 112 containing "old" size code and price file data, and price update data in the form of card deck 118. Within the processor 115 of the computer, the following tasks are performed: all size code data on card 116 are read and sorted based upon size code; all "old" size code file records inputted via old tape 112 are sorted and matched against the size code update inputted via card deck 116 and a new size code file is generated; all price file update data inputted via tape deck 118 are read and sorted using as an indexing key the material item number; and all price file records inputted via tape 112 are read and matched against sorted price update records, and a new price file is generated. The new size code and price file is outputted onto tape, say, on magnetic tape 119. A printout of the new size code and price file can also be generated, as indicated by the number 120.

NEW SIZE CODE AND PRICE FILE 119

The new size code and price file, in addition to being used in the delta file preprocessor 111 can also be used in other system programs for one or more of the following purposes: adding size codes, descriptions and prices to systems records, as needed; and calculating monetary value of material purchases and withdrawals (calculation: unit price x quantity). In regard to the former, the new size code and price file 119 is used by both withdrawal update program and the material summary programs to be described in more detail hereinafter.

PRINTOUT 120

The printout 120 from either a file creation or an update run of the computer will depend upon the print instructions of the preprocessor 115. FIG. 42 illustrates a sample printout by proper instructions of the size code file while FIG. 43 illustrates a sample printout of a price file only. As indicated, the tape 119 contain two logical files of the following general descriptions:

(i) the first file (size) is so-called "unblocked" type and presently contains a maximum of about 1400 records, each record contains a series of 1 to 4-digit size codes and related 1 to 18-character size descriptions; and (ii) the second file (price) is "blocked" with the standard block containing about 211 32-bit words (30 items, each item consisting of a 5 to 9-character material item number), a 1 to 4-digit size code, a 1 to 7-digit unit price (2 decimal positions), and a 1 to 5-character price data. A great number of items can be carried in the price file as, for example, over 40,000 items. The number of items in the price file exceeds the number of items in the size file. Table IX illustrates the data structure and format of the files in detail.

TABLE IX
FILE STRUCTURE

1. Size File

| Record | Word No. | Contents | Format Remarks |
|---|---|---|---|
| 1 | 1 | Size Code | I6 |
|  | 2-6 | Size Description | 5A4 |
| Repeat record 1 | | | |

2. Price File

| Record | Word No. | Contents | Format Remarks |
|---|---|---|---|
| 1 | 1 | Item Count | I6 ("30" on all but last record) |
|  | 2-4 | Item Count | A3,A4,A2 |
|  | 5 | Size Code | I6 |
|  | 6 | Price | F10.2 |
|  | 7-8 | Date of Record | A3,A2 |
|  | 9-211 | Repeat words 2-8 for each item | |

TABLE IX-continued
FILE STRUCTURE

| | | |
|---|---|---|
| 2 | 1-211 | Structure identical with record 1 |
| . | | |
| . | | |
| last | 1-N words | (number of items ≦ 30) (number of words = number of items × 7 + 1) |

↳ Standard block contains 211 words (30 items of 7 words per item, plus 1)

Under format remarks the letter "I" stands for integer field while letter "A" stands for alphanumeric character fields.

With specific regard to FIG. 42, a series of three-digit codes are depicted in the first, third and fifth columns of the Figure and each code relates to a particular 1 to 18-character size description. Example: the size code "774" relates to a size description of "⅞×5½ in." These size codes are used to identify material sizes within all files of the systems of the present invention. With specific regard to FIG. 43, it should be noted that the printout is divided into five columns of varying character length: "Item Number," "Size Code," "Size Description," "Price," and "Date." Note that even though size description, per se, is not part of the data structure of the price file, the size description for each line entry can be effectively printed through the size code entry of the price file which is used to search the size code file for the proper designation as the price file is generated. Error message can also be printed where appropriate.

Having previously described the data structure of new delta tape 113, a description of its utilization with reference to FIG. 44 is in order.

In FIG. 44, data flow and interfaces between the three primary programs within processors 125, 126 and 127 in material requisition system 29 are illustrated. Each program may be run independently or integrated into a "multi-job-step" computer run, provided sufficient tape or disc devices are available. When integrated, the separate three "processors" are united with their described programmed processors such as data file preprocessor 111 (previously described) and material purchasing processor 133 (to be described) within a single processor.

WITHDRAWAL UPDATE PROCESSOR 125

This program is used to create and maintain a magnetic tape or disc file containing the cumulative material requirements (i.e., "withdrawals") for each project. Each time the program is run, it produces a report showing all changes in material requirements for the current batch of input data.

In more detail, processor 125 of FIG. 44 reads input data from the new delta tape 113, from supplemental withdrawal cards 128a, from drawing number file cards 128b, from "old" withdrawal file tape 129, from size-price file tape 119, and from short descriptions file tape 84. These data are merged together, sorted, and used to generate new material withdrawal file tape 130 and withdrawal printout report 131. Data is sorted by material item number sequence, to wit: (i) size code, (ii) accounting code, (iii) drawing number (or code), (iv) drawing revision number (or sheet number).

The processor 125 then commands and causes withdrawal printout report 131 to be printed portraying quantity activity for the input batch being run in the sequence specified above.

WITHDRAWAL PRINTOUT REPORT 131

A sample page of the printout report 131 is illustrated in FIG. 45. Report 131 has an eight-column printout indexed as follows: "Item Number," "Size," "Drawing Number," "Sheet," "Accounting Item Number," "Quantity Per Drawing—Shop," "Quantity Per Drawing—Field," "Total Shop," and "Total Field." Error messages are printed during the withdrawal update processor run as required. Supplemental printouts may be made available for checking on the update operation if desired. These are obtained by appropriate commands to the processor 125. These printouts can include: (i) list of drawing codes, (ii) sorted and edited array of current withdrawal data, (iii) the entire new withdrawal file.

NEW WITHDRAWAL FILE TAPE 130

New withdrawal file tape 130, as written, merges the current withdrawal data with the data from "old" withdrawal file tape 129. Identification of current withdrawal data by drawing number is eliminated, and shop and field quantities are summed within each accounting code. In the new withdrawal file tape 130, items are identified by material item number, size code and accounting code for input to material summary processor 126.

INPUT DATA STRUCTURE TO PROCESSOR 125

As previously mentioned, input data structure to processor 125 is in digital format introduced via magnetic tape and/or punched cards. The format of these two input sources is essentially identical—the only difference being that tape records contain an isometric drawing number, whereas cards contain a drawing number code. When used, card inputs are for supplemental withdrawals of piping and electrical materials and for identification of drawing numbers, i.e., card deck 128a and drawing number file card deck 128b.

DELTA TAPE INPUT 113

Tape 113, originally generated by the processor of the computer 11 of FIG. 2, has been previously described with reference to the delta file preprocessor 111 of FIG. 40, as containing all withdrawal activity for the batch of isometric displays. Records fields contain the following in the manner previously described: material item number, size code, drawing number, drawing revision number, shop quantity, field quantity and accounting code.

SUPPLEMENTAL WITHDRAWAL DECK 128a

Special preprinted punched cards may be used to input withdrawal activity containing headings for the various fields of data. These cards make it possible to keypunch directly from original lists of materials of isometric displays. The same cards can be used for entry of purchase items, as is described later, and contains the following data:

(1) Material Item Number—Item numbers consist of 5 to 9 characters;

(2) Size Code—Size code consists of 2 to 4 integers;

(3) Shop Quantity—The quantity of material items needed for shop fabrication. A minus sign is punched to the immediate left of this entry when a reduction in quantity is indicated (revision of drawing has reduced the quantity needed);

(4) Field Quantity—Quantity of items needed for field erection. There will seldom be an entry for both shop and field for an individual material item. Again, a minus sign may be used;

(5) Accounting Item Number—Accounting code against which the material item should be charged (4 to 8 integers);

(6) Drawing Code—A 1 to 3-digit drawing code identifying list of materials drawing number is entered where required; and (7) Sheet Number—Sheet number, when the related drawing number represents a drawing consisting of more than one sheet, can also be entered. This entry can be 1 to 4 digits in length.

DRAWING NUMBER FILE CARD DECK 128b

Each material item entered into the withdrawal update processor 125 must contain a reference to its source document. The source documents involved are lists of materials drawings which are identified with a drawing number consisting of 6 to 10 characters (including a revision number). To minimize keypunching time and reduce keypunching errors, this string of characters is identified by a 1 to 3-digit drawing code. To enable the withdrawal report to show the full drawing number, a card file of drawing codes and related drawing numbers is employed. Cards for this file are keypunched through the use of a regular keypunch format. The card deck must be arranged in numerical order by drawing code so that no computer sort is needed.

Drawing card deck 128b is unique to a single computer run. Hence, for each withdrawal update run of processor 125 the drawing codes may be reinitiated. On the other hand, the codes may be continued in sequence for an entire project.

"OLD" WITHDRAWAL FILE TAPE 129

"Old" withdrawal file tape 129 is read by the withdrawal update processor 125 for the purpose of providing "former" cumulative quantities for both shop and field categories of material items. Records on this file, in alphanumeric sequence by material item number and in subsequence by size code and accounting code, also contain old cumulative shop quantity and old cumulative field quantity.

Addition of new withdrawal quantities (input via the delta tape and supplemental withdrawal activity cards) results in a new cumulative picture, which is written on the "new" withdrawal file tape 130. This new withdrawal file tape 130 then becomes the old withdrawal file upon the next running of the withdrawal update program.

SHORT DESCRIPTION FILE TAPE 84

This file tape, previously described, contains item numbers and abbreviated descriptions for all piping material items currently used. Briefly, the short description file tape is used in printing of the withdrawal printout report 131 as well as in material summary processor 126 to provide required descriptions of material items. This file is periodically updated to add new items and to delete items no longer used. The updating program has been previously described with reference to FIG. 16.

SIZE CODE AND PRICE FILE 119

File 119 contains both size and price data written on the same magnetic tape or disc:

(i) The first file contains size codes and their companion size descriptions, the size codes being used to identify material sizes on all files to facilitate sorting and matching, as by the withdrawal update processor 125 and material summary processor 128; and (ii) The second file contains prices for all sizes of piping material currently used, the prices being used by the material summary processor 126 in the manner described hereinafter.

PURCHASE UPDATE PROCESSOR 127

Purchase update processor 127 reads input data from the following: the new purchase file tape 132 generated by processor 133, the old purchase file tape 134, and the punched card deck 137. Briefly, as these data are merged together, sorting by item number, size, and purchase order number occurs and culminates in the combining of the "old" cumulative file tape 134 of purchased items to create new cumulative file tape 135 and current and cumulative purchase report 136. Revisions to existing orders entered via new purchases tape 132 are easily achieved, i.e., the quantity in the old purchase file tape 134 is being changed for a given item. The new quantity to be purchased is first compared to the old quantity purchased, and then the net difference is placed on new purchase tape 135. If the net difference is a revision downward, a minus sign precedes the quantity. New purchase tape 135 written serves as a primary input to material summary processor 126.

OLD PURCHASE ITEM FILE TAPE 134

File tape 134 is read by purchase update processor 127 for the purpose of providing data related to the "former" quantity status of material items purchased. Records on this file are in alphanumeric sequence by material item number and, subsequently, by size code and purchase order number. The detailed file structure is as set forth in Table X.

TABLE X

Data Structure
Old and New Purchase Tapes 134 and 135

| Record | Word No. | Contents | Format |
|--------|----------|----------|--------|
| 1 | 1–3 | Material Item Number | A3,A4,A2 |
|   | 4 | Size Code | I6 |
|   | 5 | Shop Quantity | I8 |
|   | 6 | Field Quantity | I8 |
|   | 7 | Material Requisition Code | I10 |
| 2 | (Repeat record 1 for each material item number) | | |

NEW PURCHASE ITEM FILE TAPE 135

The structure is identical to that of old purchase item file tape 134 except that shop and field quantity fields of the tape represent latest cumulative purchase status since the merging of the old file tape 134 with current purchase data has occurred within the processor 127. The new file tape 135 then becomes the "old" purchase item file tape for the next run of the purchase update processor.

INPUT DATA STRUCTURE FOR PROCESSOR 127

Input data may be introduced via magnetic tape and/or punched cards. The data format of these two input sources is essentially identical.

NEW PURCHASES FILE TAPE 132

File tape 132 is generated by the material requisition system 29 and is a primary input to the purchase update processor 127. Data structure is in alphanumeric sequence: by purchase order (requisition) number and, subsequently, by material item number and size code. The records also contain shop, field and old quantity data as well as order revision number data. The tape 132 represents current period purchase activity. The detailed file structure is set forth below in Table XI.

TABLE XI

| Field | Subfield | Columns | Contents |
|---|---|---|---|
| 1 | | 1–9 | Material Item Number |
| 2 | | 12–15 | Size Code |
| 3 | | 18–31 | Quantity |
| | 1 | 18–23 | Shop Quantity |
| | 2 | 26–31 | Field Quantity |
| 4 | | 32–42 | Purchase Order Number |
| 5 | | 44–47 | Order Code |
| 6 | | 52–59 | Revision Code |
| | 1 | 52–53 | Revision Number |
| | 2 | 54–59 | Old Quantity |
| 7 | | 60–78 | Size Description |
| 8 | | 81–83 | Batch Control Number |

SUPPLEMENTAL PURCHASES FILE CARDS 137

Special preprinted punched cards may be used to input purchase activity containing headings for the various fields of data. These cards make it possible to keypunch directly from original source documents, i.e., the purchase orders, as well as enter withdrawal data in the following format:

(1) Material Item Number—Item numbers consist of 5 to 9 characters;

(2) Size Code—Size code consists of 2 to 4 integers;

(3) Shop Quantity—The quantity of material items purchased for shop fabrication. A minus sign may be punched to the immediate left of this entry when a reduction in quantity is indicated;

(4) Field Quantity—Quantity of items purchased for field erection. Again, minus signs may be used, i.e., shop and field quantities entered on the card representing changes in quantities, plus or minus;

(5) Purchase Requisition Code—Enter a 1 to 3-digit purchase order (requisition) code identifying the purchase order number covering the item; and (6) Purchase Requisition Revision Number—Enter indicated revision number, if applicable.

OUTPUT DATA STRUCTURE OF PURCHASE UPDATE PROCESSOR 127

The purchase update processor 127 performs functions related, inter alia, to creations and maintenance of data related to the cumulative material quantities purchased for the project. Processor 127 does not automatically produce, however, a printed report 136 since such data may also be listed in separate printouts of material summary processor 126, as described below. However, the data structure of the new purchases file tape 135 can be checked by printout report 136, as desired, and these printouts can take the form depicted in FIGS. 46a and 46b. As shown in FIG. 46a, the current purchases printout has a six-column heading for all current purchases: (i) item number, (ii) size code, (iii) shop quantity, (iv) field quantity, (v) requisition code, and (vi) revision number. The requisition code is a one-digit code generated by the material requisition system 29 as described below. After the processor 127 has updated all purchase data, the cumulative purchase data on tape 135 takes the form depicted in FIG. 46b. As indicated, the six-column headings are similar to that depicted in FIG. 46a. Error messages can be generated, if desired. Error codes, described below, can be used to simplify editing and error detection functions.

MATERIAL SUMMARY PROCESSOR 126

In general, material summary processor 126 uses the cumulative withdrawal and purchase files to generate project material status reports. Three reports are produced: a project material control summary report 140 showing up-to-date total quantities purchased and withdrawn and percent withdrawn and balance remaining; a project material shortage list report 141 (briefly, a condensed version of the summary report) showing items overdrawn or having a specified percentage withdrawn; and an expenditure control report 142 showing the dollars expended against each accounting code. It is not necessary, however, to generate these reports every time the withdrawal or purchase files are updated. Usually command requests of the processor 126 cause report generation, and such commands are restricted to providing information for project administration and accounting only.

In more detail, material summary processor 126 program reads withdrawal file tape 100 and new purchase file tape 135, after appropriate matching of fields of the tapes, material control report 140 that shows the complete material status for the project is generated. Processor 126 can simultaneously generate expenditure control report 142 and material shortage report 141. Since the material summary processor 126 provides the most comprehensive run in the system of the present invention, a detailed description of the steps that are involved may be instructive:

(1) Matching of purchase records to withdrawal records;

(2) Subtraction of withdrawal quantities (shop and field) from purchase quantities by material item number and size;

(3) Calculation of percentage of withdrawal quantities to purchase quantities by material item number and size;

(4) Determination of short description for each material item number;

(5) Determination of size description for each size code used with each material item number;

(6) Material control summary report 140 printing; P (7) Expenditure report 142 printing; and (8) Material shortage report 141 printing.

The three reports 140, 141 and 142 will now be discussed in more detail.

MATERIAL CONTROL SUMMARY REPORT 140

Printout report 140 is depicted in FIG. 47 and contains, for each material item, the following information in columnar format: the material item number and short description thereof; the size description; purchase order number/revision number; total quantity purchased; accounting code; shop and field quantities withdrawn; balance remaining, i.e., purchased but not withdrawn; withdrawal items versus purchased items percentage in shop and field; and a dollar sign for any size material item for which a price does not exist.

With regard to the "size" column of report 140, the complete size description—and not the size code—is seen to be printed. This aids in the quick understanding of the information conveyed. With regard to the "percentage" column, when the withdrawal item quantities exceed the purchased quantities, "OD" is printed signifying an "overdrawn" condition has occurred. This aids in highlighting the information so that corrective action can be undertaken. Also, rather than have a percentage calculation for each transaction, a minimum ("setpoint") percentage level can be established to aid in highlighting critical data. I.e., only when the percentage ratio of withdrawn items over purchased items is equal to or greater than a certain level, say 85%, will a percentage printout occur. The 85% figure is the usual percentage used although any desired percentage may be specified.

MATERIAL SHORTAGE REPORT 141

Printout report 141 is an extract of the material control summary report 140 listing all items for which withdrawals exceed purchases or, more generally, exceed a certain specified percentage level of purchases. Thus, material items on the material control report 141 that were flagged by "OD" entries or percent entries on the summary report 140 will now appear in the material shortage report 141. The report quickly informs the project materials staff about items that need supplemental purchases. The report may also be used as a worksheet to show quantities to be purchased. In regard to the latter function, the worksheet has been found to be useful as a keypunch source document 144 of FIG. 44, the keypunching operation generating data cards 145 for input to material purchasing processor 133 and hence as an interface to material requisition system 29 described in detail below. The four items requiring keypunching are as follows: material item number, size code, shop quantity and field quantity. The project materials staff either can enter manually the quantity to be purchased on a supplemental purchase order or the source document 144 of FIG. 44 can then be sent directly to keypunching; then the punched card deck 145 becomes the input to the material requisition system 29 as discussed below.

FIG. 48 depicts a sample printout of the material shortage report 141 in more detail and includes the following data in columnar format: material item number, size code, short size description, total quantity purchased, total shop quantity withdrawn, total field quantity withdrawn, shop quantity balance, field quantity balance and unit price. A dollar sign indicates a missing price on any item.

EXPENDITURE REPORT 142

The expenditure report 142 shows the total dollars committed for a given piping project. As shown in FIG. 49, the report 142 depicts the cumulative sums of withdrawn dollars for each accounting code involved in the material control summary report 140. The cumulative sums are developed through repetitive multiplication of "shop" and "field" quantities by respective unit prices, followed by summing for each accounting code. A dollar sign appearing opposite any accounting code indicates that at least one material item did not have a unit price.

INPUT DATA STRUCTURE TO PROCESSOR 126

The data structure of the information inputted to processor 126 is in digital format introduced via magnetic tape and/or punched cards. As shown in FIG. 44, these include the following previously-described files: "new" withdrawal file tape 130, size-price file tape 119, short description tape 84 and new purchases file tape 135. Since the only new input data file is purchase order number file cards 146, only that file will be described in detail.

PURCHASE ORDER NUMBER FILE CARDS 146

Each material item entered into the purchase update processor 127 must contain a reference to a source document, i.e., to a particular purchase order. Each order is identified by a requisition, or purchase, order number consisting of from 7 to 10 characters per code. To minimize keypunching time and reduce keypunching errors, the string of characters is identified by a 1 to 3-digit "requisition code". But, to enable the material control summary report 140 to show the full purchase order number, a card file of requisition codes and related requisition numbers is employed as an input to the material summary processor 126. This card deck must be arranged in numerical order by requisition code since no computer sort is made. This file of requisition codes is initiated at the beginning of each piping project and is maintained manually via the addition of new cards throughout the course of the project.

MATERIAL REQUISITION PROCESSOR 133

An integrated material control and requisitioning system for use in the design of large fluid processing facilities require up-to-date information related to purchasing activity as well as current usage of the purchased piping items. Several thousand different piping items are usually required for such facilities and several purchase orders will usually be prepared for each piping item during the course of the design work. The usual procedure is for the design department to prepare requisitions and forward them to a purchasing department where purchase orders will be prepared for various suppliers. Competitive bids may be obtained before orders are placed, and the materials listed on requisitions may be split among several suppliers. To insure that piping items meet all of the design requirements, a detailed ordering description must be used. Seldom is the description adequate if referenced by a manufacturer's catalog number since there may be many variations of the item using the same basic catalog number. Thus, a complete ordering description is necessary to obtain meaningful competitive bids.

The system of the present invention provides an efficient computerized method of preparing purchase orders and providing up-to-date information related to purchasing activity keyed to current usage through the interfacing of the material summary processor 126 with the material requisition processor 133. The nature of the interrelation will become more apparent from the following detailed description of the material requisition processor 133. In brief, the material processor 133 accepts file input cards 145 indicating items to be purchased. These cards are punched as required, e.g., at project commencement and periodically thereafter as determined by the information contained in material shortage report 141. Additional inputs to the material processor 133 are the item description master file tape 148 and the size description card file tape 147 (or alternately card file 147a). File input cards 145 are balanced, edited, sorted and expanded by multiple system programs within processor 133 functioning in a stacked job stream. Tape and printed outputs are generated such as new purchases file tape 132, previously described, as well as printed material requisition list sheets 149 to provide the required information as to purchasing activity.

Reference is now made to FIG. 50 where processor 133 is shown in detail. Within the memory of the processor 133, several programs for manipulating input data are stored:
(i) "batchbal" program 150,
(ii) sortbtch" program 151,
(iii) "addesc" program 152,
(iv) "sortrdis" program 153, and
(v) "printreq" program 154.

Of importance in the functioning of these programs is the input information provided the material requisition worksheet 144 and, ultimately, material requisition card file 145. A brief description of the worksheet 144, therefore, may be instructive.

MATERIAL REQUISITION WORKSHEET 144

Material requisition processor 133 is the prime source document generator for all project purchasing activity. The material requisitions prepared upon project commencement and at varying intervals during the construction cycle are used to initiate all purchasing activity for a project. Initial requisitions are usually generated by estimating material requirements. Requisitions are generally broken down into major categories of materials (valves, pipe, weld fittings, etc.) to aid the purchasing department to group materials into orders that can be furnished by a single supplier. After material requirements have been more accurately established by material counts, additional requisitions will be prepared and some of the early requisitions may be revised. Revisions will be made when a quantity is reduced, when an item is eliminated or when modest increases in some quantities are needed and the materials on the original order have not yet been shipped.

Project Commencement

At the beginning of a project, responsible engineering personnel prepare a preliminary list of materials; usually a material summary report from a prior project that parallels the scope of the current project is used. That initial estimate is routed through the material control and requisitioning system 9 including file preprocessor system 27 and material status information and requisition systems 28 and 29 of FIG. 3 where it is broken down by major category (valves, weld fittings, etc.). Then, as indicated in FIG. 50, separate material requisition worksheet 144 can be prepared covering each category in the following coded sequence:
(1) Item Number—Enter in all cases.
(2) Size Code—Enter if existent.
(3) Quantity Shop—Enter if appropriate.
(4) Quantity Field—Enter if appropriate.
(5) Order (Requisition) Number
  (a) Enter 1 to 3 alphabetic character project prefix;
  (b) Enter 1 to 2 numeric character plant number;
  (c) Enter single character material classification code (e.g., "L" for piping);
  (d) Enter 1 to 4 numeric character order (requisition) number.
(6) Order Code—Same as 5 (d) above.
(7) Revision Number—Leave blank.
(8) Old Quantity—Leave blank.
(9) Size—Enter actual size when no size code exists.
(10) Batch Number—Leave blank.

FIGS. 51 and 52 illustrate a worksheet 144 and record format of a sample material requisition file card 145, respectively.

Subsequent Project Changes

Following project commencement, various changes in requirements occur. For example, shortages may appear or designs may be modified. In order to maintain accuracy in reporting, these changes must be related to the appropriate original purchase order being modified. This is accomplished in FIG. 50 through preparation of supplemental material requisition worksheet 144 and through material requisition file cards 145 which carry the same order number as the original cards. In these cases, however, certain changes in the entry sequence on worksheet 144 are desired. These are:
(1) Revision Number—A 1 to 2 numeric character revision number is entered—this number is sequential for each original order number;
(2) Old Quantity
  (a) If the quantity is changed (plus or minus), an appropriate "Shop" or "Field" quantity is entered on the original order and also a new total purchase figure is entered in the appropriate "Shop" or "Field" quantity column;
  (b) If a new item is being added, enter "0", followed by an appropriate "Shop" or "Field" quantity entry;
  (c) If an item is being deleted, enter the appropriate "Shop" or "Field" quantity on the original order and enter a "0" under "Shop" or "Field" quantity; in both cases, the total quantity must be entered in either the "Shop" or "Field" quantity column.

Separate columns provide information as to the quantity of material item to be purchased depending upon whether the material is to be delivered to a fabricating shop or to the field construction site. This technique makes it possible to provide data for the material control system to keep separate records for materials for shop and field needs. Note that on any one purchase order number either the shop or field entry may be used—but not both. On order revisions the final total quantity is entered—not the change in quantity. Thus, if an item is to be totally deleted from an order, the entry is a zero (0).

For revised orders the "old quantity" column entry is used for two purposes: it will be printed on the requisition sheet 149 to clearly identify the change in quantity for an item, and it will be used by the purchase update processor to determine the net change in quantity for the update purchase file tape 135 of FIG. 44.

Batch Control

Upon completion of entries on material requisition worksheet 144, "Shop" and "Field" quantity columns are totaled at the bottom of each column on each sheet. Sheets are then grouped into batches, cumulative totals of "Shop" and "Field" quantity columns are entered on the top sheet of each batch with the designation "CTL" (i.e., "cumulative totals"). Batch number is also entered in the appropriate box on each sheet. Batched material requisition forms are then keypunched to form material requisition cards 145 using appropriate entries as set forth above. The "totals" are also punched to provide valuable cross-checking information to identify possible keypunching errors.

In more detail, the "batchbal" program 150 is instructed to compare the accumulated "Shop" and "Field" totals for all material items in the batch against the total (or totals) entered on the "totals" control card or cards. If the item totals do not match control totals, the batch will be rejected, and an error listing will be printed. Control totals are available for both "Shop" and "Field" categories. Usually the data for several purchase orders are included in one batch. The number can vary over a wide range, but for efficient use of the system at least fifty orders should be included as one batch. Note also that the larger the batch, the greater the chance for error and rejection of the run.

The "totals" control card (one for each batch) should be punched as follows:

(1) Identification—Enter the characters "CTL."
(2) Shop Total—Enter the numerical sum of all shop quantities contained in the batch.
(3) Field Total—Enter the numerical sum of all field quantities contained in the batch.
(4) Batch Number—Enter batch number.

"BATCHBAL" PROGRAM 150

In performing required balancing, editing and tape conversion functions, briefly, the program 150 first reads the input data for material items to be requisitioned and compares batch control totals with total quantities of the separate item entries. Batches containing errors, as determined by the batch control totals, are rejected and an error listing is printed as a printout record 156. Rejected batches are not converted to tape in the same pass but reentry of these batches can be effected in a subsequent run. The program then edits each input record, as follows:

(1) Checks if first position of item number is alphabetic.
(2) Checks size code field and size description field for the presence of data in either of the two fields, but not in both.
(3) Checks shop and field quantity fields for the presence of data in either of the two fields, but not in both.
(4) Checks shop and field quantity fields to assure that data in either field is equal to, or greater than, zero (no credits).
(5) Checks purchase order number field for data content.
(6) Checks third position of purchase order number for an alphabetic character.

Failure of any card record to pass the above tests results in a printout of the failure item.

REQUISITION FILE 155

"Batchbal" program 150 also generates file 155 containing edited data for material items to be requisitioned. The record format is similar to that shown in FIG. 52, containing the following fields: material item number, size code, shop quantity, field quantity, order (requisition) number, order code, revision number, old quantity, size description and batch number.

ERROR PRINTOUT RECORD 156

In addition to the requisition file 155 above, "batchbal" program 150 also generates error printout 156. If the program rejects any entry, or the entire batch, each item rejected will be listed with the following fields being shown for each: item number, size code, quantity-shop, quantity-field, order number, order code, revision number, old quantity, actual size (if no size code), batch number and error type. The error code can be as follows:

| ERROR CODE | ERROR DESCRIPTION |
| --- | --- |
| 1 | First position of item number is not alphabetic. |
| 2 | Both size code and size description fields are blank. |
| 3 | Both shop and field quantity fields contain data, both are blank, or one is a credit figure. |
| 4 | Third position of order number is not alphabetic. |
| 5 | Order number field is not coded. |
| 6 | Order code is less than "0001". |
| 7 | Revision number is blank, but "Old" quantity has an entry. |
| 8 | Control card shop quantity is not equal to total shop quantity on detail cards. |
| 9 | Control card field quantity is not equal to total field quantity on detail cards. |
| 10 | Batch "totals" control card is missing. |

"SORTBTCH" PROGRAM 151

This routine reads random material item records from the requisition file 155 and sorts these records into item number sequence and then, within each item number, into order number and order revision number sequence to form sorted requisition file 157. The sort can accept a maximum of 113,960 input records.

"ADDESC" PROGRAM 152

Briefly, "addesc" program 152 reads sorted requisition file 157 and the item description master file 148, matching records on the item number field. Upon matching, the detailed ordering description from the master record is combined with the data of file 157 and new records are written to form the requisition and description file 158. After sorting, this latter file serves as a primary input to "printreq" program 154.

If a match of item numbers is not found or a duplicate entry is found, i.e., material item number, size code and quantity must be the same, "addesc" prints appropriate information on an error list 159. These items are excluded from further processing.

Briefly, item description master file tape 148 is a two-segment file:

(1) The first segment of this file contains detailed descriptions for every piping material item currently used by the piping system. Sequence is alphanumeric by item number. A typical description is as follows:

"VALVE-GATE 150 LB. USAS FLANGED, 1/16 RF, F/D, OS&Y, CAST CARBON STEEL PER ASTM A-216 GRACE WCB, 12 CHROME STEEL SEAT, DISC AND STEM, SOLID WEDGE, BOLTED BONNET. PER API STD. 600. CRANE FIG. 47X PACIFIC 150-1 OR EQUAL APPROVED BY PURCHASER. PACIFIC FIG. 3150-1 IS ACCEPTABLE SUBSTITUTE FOR 1½ and 2 IN. SIZES. SEE NOTE G."

(2) The second segment of the file contains reference noted called for by various ordering descriptions. For example, NOTE G is as follows:

"A METAL OF AT LEAST 2,000° F. MELTING POINT AND 10% ELONGATION IS REQUIRED FOR THE YOKE BUSHINGS, SLEEVES OR DRIVE NUTS, YOKE SLEEVE NUTS, AND GLAND FOLLOWERS ON ALL STEEL AND ALLOY STEEL OS&Y VALVES. AISI C12L14 LEADED STEEL, TYPES 303MA, 416, OR 430 STAINLESS. DUCTILE IRON, NI-RESIST TYPES D-2C, D-3A, OR D-5 ONLY ARE EXAMPLES OF ACCEPTABLE MATERIALS."

The required note text will be printed at the end of the purchase order list sheets 149. The item description master file tape 148 is described in more detail below with specific reference to FIG. 56.

REQUISITION AND DESCRIPTION FILE 158

Since file 158 is the primary output of "addesc" program 152, records on this file contain the same data as requisition file 157 with the addition of detailed ordering descriptions.

"SORTRDIS" PROGRAM 153

This routine reads material item records from file 158 and sorts them into primary sequence by order number and into item number and size sequence within each order number to form sorted file 159. The sort can accept a maximum of 113,960 input records.

"PRINTREQ" PROGRAM 154

The "printreq" program 154 is the final program in the material purchasing system 29. It reads material item records from file 159, retrieves notes from the item description master file 148 and updates the size code file 147. It also produces purchase order list sheets 149 and generates the new purchases tape 132 which constitutes the interface with the material control system 28.

In more detail, "printreq" first reads the second segment of the item description master file 148 (i.e., the notes segment) and then writes the read notes to the note work file 146. It then ascertains from the control card whether or not a new size code tape file 160 is to be created. If so, it reads the updated size code card deck 147a and creates a new size code tape file 160. If not, the program uses the old size code tape file 147. Following this step, "printreq" reads records from the previously sorted requisition and description file 159, adds size descriptions as indicated from the size code file 147 or 160 and outputs purchase order list sheets 149 together with appropriate vendor notes and new purchases tape 132. It also prints an error listing of items that did not match on size code on printout 161.

Size Code File (Old & New) 147, 147a and 160

These files, maintained in both card and tape form, are employed by "printreq" for the purpose of converting size codes to size descriptions for printing on purchase order list sheets 149. The tape file 147 may be updated as part of a normal "printreq" run.

Normally, the only card input used with "printreq" is a control card. However, when the size code file 147 requires updating with new size codes, size code deck 147a may be inputted to "printreq." This is necessary only when changes, additions or deletions to existing size codes have occurred since the last running of the program.

The size code file 147 is maintained on both cards and tape. The tape file is used by "printreq" to print size descriptions. New size cards must be placed in the size code deck 147a in numerical order of size codes. The entire card file is then entered to "printreq" for the purpose of updating the size code tape 147 to form new size code file 160 prior to the printing of list sheets 149.

Note Work File 146

The note work file 146 contains all note text found in the second segment of the item description master tape file 148. "Printreq" first copies all records in the second segment on the note work file 146. Required notes are subsequently printed on the last list sheet 149 for each purchase order.

New Purchases Tape 132

The tape 132, generated by the "printreq" program, contains data for all material items printed on the list sheets. It is a primary input to the purchase update processor in the material control system 28. Records on this tape are in alphanumeric sequence by purchase order number and also contain purchase order revision number, material item number, size code, size description, shop quantity, field quantity and old quantity, as previously described.

Purchase Order List Sheets 149

The sheets 149 contain complete ordering information as shown in FIGS. 53, 54 and 55. The first page (not shown) is always labeled sheet "2" since the list sheets are covered by a typewritten purchase order form showing vendor name, address, shipping information, and terms of purchase. As indicated in FIG. 53, list sheets are in purchase order number sequence and in material item number sequence within each new order number. The full description of each material item—no code size—is printed only once with individual sizes for the given item appearing immediately beneath the item description.

Order revisions are depicted in FIG. 54. The last order quantity (for the item and size) appears on the right side of the list sheet, and the revised (new) order quantity appears in the "quantity" column. If an item is being ordered for the first time, the quantity appears only in the "quantity" column.

Purchase order notes are shown in FIG. 55. The last list sheet for each purchase order contains any appropriate notes relating to items on the given purchase order. Any requisition and description file record that did not find a match on size code (in the size code file 147) or that already contains a size description is written out as an error on listing 161.

ITEM DESCRIPTION MASTER FILE 148

As previously mentioned, master file 148 consists essentially of the two-segment file and is used in both the "addesc" and "printreq" programs 152 and 154 of FIG. 50. Prior to such use, the file 148 must be created (and/or may be updated) in catalog processor 170. A discussion of that procedure with reference to the catalog processor 170 of FIG. 56 is believed to be instructive and is set forth briefly below.

CATALOG PROCESSOR 170

In general, the catalog processor 170 of FIG. 56 is a compilation of command instructions for handling material item numbers with their related ordering descriptions for all piping materials of a given piping project, plus a series of special notes that define certain manufacturing requirements. As shown, output of the processor 170 is item description master file 148, printed material catalog 171 and error listing 172. The basic objective of the catalog processor 170 is to create (and/or update) both the ordering description and note segements of the item description master file 148 in the fashion set forth briefly below:

(1) Item and note input cards 168 and 169 are first converted to disc image within subprocessor 170a forming disc file 173. Total card input acceptable (item and note combined) is about 133,000.

(2) Input records on the disc file 173 are then sorted via subprocessor 170b into the following sequence to form sorted file 174:

(i) Description records: Line number within item number.

(ii) Note Records: Line number within note code. Subprocessor 170b employs two work discs for a given work area, with a primary allocation of 18 cylinders and a secondary allocation of 114 cylinders.

(3) Sorted file 174 is then entered into the catalog subprocessor 170c together with "old" item description master file 148a where the following occur:

(i) Order description records are read and matched with related catalog records on the basis of material item number;

(ii) For a certain transaction code, say code "15", the existing description is revised by the new line (or lines) of input data, and written to the updated master file tape 148. If the item to be updated cannot be found on the old master file 148a, the input data is written to a temporary error file 175.

(iii) For another transaction code, say code "10, " additions are merged into the proper location on the "old" item description master file 148a.

(iv) On the transaction code "10, " input item data that finds an identical matching item number on the "old" file 148a is routed to a temporary error file 175 since the match indicates that the given item is already on the file, and the new item probably contains an error.

(v) For notes, the input note code is compared with the note code on the "old" file 148a. Upon match, the note record is updated and written on the updated "new" master file 148. If no match is found (an "addition" entry), the new note record is merged into the proper location in the catalog note segment of the master file and numbered with the appropriate series line number.

(vi) Following update of the item master file, the temporary error file 175 is read and error listing 172 is printed.

(vii) Item and note text on the updated item master file is printed as material catalog sheets 171, either partially or totally, depending upon control commands within the catalog subprocessor 170c.

PRINTED MATERIAL CATALOG SHEETS 171

The primary output for catalog subprocessor 170c consists of printed sheets 171 formed into a material catalog. In addition to the normal printing obtained during an update run, there are seven options available to obtain printout of selected groups of items from the subprocessor 170c. These options provide a convenient method of keeping the printed catalog up-to-date without reprinting every page each time the item master file 148 is updated.

The usual procedure is to print sheets of permanent items on white paper. For each update, supplemental pages are printed listing the new items added. The supplemental sheets are usually printed on colored paper for easy identification and are automatically broken into the tabbed catalog sections. Periodically the entire catalog should be reprinted, grouping "temporary" and permanent items in correct alphanumeric order. However, the system is very flexible, and any visible technique may be used to maintain an up-to-date catalog. A typical ordering description (Item L20BA3CA) would be as follows:

"VALVE-GATE, 150 LB. USAS, FLANGED, 1/16 RF, R/D, OS&Y, CAST CARBON STEEL PER ASTM A-216 GRADE WCB, 12 CHROME STEEL SEAT, DISC AND STEM, SOLID WEDGE, BOLTED BONNET. PER API STD. 600. CRANE FIG. 47X, PACIFIC 150-1 OR EQUAL APPROVED BY PURCHASER. PACIFIC FIG. 3150-1 IS ACCEPTABLE SUBSTITUTED FOR 1½ AND 2 IN. SIZES. SEE NOTE G."

A separate section of the printed material catalog contains pertinent notes relating to certain ordering descriptions. These notes, which are general qualifications relating to a number of ordering descriptions, are typically as follows:

"A METAL OF AT LEAST 2,000 F MELTING POINT AND 10% ELONGATION IS REQUIRED FOR THE YOKE BUSHINGS, SLEEVES OR DRIVE NUTS, YOKE-SLEEVE NUTS, AND GLAND FOLLOWERS ON ALL STEEL AND ALLOY STEEL OS+Y VALVES. AISI C12L14 LEADED STEEL, TYPES 303MA, 416, OR 430 STAINLESS, DUCTILE IRON, NI-RESIST TYPES D-2C, D-3A, OR D-5 ONLY ARE EXAMPLES OF ACCEPTABLE MATERIALS."

Table XII illustrates a portion of page 97 of the printed catalog. This page contains permanent items. Items with a "C" printed along the right-hand margin indicate descriptions corrected in the last update run. Items with "N" printed indicate new items added in the last update. These "flags" will remain on the file, and continue to print, until a catalog run is made with update codes "1" or "2."

TABLE XII

Material Catalog - Permanent Items
"ENGINEERING DEPT. MATERIAL ORDERING DESCRIPTIONS PAGE 97

| | | |
|---|---|---|
| L20PRODF | VALVE - GATE, 1500 LB. USAS, SCREWED, OS+Y, 1-¼ CHROME ½ MOLY ALLOY STEEL PER ASTM A-217 GR. WC6 OR A-182 GR. F11, STELLITE FACED TRIM, 12 CHROME STEEL STEM, | C |

TABLE XII-continued

Material Catalog - Permanent Items
"ENGINEERING DEPT. MATERIAL ORDERING DESCRIPTIONS PAGE 97"

|  |  |  |
|---|---|---|
|  | CONFINED JOINT BOLTED BONNET, JOHN CRANE PACKING 1871 OR (*), SOLID WEDGE, FULL PORT, PACIFIC 31551-7 OR (*). NOTE G AND AF. (*) OR EQUAL APPROVED BY PURCHASER. |  |
| L20PR6EF | VALVE - GATE, 1500 LB. USAS, FLANGED, RING JOINT FACE, F/D, OS+Y, CAST 1-¼ CHROME ½ MOLY ALLOY STEEL PER ASTM A-217 Gr. WC6 AND API STD. 600, STELLITE FACED TRIM, 12 CHROME STEEL STEM, API RING JOINT BOLTED BONNET, JOHN CRANE 1871 PACKING OR (*), SOLID WEDGE. CRANE 87X, PACIFIC 1550-M OR (*). NOTE G AND AF. (*) OR EQUAL APPROVED BY PURCHASER. |  |
| L20PSJNAF | VALVE - GATE, 1500 LB. USAS, BUTT WELD ENDS, SCH. 120 BORE, OS&Y, CAST 2-¼ CHROME-1 MOLY ALLOY STEEL PER ASTM A217 Gr. WC9 AND API STD. 600, 12 CHROME TRIM, TYPE 304 CR,NI. STEM, PRESSURE SEAL OR WELDED BONNET, JOHN CRANE PACKING 1871 OR (*), FLEXIBLE WEDGE, CRANE N BEVEL GEAR OPERATED. CRANE 787U CHAPMAN 1500PS, LUNKENHEIMER 2490X-B7,POWELL 11303WE,WALWORTH 5262PS OR (*). NOTE G,AF. (*) OR EQUAL APPROVED BY PURCHASER. | N |
| L20PSLNAF | VALVE - GATE, 1500 LB. USAS, BUTT WELD ENDS, SCH. 120 BORE, OS&Y, CAST 2-¼ CHROME-1 MOLY ALLOY STEEL PER ASTM A217 GR. WC9 and API STD. 600, 12 CHROME TRIM, TYPE 304 CR.NI STEM, PRESSURE SEAL OR WELDED BONNET. JOHN CRANE PACKING 1871 OR (*), FLEXIBLE WEDGE, CRANE N BEVEL GEAR OPERATED. CRANE 787U CHAPMAN 1500PS, LUNKENHEIMER 2490X-B7, POWELL 11303WE,WALWORTH 5262PS OR (*). NOTE G,AF. (*) OR EQUAL APPROVED BY PURCHASER. |  |

02-15-69"

Table XIII illustrates a portion of a typical page of temporary items. As previously noted, "C" or "N" printed along the right-hand margin identifies status of the description. The two-character codes appearing near the right-hand side or under the description are the "temporary" item indicators showing the project that initiated the request for the item. This page of temporary items was printed using update code "6," and hence, all data entered is printed. In the Table, two items show a drawing number reference as well as the temporary item indicator.

TABLE XIII

Material Catalog - Permanent Items
"ENGINEERING DEPT. MATERIAL ORDERING DESCRIPTIONS PAGE 59"

|  |  |  |  |
|---|---|---|---|
| L43ZEP53 | FLANGE - BLIND, 1500 LB. USAS, OPJ FACE, F/D, FORGED CARBON ½-MOLY ALLOY STEEL PER ASTM A-182 GRADE F1. CLAD FACE AND PROCESS WETTED SURFACE WITH ⅛ IN. THICK 321 STAINLESS STEEL PER SA-264 WITH SA-240 CHEMISTRY OR OVERLAY WITH E-347 ELECTRODE WITH COMPOSITION AS SET FORTH IN SA-240. |  | N |
|  |  | EP |  |
| L45JR6F | SPACER - PADDLE HANDLE, FOR 600 LB. USAS FLANGES, FORGED 1-¼ CHROME ½ MOLY ALLOY STEEL PER ASTM A-182 GRADE F11. FABRICATED WITH ORJ FACES PER PURCHASERS DRAWING GA-L-14298. GA-L-14298 |  | N |
|  |  | JS |  |
| L45JR6G | BLIND - PADDLE HANDLE, FOR 600 LB. USAS FLANGES FORGED 1-¼ CHROME ½ MOLY ALLOY STEEL PER ASTM A-182 GRADE F11. FABRICATED WITH ORJ FACES PER PURCHASERS DRAWING GA-L-14298. GA-L-14298 |  | N |
|  |  | JS |  |
| L45LR6G | BLIND - PADDLE HANDLE, FOR 900 LB. USAS FLANGES, FORGED 1-¼ CHROME-½ MOLY ALLOY STEEL PER ASTM A-182 GRADE F11. FABRICATED WITH ORJ FACES PER PURCHASES DRAWING GA-L-14298. GA-L-14298 |  | C |
|  |  | EP |  |

02-15-69"

Table XIV illustrates a portion of a typical page of notes. Update indicators are not used for notes.

TABLE XIV

Material Catalog - Notes
"ENGINEERING DEPT. MATERIAL ORDERING DESCRIPTIONS PAGE 2"
NOTES

| NOTE AK | PURCHASER INTENDS TO INSPECT THIS ITEM. CASTINGS SHALL BE IN THE SOLUTION HEAT TREATED AND PICKLED CONDITION. AFTER HEAT TREATMENT AND PICKLING CASTINGS SHALL BE DYE PENETRANT INSPECTED IN ACCORDANCE WITH NOTE W AND RADIOGRAPHED AND SHALL MEET ASTM E-71, CLASS 2. |
|---|---|

TABLE XIV-continued

Material Catalog - Notes
"ENGINEERING DEPT. MATERIAL ORDERING DESCRIPTIONS PAGE 2

NOTES

|  | WELDS SHALL BE 100 PERCENT RADIOGRAPHED AND EVALUATED IN ACCORDANCE WITH PARAGRAPH UW-51 OF ASME BOILER AND PRESSURE VESSEL CODE, SECTION VIII. |
|---|---|
| NOTE AL | PURCHASER INTENDS TO INSPECT THIS ITEM. PLASTIC-LINED PIPE, FITTINGS AND VALVES SHALL BE INSPECTED BY A 10,000 VOLT (OR A VOLTAGE NOT GREATER THAN MANU-FACTURERS RECOMMENDATION) NON-DESCRUCTIVE ELECTROSTATIC SPARK TEST TO DETECT PIN HOLES OR POROSITY. FOR RIPE AND FITTINGS THE TEST SHALL BE MADE ON THE COMPLETED ASSEMBLY AND FOR VALVES ON EACH SEPARATELY LINED SUBASSEMBLY. PARTICULAR ATTENTION SHALL BE TAKEN TO TEST SEAMS AND AREAS REQUIRING SPECIAL METHODS TO ACHIEVE A SEAL. VENDOR SHALL REPLACE OR REPAIR ALL DEFECTIVE ITEMS. REPAIRED ITEMS SHALL BE RETESTED. |
| NOTE AM | THE MECHANICAL AAND CHEMICAL PROPERTIES OF THE HASTELLOY B MATERIAL SHALL CONFORM TO ASTM A494 OR ASTM B333. |

02-15-69"

Catalog Printing Options

Table XV shows update/printing options available within the catalog subprocessor 170c. Note that the first four options apply to both permanent and temporary items; the next two only to permanent items, and the last two only to temporary items. Further features of note are:

(1) A new item master file tape 148 is written with update codes "blank," "1," "2," and "7." With update codes "blank" and "7," items are being added or deleted from the file within the subprocessor. With update codes "1" and "2" a new file is written because the update flags "C" or "N" have been blanked out.

(2) A temporary item flag card is printed only for update codes "blank," "6" and "7."

(3) The temporary item indicator is printed "**" for update codes "1," "2" and "3." Note that for these options, temporary items are included with permanent items in the printout.

| Error Code | Nature of Error |
|---|---|
| A | Item not located on material catalog file |
| B | Invalid transaction code |
| C | Invalid line number |
| D | A transaction code "10" input item (addition) matches an item already on the file |
| F | First position of item number is not alphabetic |

ITEM MASTER FILE 148

The only system file of subprocessor 170c of importance is item description master file 148. As mentioned previously, this file is comprised of two segments, both of which reside on the same physical device. The first segment is the larger, say up to 420 characters per record and contains material item numbers and related ordering descriptions for every piping item to be used in the piping system. Data sequence is usually alphanumeric and indexed by material item number. The second segment contains note codes and related note text for all notes referenced in the material ordering descriptions contained in the first file segment. Data file structure is smaller, say 67-bit positions per record.

TABLE XV

| Item Classific. | Type of Run | Update Coded Date Card | Input Data Card? | Write New File? | Print Note File? | Print Perm. Items? | Print Temp. Items? | Update Digit Blanked Out? Perm. Items | Update Digit Blanked Out? Temp. Items | Print Temp. Item Flag? |
|---|---|---|---|---|---|---|---|---|---|---|
| All | Update Run | Blank | yes | yes | ② | ①④ | ①④ | no | no | yes④ |
|  | Print Catalog Supplement | 1 | no | yes | no | yes | yes | yes | yes | yes as "**" |
| Items | Print Entire Catalog | 2 | no | yes | yes | yes | yes | yes | yes | yes as "**" |
|  | Print Series of Items | 3 | no | no | no | yes | yes | no | no | yes as "**" |
| Permanent Items Only | Print Catalog Supplement (new or revised perm. item) | 4 | no | no | no | yes | no | no | no | no |
|  | Print all permanent items | 5 | no | no | no | yes | no | no | no | no |
| Temporary Items Only | Print all Temporary Items | 6 | no | no | no | no | yes④ | no | no | yes④ |
|  | Temporary Item Mass Delete | 7 | no | no | no | no | ③④ | no | no | yes④ |

1-Only if item affected by transaction card
2-If any note is updated by a transaction card, the entire note file is printed
3-Only temporary items which are being deleted
4-A temporary item flag card is printed following the complete item description

Error Listing 172

Each item on the error list 172 will show all input data for that item together with the appropriate error code at the right. Typical error codes are defined as follows:

ITEM AND NOTE CARDS 168, 169

Item and note cards 168, 169 for the input to convertor subprocessor 170a have formats identifiable with that of item master file 148. In more detail, item cards 168 relate to descriptions for material items consisting of 1 to 7 lines, each of 60 characters or less, for a total of 420 possible characters. In addition, each ordering description may have additional data, usually are of three reference types: engineering drawings, specifications and notes. Drawings and specifications are separate documents and are not part of the catalog processor 170. Notes, however, are part of the catalog processor 170 and are printed at the end of each purchase order if they are referenced by one or more ordering descriptions and are imprinted via input cards 169.

When preparing input data for ordering descriptions and notes, the text should be entered on the keypunch form exactly as it is to be printed in the catalog sheets 171 and on purchase orders. Inventory data via cards 168 and existing ordering descriptions may be revised entirely, or have one or more lines replaced by appropriate "transaction code" entries to obtain a complete "picture" of all data associated with a material item number on the file (viz., to reference notes, temporary flags, etc., as well as description text).

To prepare the input data for a new ordering description, after the text has been filled out, indices of importance are as follows:

(i) a transaction code is used to indicate the new item is not on file and must be entered on each line of new text used;

(ii) a material item number is used and must be entered on each line of text used;

(iii) line numbers are used, if applicable;

(iv) a description of the item is used, up to a maximum of 420 characters exactly as same is to be printed on purchase orders and in the catalog and includes required references to drawings, specifications and notes;

(v) a drawing number, if applicable, is used which is then listed as an attachment to the purchase order;

(vi) notes, if applicable, are used;

(vii) a specification number, if applicable, is used; and (viii) a temporary item number indicator; if applicable, is used; i.e., if the item number has been requested for a specific project, it is considered temporary. At the end of the project it may be deleted. Temporary "flags" are attached to these items, in order to identify them. Upon periodic review of the catalog, decisions are made regarding their retention or deletion.

If order descriptions of material items already on the file are to be replaced, corrected, or deleted, appropriate transaction codes and descriptive data are as follows:

(i) to replace an entire ordering description, enter a predetermined transaction code, say code "15" and then fill in all data for a new item;

(ii) to replace one or more lines or description, such as to correct an error in an existing ordering description, at least one complete line will have to be filled out. The program will replace all existing characters for a particular numbered line in the file within subprocessor 170c with those entered on the same numbered line using the correct transaction code, say "15" as before. Therefore, one or more lines of descriptive data may be replaced and/or additional lines added by such entries;

(iii) to delete an entire ordering description from the file, enter another transaction code, say code "97" plus the material item number. This is all the data needed to purge the entire item from the file;

(iv) to indicate printing, enter another transaction code, say code "91" together with the material item number to obtain a selection print of the specific item. This selective printing is called a "picture" of the records on the file.

If input data is via cards 169 for catalog notes, similar processor instructions must be implemented. Notes may be of any length, and line numbers for notes are quite flexible. Lines can be numbered 01, 02, 03, etc. or 10, 20, 30, etc. The program numbers the lines of a new note on the file 10, 20, 30, regardless of the line numbers used for input. Therefore, if the second line of a note is to be revised, it must be referenced as line 20. This numbering system is used to make it easy to insert additional lines in existing notes without keypunching the entire note text.

To prepare input data via cards 169 for a new note, input data should include the following:

(i) a transaction code to indicate a new note that is not on file, the code being entered on each line used;

(ii) a note code, say represented by letters such as "A," "AB," "BB," etc. These one or two-character codes must appear;

(iii) line numbers in which each input line contains a line number in sequence; and (iv) note text in which one or more lines of text is entered (coded) exactly as it should appear on purchase order list sheets.

Notes already on the file may be revised in the following fashion:

(i) by use of a separate transaction code, say code "98" to indicate note revisions and additions as well as for new notes which must be entered on each line used;

(ii) by entry of a note code exactly as entered for the original note;

(iii) by indicating the line number if a specific line of note text is to be replaced; to add a line or lines at the end of the existing note text, number added lines code, starting with a number higher than the last existing line on the file; to insert additional text between existing lines, number the new lines with increments of one;

(iv) to delete an entire note from the file, enter another transaction code, say code "97" together with the correct code which causes all records associated with the note to be deleted;

(v) to obtain selective printout of a note, enter yet another transaction code, say code "91" and the correct note code.

Although only certain embodiments of the present invention have been illustrated and described, the invention is not meant to be limited to these embodiments, but rather to the scope of the following claims.

We claim:

1. A graphical system for producing in a plane having two-dimensional pipeline coordinate axes, a planar axonometric representation of a three-dimensional pipeline in which material and non-material piping elements of said pipeline are associated with a multibit digital code representative of a series of workpoints compatible for use within a digital computer system, said workpoints being paired into overlapping sets, each set containing a dominant and subservient point having known relative three-dimensional coordinates, each subservient point having known coordinates $X_{i+1}$, $Y_{i+1}$, and $Z_{i+1}$, with respect to intersecting axes X, Y and Z, and being identified in relative three-dimensional coordinates by a distance (d) between it and the dominant point and values of two angles of a straight line intersecting them as related to orthogonal planes of reference through said dominant point, each dominant point having known three-dimensional coordinates $X_i$, $Y_i$, $Z_i$, said planar representation being produced in conjunction with said digital computer system, comprising a memory for storing graphic and piping information about said pipline as machine readable data words or portions of words, a processor for combining, comparing and sorting said data words so as to indicate spatially selective relationships between said piping elements as a function of said workpoints, a controller for supervising said processor as well as controlling a display plotter for producing said two-dimensional, axonometric representation of said pipline, said memory including (1) a first storage file for classifying said material and non-material piping elements in conjunction with engineering piping specifications including subfiles of decisional tables (i) for indicating branch reinforcement requirements for selective types of piping connections as a function of branch and pipe size and for indicating type of branch required for a selected directional angular change as a function of branch and pipe size, and (ii) for associating additional sort and decisional tables indexed as a function of depicted and coded piping elements with proper material item numbers based on pipe size, or a simplified functional multibit subcode, (2) a second storage file of generalized sort and decisional tables for indicating as a multibit binary display code, dimensions of said piping elements associated with said workpoint digital code required to correctly display each piping element as a standard piping symbol, in prespective, at said display plotter, said generated display code being indexed from said second storage file as a function of a material item number stored in and indexed from said first storage file through an item number reference table subcode which includes drawing symbol and connection type minicodes for controlling selected dimensional tables and subroutines required to accurately and correctly display, in prespective, said piping symbols as well as present drafting notes and annotated leaders at said plotter, (3) a third storage file of material item numbers indexed to material item short description terms in a format suitable for providing a list of materials in association with said planar representation of said pipeline at said display plotter, (4) a fourth storage file of decisional and sort tables for indicating relative three-dimensional coordinates of said subsurvient and dominant workpoints as well as auxiliary workpoints whose coordinates were previously defined, as a function of distance (d) between adjacent workpoints b as well as angles $\beta$ and $\alpha$, previously defined, in accordance with $$d = \sqrt{(X_{i+1}-X_i)^2 + (Y_{i+1}-Y_i)^2 (Z_{i+1}-Z_i)^2} \quad (1)$$

and projection(s) of d onto said horizontal plane is $d_{horiz.} = d \cdot \cos \beta$ where $\beta$ is the included angle in the vertical plane of reference, $$(Z_{i+1}-Z_i) = d \sin \beta, \quad (2)$$

$$(X_{i+1}-X_i) = d \cos \beta \cdot \cos \alpha$$

where $\alpha$ is the included angle in the horizontal plane of reference, $$(Y_{i+1}-Y_i) = d \cdot \cos \beta \cdot \sin \alpha$$

with respect to a base location having known coordinates, with said planar representation as seen from an eyepoint located at a selected coordinate position in said three-dimensional system when the observer is looking toward said series of workpoints, and (5) a fifth storage file of decisional and sort tables for converting relative and absolute three-dimensional coordinates of said fourth storage file to two-dimensional axonometric coordinates for aiding in converting said piping symbols to a correct representation at said plotter, said controller directing and supervising operations of said processor and said plotter to provide a planar representation of said 3-d pipeline, being further characterized by operations which include (i) locating in said field storage file for each piping element, a material items number as well as locating in said second storage file said binary display code indexed by material item number for indicating all dimensions associated with display of each of said piping symbol associated with corresponding piping elements, (ii) determining all three-dimensional coordinates for each of said workpoints using said decisional and sort tables of said fourth storage file, (iii) interrogating said fifth storage file to generate 2-d axonometric coordinates for said selected 3-d coordinates of said workpoints of (ii), above, as well as for associated workpoints, if any (iv) accessing to said plotter said binary display code for displaying said associate standard piping symbols of said piping elements in proper spatial relationship as well as generating drafting notes, center lines and leader lines of interest associated with depicted piping symbols, of said piping elements in correct and accurate perspective planar representational form, (v) indexing to said display plotter from said third storage file, short descriptive terms associated with piping elements so as to provide a list of materials of said piping elements, as depicted at said plotter.

2. The system of claim 1 in which said memory includes a sixth storage file containing material piping data in sort and decisional tables including shop and field quantities of piping elements set forth in each list of materials of each axonometric representation provided at said display plotter, said shop and field quantities being indexed by material item number; project number, isometric drawing number, accounting item number and size designation for each piping element.

3. The system of claim 2 in which said sixth storage file is controlled by said processor and said controller so as to provide in conjunction with a printer, printouts in columnar form indicating status of purchased-versus-withdrawn quantities of said piping elements of said list of material of each displayed axonometric representation at said display plotter.

4. The system of claim 3 in which said sixth storage file is controlled so as to provide automatic attachment to conventional purchase orders, said sheets including a full description of each of said piping elements to be purchased.

5. The system of claim 2 in which said material piping information stored within said sixth storage file includes subcodes related to:
   (i) price and size codes indexed to said material item number,
   (ii) withdrawal codes associated with said material piping elements listed on each of said lists of materials of each axonometric display, indexed by material item number, size of each of said piping elements, and accounting numbers,
   (iii) purchasing codes indexed by purchase order number, material item number, item description and size,
   (iv) purchase updating codes indexed by new purchase order number, material item number, and size, and
   (v) material summary codes related to said material piping elements indexed by purchase order number, a short descriptions code, size and price codes, and new withdrawal and purchase codes of (ii) and (iv), respectively.

6. The system of claim 2 in which said material piping data stored in said sixth storage file includes a subcode related to a minimum quantity of a selected material piping element required for maintenance of a minimum inventory of said element by which purchasing if needed, of said same piping elements can be easily undertaken.

7. The system of claim 1 in which operation of said processor includes interrogation of said fourth storage file so as to allow selective manipulation of coordinates associated with piping symbols, drafting notes and annotated leaders, of said pipeline, in perspective display to determine the best view thereof by comparing absolute horizontal and vertical values of coordinates generated from four separate points of observation and selecting the view having the largest vertical and horizontal values for display at said plotter.

* * * * *